(12) United States Patent
Hamada et al.

(10) Patent No.: US 8,503,859 B2
(45) Date of Patent: Aug. 6, 2013

(54) APPARATUS AND REPRODUCING METHOD, FOR REPRODUCING CONTENT DATA RECORDED ON A RECORDING MEDIUM

(75) Inventors: Toshiya Hamada, Saitama (JP); Motoki Kato, Kanagawa (JP)

(73) Assignee: Sony Corporation (JP)

( * ) Notice: Subject to any disclaimer, the term of this patent is extended or adjusted under 35 U.S.C. 154(b) by 1832 days.

(21) Appl. No.: 11/696,877

(22) Filed: Apr. 5, 2007

(65) Prior Publication Data

US 2007/0183754 A1    Aug. 9, 2007

Related U.S. Application Data

(62) Division of application No. 10/519,422, filed as application No. PCT/JP2004/005805 on Apr. 22, 2004, now Pat. No. 7,565,060.

(30) Foreign Application Priority Data

Apr. 25, 2003  (JP) ................................. 2003-121595

(51) Int. Cl.
  *H04N 9/80*   (2006.01)
(52) U.S. Cl.
  USPC ............ 386/241; 386/338; 386/353; 386/248
(58) Field of Classification Search
  USPC .................. 386/341, 337, 338, 241, 248, 353
  See application file for complete search history.

(56) References Cited

U.S. PATENT DOCUMENTS

| | | | |
|---|---|---|---|
| 5,356,178 A | | 10/1994 | Numata |
| 5,642,171 A | * | 6/1997 | Baumgartner et al. ....... 348/515 |
| 5,784,528 A | | 7/1998 | Yamane et al. |
| 5,794,251 A | * | 8/1998 | Watanabe et al. ..................... 1/1 |
| 5,838,364 A | | 11/1998 | Ishibe et al. |
| 5,884,004 A | | 3/1999 | Sato et al. |
| 5,895,124 A | | 4/1999 | Tsuga et al. |
| 5,933,603 A | * | 8/1999 | Vahalia et al. ................. 709/225 |
| 5,941,951 A | * | 8/1999 | Day et al. ....................... 709/233 |

(Continued)

FOREIGN PATENT DOCUMENTS

| | | |
|---|---|---|
| EP | 0 847 198 A1 | 6/1998 |
| EP | 0 847 200 A1 | 6/1998 |

(Continued)

OTHER PUBLICATIONS

U.S. Appl. No. 11/696,977, filed Apr. 5, 2007, Hamada, et al.

*Primary Examiner* — David Harvey
(74) *Attorney, Agent, or Firm* — Lerner, David, Littenberg, Krumholz & Mentlik, LLP

(57) ABSTRACT

A reproducing apparatus and a reproducing method reproduce content data recorded on a recording medium. Video data, audio data reproducible in accordance with the video data, and information that indicates whether the video data and the audio data have been recorded as a multiplexed file or as independent files are read from the recording medium. The read video data and audio data are reproduced in accordance with the read information. When the information indicates that the video data and the audio data have been recorded as a multiplexed file on the recording medium, still pictures derived from the video data are reproduced in synchronization with the audio data. When the information indicates that the video data and the audio data have been recorded as independent files on the recording medium, the still pictures derived from the video data are reproduced without being in synchronization with the audio data.

9 Claims, 64 Drawing Sheets

| application_type | DESCRIPTION |
|---|---|
| 0 | CORRESPONDING m2ts FILE DOES NOT COMPLY WITH RULE OF HDMV TRANSPORT STREAM. |
| 1 | CORRESPONDING m2ts FILE COMPLIES WITH RULE OF HDMV TRANSPORT STREAM. ( NORMAL HDMV STREAM ) |
| 2 | CORRESPONDING m2ts FILE COMPLIES WITH RULE OF HDMV TRANSPORT STREAM FOR STILL PICTURE THAT SYNCHRONIZES WITH AUDIO REPRODUCTION. ( TIME BASE SLIDE SHOW ) |
| 3 | CORRESPONDING m2ts FILE COMPLIES WITH RULE OF HDMV TRANSPORT STREAM FOR STILL PICTURE THAT IS REPRODUCED NOT IN SYNCHRONIZATION WITH AUDIO. ( BROWSABLE SLIDE SHOW ) |

U.S. PATENT DOCUMENTS

| | | | |
|---|---|---|---|
| 5,966,352 A | 10/1999 | Sawabe et al. | |
| 5,983,236 A * | 11/1999 | Yager et al. | 1/1 |
| 6,142,913 A * | 11/2000 | Ewert | 482/8 |
| 6,181,872 B1 | 1/2001 | Yamane et al. | |
| 6,430,361 B2 | 8/2002 | Lee et al. | |
| 6,549,722 B2 | 4/2003 | Okada et al. | |
| 6,553,179 B1 | 4/2003 | Miwa et al. | |
| 6,560,403 B1 | 5/2003 | Tanaka et al. | |
| 6,574,422 B1 | 6/2003 | Kikuchi et al. | |
| 7,099,567 B2 * | 8/2006 | Takahashi et al. | 386/248 |
| 7,167,635 B1 | 1/2007 | Ando et al. | |
| 7,356,247 B2 | 4/2008 | Hamasaka et al. | |
| 7,565,060 B2 | 7/2009 | Hamada et al. | |
| 2001/0031136 A1 | 10/2001 | Kawamura et al. | |
| 2003/0113096 A1 | 6/2003 | Taira et al. | |
| 2003/0174218 A1 * | 9/2003 | Battles et al. | 348/231.4 |
| 2004/0024889 A1 * | 2/2004 | Getsin et al. | 709/229 |
| 2004/0071444 A1 | 4/2004 | Yoshio et al. | |
| 2004/0095379 A1 * | 5/2004 | Chang et al. | 345/727 |
| 2004/0175147 A1 | 9/2004 | Ando et al. | |
| 2004/0179820 A1 | 9/2004 | Kashiwagi et al. | |
| 2004/0184778 A1 * | 9/2004 | Jung et al. | 386/95 |
| 2005/0196148 A1 | 9/2005 | Seo et al. | |
| 2005/0196155 A1 | 9/2005 | Yoo et al. | |
| 2005/0198053 A1 * | 9/2005 | Seo et al. | 707/100 |
| 2006/0176781 A1 * | 8/2006 | King et al. | 369/30.01 |
| 2007/0172210 A1 | 7/2007 | Hamada et al. | |
| 2007/0183750 A1 | 8/2007 | Hamada et al. | |
| 2007/0189722 A1 | 8/2007 | Hamada et al. | |
| 2007/0189727 A1 | 8/2007 | Hamada et al. | |

FOREIGN PATENT DOCUMENTS

| | | |
|---|---|---|
| EP | 1 198 132 A1 | 4/2002 |
| EP | 1 198 133 A1 | 4/2002 |
| EP | 1347454 A2 | 9/2003 |
| JP | 08331509 A | 12/1996 |
| JP | 11018058 A | 1/1999 |
| JP | 2000-105775 | 4/2000 |
| JP | 2001223991 A | 8/2001 |
| JP | 2002-74850 | 3/2002 |
| JP | 2002-158972 | 5/2002 |
| JP | 2002171472 A | 6/2002 |
| JP | 2002-313066 A | 10/2002 |
| JP | 2002343069 A | 11/2002 |
| JP | 2003319346 A | 11/2003 |
| JP | 2004-193673 | 7/2004 |
| WO | WO 97/13365 | 4/1997 |

\* cited by examiner

Fig. 5

| SYNTAX | DATA LENGTH (BITS) | MNEMONIC |
|---|---|---|
| info.bdav{ | | |
|     type_indicator | 8*4 | bslbf |
|     version_number | 8*4 | bslbf |
|     TableOfPlayLists_start_address | 32 | unimsbf |
|     MakersPrivateData_start_address | 32 | unimsbf |
|     reserved_for_future_use | 192 | bslbf |
|     UIAppInfoBDAV() | | |
|     for(i=0;i<N1;+i++){ | | |
|         padding_word | 16 | bslbf |
|     } | | |
|     TableOfPlayLists() | | |
|     for(i=0;i<N2;+i++){ | | |
|         padding_word | 16 | bslbf |
|     } | | |
|     MakersPrivateData() | | |
|     for(i=0;i<N3;+i++){ | | |
|         padding_word | 16 | bslbf |
|     } | | |
| } | | |

Fig. 6

| SYNTAX | DATA LENGTH (BITS) | MNEMONIC |
|---|---|---|
| UIAppInfoBDAV(){ | | |
|     length | 32 | unimsbf |
|     reserved_for_future_use | 16 | bslbf |
|     BDAV_character_set | 8 | bslbf |
|     reserved_for_word_align | 6 | bslbf |
|     BDAV_protect_flag | 1 | bslbf |
|     resume_valid_flag | 1 | bslbf |
|     PIN | 8*4 | bslbf |
|     resume_PlayList_file_name | 8*10 | bslbf |
|     ref_to_menu_thumbnail_index | 16 | unimsbf |
|     BDAV_name_length | 8 | unimsbf |
|     BDAV_name | 8*255 | bslbf |
| } | | |

Fig. 7

| SYNTAX | DATA LENGTH (BITS) | MNEMONIC |
|---|---|---|
| TableOfPlayLists(){ | | |
|     length | 32 | unimsbf |
|     number_of_PlayLists | 16 | unimsbf |
|     for(i=0;i<number_of_PlayLists;i++){ | | |
|         PlayList_file_name | 8*10 | bslbf |
|     } | | |
| } | | |

Fig. 8

| SYNTAX | DATA LENGTH (BITS) | MNEMONIC |
|---|---|---|
| xxxxx.rpls/yyyyy.vpls{ | | |
|     type_indicator | 8*4 | bslbf |
|     version_number | 8*4 | bslbf |
|     PlayList_start_address | 32 | unimsbf |
|     PlayListMark_start_address | 32 | unimsbf |
|     MakersPrivateData_start_address | 32 | unimsbf |
|     reserved_for_future_use | 160 | bslbf |
|     UIAppInfoPlayList() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
|     MakersPrivateData() | | |
|     for(i=0;i<N4;i++){ | | |
|         padding_word | 16 | bslbf |
|     } | | |
| } | | |

Fig. 9

| SYNTAX | DATA LENGTH (BITS) | MNEMONIC |
|---|---|---|
| UIAppInfoPlayList(){ | | |
| length | 32 | unimsbf |
| reserved_for_future_use | 16 | bslbf |
| PlayList_character_set | 8 | unimsbf |
| reserved_for_word_align | 4 | bslbf |
| playback_protect_flag | 1 | bslbf |
| write_protect_flag | 1 | bslbf |
| is_played_flag | 1 | bslbf |
| is_edited_flag | 1 | bslbf |
| time_zone | 8 | bslbf |
| reserved_for_word_align | 8 | bslbf |
| record_time_and_date | 4*14 | bslbf |
| PlayList_duration | 4*6 | bslbf |
| maker_ID | 16 | unimsbf |
| maker_model_code | 16 | unimsbf |
| channel_number | 16 | unimsbf |
| reserved_for_word_align | 8 | bslbf |
| channel_name_length | 8 | unimsbf |
| channel_name | 8*20 | bslbf |
| PlayList_name_length | 8 | unimsbf |
| PlayList_name | 8*255 | bslbf |
| PlayList_detail_length | 16 | unimsbf |
| PlayList_detail | 8*1200 | bslbf |
| } | | |

Fig. 10

| SYNTAX | DATA LENGTH (BITS) | MNEMONIC |
|---|---|---|
| PlayList(){ | | |
|   length | 32 | uimsbf |
|   reserved_for_word_align | 12 | bslbf |
|   PL_CPI_type | 4 | bslbf |
|   number_of_PlayItems | 16 | uimsbf |
|   if(<Virtual-PlayList>&&PL_CPI_type==1){ | | |
|     number_of_SubPlayItems | 16 | uimsbf |
|   }else{ | | |
|     reserved_for_word_align | 16 | bslbf |
|   } | | |
|   for(PlayItem_id=0;PlayItem_id<number_of_PlayItems;PlayItem_id++){ | | |
|     PlayItem() | | |
|   } | | |
|   if(<Virtual-PlayList>&&CPI_type==1){ | | |
|     for(i=0;i<number_of_SubPlayItems;i++){ | | |
|       SubPlayItem() | | |
|     } | | |
|   } | | |
| } | | |

Fig. 11

| SYNTAX | DATA LENGTH (BITS) | MNEMONIC |
|---|---|---|
| PlayItem(){ | | |
|   length | 16 | unimsbf |
|   Clip_Infomation_file_name | 8*5 | bslbf |
|   Clip_codec_identifier | 8*4 | bslbf |
|   reserved_for_future_use | 6 | bslbf |
|   connection_condition | 2 | bslbf |
|   if(CPI_type==1){ | | |
|     ref_to_STC_id | 8 | unimsbf |
|   }else{ | | |
|     reserved_for_word_align | 8 | bslbf |
|   } | | |
|   IN_time | 32 | unimsbf |
|   OUT_time | 32 | unimsbf |
|   if((Virtual-PlayList)&&connection_condition==3){ | | |
|     BridgeSequenceInfo() | | |
|   } | | |
| } | | |

Fig. 13

| SYNTAX | DATA LENGTH (BITS) | MNEMONIC |
|---|---|---|
| PlayListMark(){ | | |
|   length | 32 | unimsbf |
|   number_of_PlayList_marks | 16 | unimsbf |
|   for(i=0;i<number_of_PlayList_marks;i++){ | | |
|     mark_invalid_flag | 1 | unimsbf |
|     mark_type | 7 | unimsbf |
|     mark_name_length | 8 | unimsbf |
|     maker_ID | 16 | unimsbf |
|     ref_to_PlayItem_id | 16 | unimsbf |
|     mark_time_stamp | 32 | unimsbf |
|     entry_ES_PID | 16 | unimsbf |
|     if(mark_type==0x01\|\|mark_type==0x02){ | | |
|       ref_to_menu_thumbnail_index | 16 | unimsbf |
|     }else{ | | |
|       ref_to_menu_thumbnail_index | 16 | unimsbf |
|     } | | |
|     duration | 32 | unimsbf |
|     makers_information | 32 | bslbf |
|     mark_name | 8*24 | bslbf |
|   } | | |
| } | | |

Fig. 14

| SYNTAX | DATA LENGTH (BITS) | MNEMONIC |
|---|---|---|
| zzzzz.clpi{ | | |
|     type_indicator | 8*4 | bslbf |
|     version_number | 8*4 | bslbf |
|     SequenceInfo_start_address | 32 | unimsbf |
|     ProgramInfo_start_address | 32 | unimsbf |
|     CPI_start_address | 32 | unimsbf |
|     ClipMark_start_address | 32 | unimsbf |
|     MakersPrivateData_start_address | 32 | unimsbf |
|     reserved_for_future_use | 96 | bslbf |
|     ClipInfo() | | |
|     for(i=0;<N1;i++){ | | |
|         padding_word | 16 | bslbf |
|     } | | |
|     SequenceInfo() | | |
|     for(i=0;<N2;i++){ | | |
|         padding_word | 16 | bslbf |
|     } | | |
|     ProgramInfo() | | |
|     for(i=0;<N3;i++){ | | |
|         padding_word | 16 | bslbf |
|     } | | |
|     CPI() | | |
|     for(i=0;<N4;i++){ | | |
|         padding_word | 16 | bslbf |
|     } | | |
|     ClipMark() | | |
|     for(i=0;<N5;i++){ | | |
|         padding_word | 16 | bslbf |
|     } | | |
|     MakersPrivateData() | | |
|     for(i=0;<N6;i++){ | | |
|         padding_word | 16 | bslbf |
|     } | | |
| } | | |

| ITEM | DESCRIPTION |
| --- | --- |
| MOVING PICTURE PLANE | 1920x1080x16BITS, YCbCr(4:2:2),EIGHT BITS EACH |
| SUBTITLE PLANE | 1920x1080x8BITS, 8-BIT COLOR MAP ADDRESSES (PALETTE) + ALPHA-BLENDING IN 256 LEVELS |
| GRAPHICS PLANE | 1920x1080x8BITS, 8-BIT COLOR MAP ADDRESSES (PALETTE) + ALPHA BLENDING IN 256 LEVELS |

Fig. 18

| INPUT | INPUT ADDRESS, 8 BITS |
|---|---|
| OUTPUT | OUTPUT DATA, 8 BITSx4, (R, G, B, $\alpha$) OUTPUT |

Fig. 19

| | VALUES OF THREE PRIMARY COLORS | | | TRANSPARENCY |
|---|---|---|---|---|
| COLOR INDEX VALUE | R | G | B | $\alpha$ |
| 0x00 | 0 | 0 | 0 | 0 |
| 0x01 | 10 | 100 | 30 | 0.5 |
| ⋮ | ⋮ | ⋮ | ⋮ | ⋮ |
| ⋮ | ⋮ | ⋮ | ⋮ | ⋮ |
| 0xFF | 200 | 255 | 100 | 0.8 |

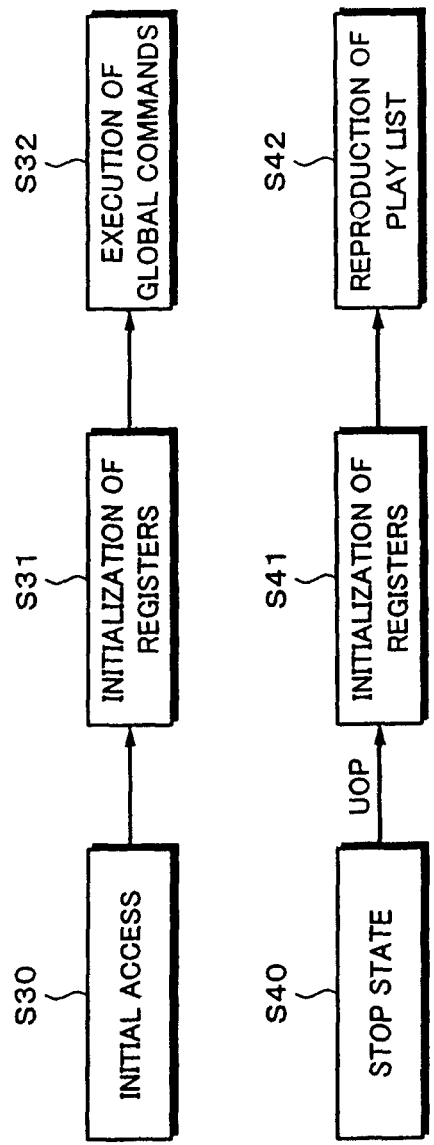

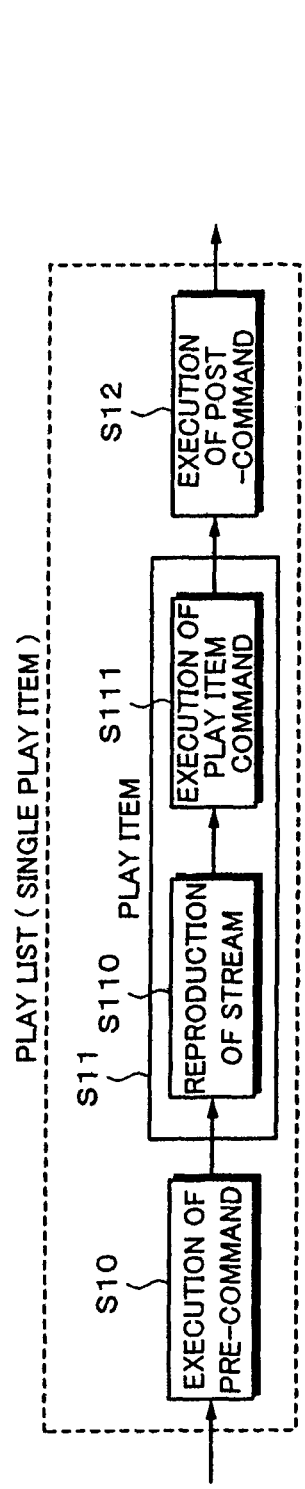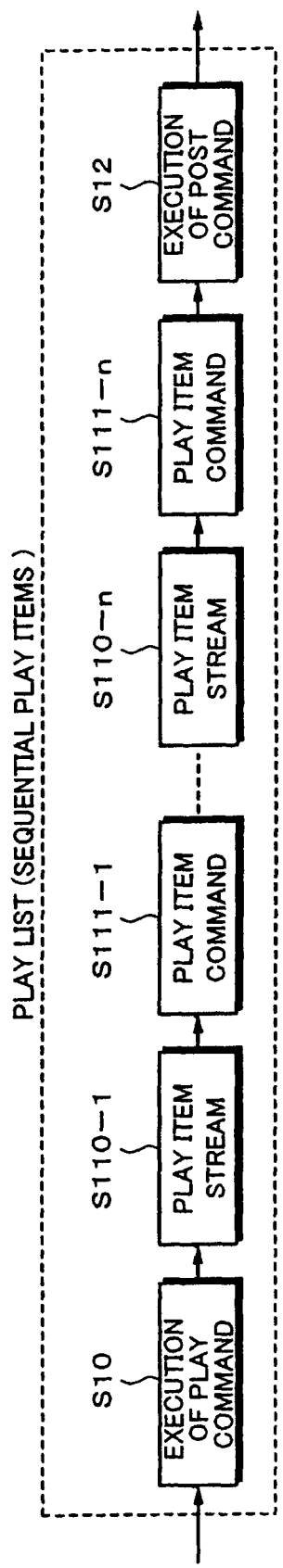

Fig. 28A

| Fig. 28 |
|---|
| Fig. 28A |
| Fig. 28B |
| Fig. 28C |
| Fig. 28D |
| Fig. 28E |
| Fig. 28F |
| Fig. 28G |
| Fig. 28H |

| METHOD | REMARKS |
|---|---|
| COMMANDS FOR DESIGNATING REPRODUCTION START POSITION | |
| LinkPlayList(playListNumber) | CAUSES REPRODUCTION OF PlayList DESIGNATED BY PlayListNumber TO BE STARTED. |
| LinkPlayItem(playListNumber,playItemNumber) | CAUSES REPRODUCTION OF DESIGNATED PlayItem OF DESIGNATED PlayList TO BE STARTED. playItemNumber IS PlayItem_id STARTING FROM 0. WHEN PlayList IS REPRODUCED FROM BEGINNING, PlayItemNumber IS 0. |

Fig. 28B

| METHOD | REMARKS |
|---|---|
| COMMANDS FOR DESIGNATING REPRODUCTION START POSITION | |
| Link(position)(object)<br>position=("prev" \| "next" \| "top" \| "Parent" \| "tail")<br>object=(PlayList \| PlayItem \| Chapter) | CAUSES CURRENT POSITION TO BE MOVED IN SCENARIO.<br>CAUSES CURRENT REPRODUCTION POSITION TO BE MOVED TO ADJACENT PlayList, PlayItem, OR Chapter. |
| Exit | CAUSES REPRODUCTION OF SCENARIO TO BE STOPPED.<br>VALUE OF STANDARD REGISTER IS NOT HELD. |
| RSM | CAUSES REPRODUCTION TO BE RESUMED FROM LAST REPRODUCTION STOP POSITION.<br>CAUSES STORED RESUME INFORMATION TO BE CALLED, IT TO BE SET TO REGISTER, AND REPRODUCTION OF SCENARIO TO BE STARTED. |

Fig. 28C

| COMMANDS FOR OBTAINING STATE OF PAYER | |
|---|---|
| getMenuDescriptionLanguage() | CAUSES LANGUAGE OF MENU THAT IS DISPLAYED TO BE OBTAINED. |
| getScenarioNumber() | CAUSES SCENARIO NUMBER THAT IS BEING REPRODUCED TO BE OBTAINED. |
| getPlayListNumber() | CAUSES PLAY LIST NUMBER THAT IS BEING REPRODUCED TO BE OBTAINED. |
| getChapterNumber() | CAUSES CHAPTER NUMBER THAT IS BEING REPRODUCED TO BE OBTAINED. |
| getPlayerSupport() | CAUSES VERSION AND FUNCTION OF PLAYER TO BE OBTAINED. |

Fig. 28D

| COMMANDS FOR VIDEO STREAMS | |
|---|---|
| getVideoStreamAvailability() | CAUSES INFORMATION THAT DESCRIBES WHETHER OR NOT DESIGNATED VIDEO STREAM IS CONTAINED TO BE OBTAINED. |
| setVideoStreamNumber() | DESCRIBES VIDEO STREAM TO BE DECODED. |
| getVideoStreamNumber() | CAUSES VIDEO STREAM NUMBER THAT IS BEING SELECTED TO BE OBTAINED. |
| getVideoStreamAttribute() | CAUSES ATTRIBUTE OF VIDEO STREAM (ENCODING SYSTEM, RESOLUTION, ASPECT RATIO, DISPLAY MODE IN THE CASE OF ASPECT RATIO OF 4:3, CLOSED CAPTION) TO BE OBTAINED. |
| setAngleNumber() | DESCRIBES ANGLE NUMBER. |
| getAngleNumber() | CAUSES ANGLE NUMBER THAT IS BEING SELECTED TO BE OBTAINED. |
| getMaxVideoStreams() | CAUSES NUMBER OF VIDEO STREAMS THAT CAN BE SELECTED TO BE OBTAINED. DESCRIBES WHETHER OR NOT getVideoStreamAvailability() IS SUFFICIENT. |

Fig. 28E

| COMMANDS FOR AUDIO STREAMS | |
|---|---|
| getAudioStreamAvailability() | CAUSES INFORMATION THAT DESCRIBES WHETHER OR NOT DESIGNATED AUDIO STREAM IS CONTAINED TO BE OBTAINED. |
| getAudioStreamLanguage() | CAUSES INFORMATION ABOUT LANGUAGE OF DESIGNATED AUDIO STREAM TO BE OBTAINED. |
| getAudioStreamStatus() | DESCRIBES AUDIO STREAM TO BE REPRODUCED. |
| setAudioStreamStatus() | CAUSES AUDIO STREAM NUMBER THAT IS BEING REPRODUCED TO BE OBTAINED. |
| getAudioStreamAttribute() | CAUSES ATTRIBUTE OF AUDIO STREAM (ENCODING SYSTEM, NUMBER OF CHANNELS, Q, FS) TO BE OBTAINED. |

Fig. 28F

| COMMANDS FOR SUB PICTURE STREAMS | |
|---|---|
| getSPStreamAvailability() | CAUSES INFORMATION THAT DESCRIBES WHETHER OR NOT DESIGNATED SP STREAM IS CONTAINED TO BE OBTAINED. |
| getSPStreamLanguage() | CAUSES LANGUAGE OF DESIGNATED SP STREAM TO BE OBTAINED. |
| getSPDisplayStatus() | CAUSES DISPLAY STATE OF SP ( WHETHER OR NOT SP IS DISPLAYED ) TO BE OBTAINED. |
| setSPDisplayStatus() | DESCRIBES DISPLAY STATE OF SP ( WHETHER OR NOT SP IS DISPLAYED ). |
| getSpStreamAttribute() | CAUSES ATTRIBUTE OF SP ( RESOLUTION, 4 : 3 OR WIDE) TO BE OBTAINED. |

Fig. 28G

| COMMANDS FOR REGISTER READ/WRITE | |
|---|---|
| clearReg() | CAUSES ALL REGISTERS TO BE INITIALIZED. |
| setReg() | CAUSES VALUE TO BE SET TO REGISTER. |
| getReg() | CAUSES VALUE TO BE READ FROM REGISTER. |

*Fig. 28H*

| COMMANDS FOR TIMERS | |
|---|---|
| sleep() | CAUSES PROCESS TO BE STOPPED FOR DESIGNATED MILLISECONDS. |
| setTimeout() | CAUSES FUNCTION AND PROCESS TO BE EXECUTED AFTER DESIGNATED MILLISECONDS HAVE ELAPSED. |
| setInterval() | CAUSES PROCESS TO BE EXECUTED AT INTERVALS OF DESIGNATED MILLISECONDS. |
| clearTimer() | CAUSES PROCESS OF TIMER THAT HAS DESIGNATED REGISTRATION TIMER ID TO BE STOPPED. |
| pauseTimer() | CAUSES TIMER THAT HAS DESIGNATED REGISTRATION TIMER ID TO BE TEMPORARILY STOPPED. |
| resumeTimer() | CAUSES TIMER THAT HAS DESIGNATED REGISTRATION TIMER ID TO BE RESUMED FROM PAUSE STATE. |
| OTHER COMMANDS | |
| playSoundEffect(sound_id) | CAUSES SELECTED EFFECT SOUND TO BE REPRODUCED. USED WITH BUTTON COMMAND. |

Fig. 30

| SYNTAX | DATA LENGTH (BITS) | MNEMONIC |
|---|---|---|
| scenario.hdmv{ | | |
|     type_indicator | 8*4 | bslbf |
|     version_number | 8*4 | bslbf |
|     scenario_start_address | 32 | |
|     reserved_for_future_use | 224 | bslbf |
|     Autoplay() | | |
|     for(i=0;i<N1;i++){ | | |
|         padding_word | 16 | bslbf |
|     } | | |
|     Scenario() | | |
|     for(i=0;i<N2;i++){ | | |
|         padding_word | 16 | bslbf |
|     } | | |
| } | | |

Fig. 31

| SYNTAX | DATA LENGTH (BITS) | MNEMONIC |
|---|---|---|
| Autoplay(){ | | |
|     length | 32 | uimsbf |
|     reserved | 16 | |
|     number_of_commands | 16 | |
|     for(i=0;i<number_of_commands;i++){ | | |
|         command(i) | 32 | uimsbf |
|     } | | |
| } | | |

Fig. 32

| SYNTAX | DATA LENGTH (BITS) | MNEMONIC |
|---|---|---|
| Scenario(){ | | |
|   length | 32 | |
|   flags | 32 | |
|   number_of_PlayLists | 16 | |
|   for(i=0;i<Number_of_PlayLists;i++){ | | |
|     Pre_Command_start_id | 32 | |
|     Post_Command_start_id | 32 | |
|     number_of_Pre_Commands | 32 | |
|     number_of_Post_Commands | 32 | |
|     reserved | 32 | |
|     number_of_PlayItems | 32 | |
|     for(PlayItem_id=0;PlayItem_id<number_of_PlayItems;PlayItem_id++){ | | |
|       PI_Command_start_id | 32 | |
|       number_of_PI_Commands | 32 | |
|     } | | |
|     reserved | | |
|     // Command table for Each PlayList | | |
|     number_of_PL_Commands | 16 | |
|     for(j=0;j<number_of_PL_Commands;j++){ | | |
|       PL_Command(j) | 32 | |
|     } | | |
|   } | | |
| } | | |

Fig. 33

| SYNTAX | DATA LENGTH (BITS) | MNEMONIC |
|---|---|---|
| entrylist.data{ | | |
|     type_indicator | 8*4 | bslbf |
|     version_number | 8*4 | bslbf |
|     ScenarioEntry_start_address | 32 | uimsbf |
|     reserved_for_future_use | 224 | bslbf |
|     AppInfo() | | |
|     for(i=0;i<N1;i++){ | | |
|         padding_word | 16 | bslbf |
|     } | | |
|     ScenarioEntry() | | |
|     for(i=0;i<N2;i++){ | | |
|         padding_word | 16 | bslbf |
|     } | | |
| } | | |

Fig. 34

| SYNTAX | DATA LENGTH (BITS) | MNEMONIC |
|---|---|---|
| AppInfo(){ | | |
|     length | 32 | uimsbf |
|     reserved_for_future_use | 16 | bslbf |
|     HDMV_name_character_set | 8 | bslbf |
|     reserved_for_word_align | 7 | bslbf |
|     PIN_valid_flag | 1 | bslbf |
|     PIN | 8*4 | bslbf |
| //    UOP_mask_table() // For directory | 64 | |
|     HDMV_name_length | 8 | uimsbf |
|     HDMV_name | 8*255 | bslbf |
| } | | |

Fig. 35

| SYNTAX | DATA LENGTH (BITS) | MNEMONIC |
|---|---|---|
| ScenarioEntry() { | | |
| length | 32 | unimsbf |
| name_character_set | 8 | bslbf |
| // Entry PL for the Top Menu | | |
| Top Menu PL() { | | |
| flags | 32 | bslbf |
| TopMenu_ref_to_PlayList_file_name | 8*10 | bslbf |
| TopMenu_ref_to_PlayItem_id | 16 | unimsbf |
| TopMenu_name_length | 8 | unimsbf |
| TopMenu_name | 8*255 | bslbf |
| } | | |
| // Title Entries | | |
| number_of_Titles | 16 | unimsbf |
| for(unit_title_number=0;title_number<Number_of_Titles;title_number++){ | | |
| flags | 32 | bslbf |
| Title_ref_to_PlayList_file_name | 8*10 | bslbf |
| Title_ref_to_PlayItem_id | 16 | unimsbf |
| Title_name_length | 8 | unimsbf |
| Title_name | 8*255 | bslbf |
| } | | |
| // Stream Setup Menu for each PL | | |
| number_of_PlayLists | 16 | unimsbf |
| for(i=0;i<Number_of_PlayLists;i++){ | | |
| SSMenu_flags | 32 | bslbf |
| SSMenu_ref_to_PlayList_file_name | 8*10 | bslbf |
| SSMenu_ref_to_PlayItem_id | 16 | unimsbf |
| } | | |
| } | | |

Fig. 36

| SYNTAX | DATA LENGTH (BITS) | MNEMONIC |
|---|---|---|
| xxxxx.mpls{ | | |
|     type_indicator | 8*4 | bslbf |
|     version_number | 8*4 | bslbf |
|     PlayList_start_address | 32 | unimsbf |
|     PlayListMark_start_address | 32 | unimsbf |
|     reserved_for_future_use | 192 | bslbf |
|     PLControlInfo() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
| } | | |

Fig. 37

| SYNTAX | DATA LENGTH (BITS) | MNEMONIC |
|---|---|---|
| PLControlInfo(){ | | |
|     length | 32 | unimsbf |
|     reserved_for_future_use | 8 | bslbf |
|     PlayList_character_set | 8 | unimsbf |
|     reserved_for_future_use | 8 | |
|     PL_playback_type | 8 | |
|     if(PL_playback_type==0x2 \|\| | | |
|     PL_playback_type==0x3){ | | |
|         playback_count | 16 | |
|     } else { | | |
|         reserved_for_word_align | 16 | |
|     } | | |
|     PL_UOP_mask_table() // For PlayList | 64 | |
|     reserved_for_word_align | 8 | |
|     PL_random_access_mode | 8 | |
|     reserved_for_word_align | 8 | bslbf |
|     PlayList_duration | 4*6 | bslbf |
|     PlayList_name_length | 8 | unimsbf |
|     PlayList_name | 8*255 | bslbf |
|     PlayList_detail_length | 16 | unimsbf |
|     PlayList_detail | 8*1200 | bslbf |
| } | | |

Fig. 38

| PL_playback_type | DESCRIPTION |
|---|---|
| 0x0 | RESERVED REGION |
| 0x1 | SEQUENTIALLY REPRODUCES PLAY ITEMS (NORMAL REPRODUCTION). |
| 0x2 | RANDOMLY REPRODUCES PLAY ITEMS. |
| 0x3 | SHUFFLE-REPRODUCES PLAY ITEMS. |

Fig. 39

| PL_random_access_mode | DESCRIPTION |
|---|---|
| 0x0 | PERMITS JUMP-REPRODUCTION AND VARIABLE SPEED REPRODUCTION. |
| 0x1 | PROHIBITS JUMP-REPRODUCTION AND VARIABLE SPEED REPRODUCTION. |

Fig. 40

| SYNTAX | DATA LENGTH (BITS) | MNEMONIC |
|---|---|---|
| PlayList() { | | |
|   length | 32 | unimsbf |
|   number_of_PlayItems | 16 | unimsbf |
|   number_of_SubPlayItems | 16 | unimsbf |
|   for(PlayItem_id=0;PlayItem_id<number_of_PlayItems;PlayItem_id++){ | | |
|     PlayItem() | | |
|   } | | |
|   for(SubPlayItem_id=0;SubPlayItem_id<number_of_SubPlayItems;SubPlayItem_id++){ | | |
|     SubPlayItem() | | |
|   } | | |
| } | | |

Fig. 41

| SYNTAX | DATA LENGTH (BITS) | MNEMONIC |
|---|---|---|
| PlayItem(){ | | |
|     length | 16 | uimsbf |
|     reserved_for_word_align | 8 | bslbf |
|     Clip_Information_file_name | 8*5 | bslbf |
|     Clip_codec_identifier | 8*4 | bslbf |
|     reserved_for_future_use | 7 | bslbf |
|     is_multi_angle | 1 | bslbf |
|     reserved_for_future_use | 4 | bslbf |
|     connection_condition | 4 | uimsbf |
|     ref_to_STC_id | 8 | uimsbf |
|     IN_time | 32 | uimsbf |
|     OUT_time | 32 | uimsbf |
|     PI_UOP_mask_table() | 64 | bslbf |
|     PID_filter() | | |
|     reserved_for_word_align | 8 | bslbf |
|     PI_random_access_mode | 8 | uimsbf |
|     reserved_for_word_align | 8 | bslbf |
|     still_mode | 8 | uimsbf |
|     if(still_mode==0x1) { | | |
|         still_time | 16 | uimsbf |
|     } else { | | |
|         reserved_for_word_align | 16 | bslbf |
|     } | | |
|     // Angle | | |
|     if(is_multi_angle) { | | |
|         number_of_angles | 8 | uimsbf |
|         is_seamless_angle_change | 8 | uimsbf |
|         for(angle_id=1;angle_id<number_of_angles;angle_id++){ | | |
|             Clip_Information_file_name | 8*5 | bslbf |
|             ref_to_STC_id | 8 | uimsbf |
|             IN_time | 32 | uimsbf |
|             OUT_time | 32 | uimsbf |
|         } | | |
|     } | | |
| } | | |

Fig. 42

| PL_random_access_mode | DESCRIPTION |
|---|---|
| 0x0 | PERMITS JUMP REPRODUCTION AND VARIABLE SPEED REPRODUCTION. |
| 0x1 | PROHIBITS JUMP REPRODUCTION AND VARIABLE SPEED REPRODUCTION. |

Fig. 43

| still_mode | DESCRIPTION |
|---|---|
| 0x0 | NO STILL. |
| 0x1 | STILL FOR LIMITED TIME PERIOD. TIME PERIOD IS DESCRIBED IN still_time. |
| 0x2 | STILL FOR UNLIMITED TIME PERIOD. STILL IS CONTINUED UNTIL USER CANCELS IT. |
| 0x3-0xf | RESERVED. |

Fig. 44

| is_seamless_angle_change | DESCRIPTION |
|---|---|
| 0x0 | NONSEAMLESSLY CHANGEABLE ANGLES |
| 0x1 | SEAMLESSLY CHANGEABLE ANGLES |

Fig. 45

| SYNTAX | DATA LENGTH (BITS) | MNEMONIC |
|---|---|---|
| SubPlayItem() { | | |
| length | 16 | unimsbf |
| Clip_Information_file_name | 8*5 | bslbf |
| Clip_codec_identifier | 8*4 | bslbf |
| reserved_for_future_use | 7 | bslbf |
| is_repeat_flag | 1 | bslbf |
| SubPlayItem_type | 8 | bslbf |
| ref_to_STC_id | 8 | unimsbf |
| SubPlayItem_IN_time | 32 | unimsbf |
| SubPlayItem_OUT_time | 32 | unimsbf |
| if(is_repeat_flag==0) { | | |
| sync_PlayItem_id | 16 | unimsbf |
| sync_start_PTS_of_PlayItem | 32 | unimsbf |
| } else { | | |
| reserved_for_word_align | 16 | |
| reserved_for_word_align | 32 | |
| } | | |
| } | | |

Fig. 46

| is_repeat_flag | DESCRIPTION |
|---|---|
| 0 | PERFORMS REPRODUCTION IN SYNCHRONIZATION WITH MAIN PATH. |
| 1 | DOES NOT PERFORM REPRODUCTION IN SYNCHRONIZATION WITH MAIN PATH. REPEATS REPRODUCTION. |

Fig. 48

| SYNTAX | DATA LENGTH (BITS) | MNEMONIC |
|---|---|---|
| zzzzz.clpi{ | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     reserved_for_future_use | 128 | bslbf |
|     ClipInfo() | | |
|     for(i=0;i<N1;i++){ | | |
|         padding_word | 16 | bslbf |
|     } | | |
|     SequenceInfo() | | |
|     for(i=0;i<N2;i++){ | | |
|         padding_word | 16 | bslbf |
|     } | | |
|     ProgramInfo() | | |
|     for(i=0;i<N3;i++){ | | |
|         padding_word | 16 | bslbf |
|     } | | |
|     CPI() | | |
|     for(i=0;i<N4;i++){ | | |
|         padding_word | 16 | bslbf |
|     } | | |
|     ClipMark() | | |
|     for(i=0;i<N5;i++){ | | |
|         padding_word | 16 | bslbf |
|     } | | |
| } | | |

Fig. 49

| SYNTAX | DATA LENGTH (BITS) | MNEMONIC |
|---|---|---|
| ClipInfo() { | | |
| length | 32 | unimsbf |
| reserved | 8 | bslbf |
| application_type | 8 | unimsbf |
| Clip_stream_type | 8 | unimsbf |
| reserved | 40 | unimsbf |
| TS_recording_rate | 32 | unimsbf |
| num_of_source_packets | 32 | unimsbf |
| BD_system_use | 1024 | bslbf |
| TS_type_info_block() | | |
| } | | |

Fig. 50

| application_type | DESCRIPTION |
|---|---|
| 0 | CORRESPONDING m2ts FILE DOES NOT COMPLY WITH RULE OF HDMV TRANSPORT STREAM. |
| 1 | CORRESPONDING m2ts FILE COMPLIES WITH RULE OF HDMV TRANSPORT STREAM. (NORMAL HDMV STREAM) |
| 2 | CORRESPONDING m2ts FILE COMPLIES WITH RULE OF HDMV TRANSPORT STREAM FOR STILL PICTURE THAT SYNCHRONIZES WITH AUDIO REPRODUCTION. (TIME BASE SLIDE SHOW) |
| 3 | CORRESPONDING m2ts FILE COMPLIES WITH RULE OF HDMV TRANSPORT STREAM FOR STILL PICTURE THAT IS REPRODUCED NOT IN SYNCHRONIZATION WITH AUDIO. (BROWSABLE SLIDE SHOW) |

Fig. 51

| SYNTAX | DATA LENGTH (BITS) | MNEMONIC |
|---|---|---|
| SequenceInfo(){ | | |
|   length | 32 | unimsbf |
|   reserved_for_word_align | 8 | bslbf |
|   num_of_ATC_sequences | 8 | unimsbf |
|   for(atc_id=0;atc_id<num_of_ATC_sequences;atc_id++){ | | |
|     SPN_ATC_start[atc_id] | 32 | unimsbf |
|     num_of_STC_sequences[atc_id] | 8 | unimsbf |
|     offset_STC_id[atc_id] | 8 | unimsbf |
|     for(stc_id=offset_STC_id[atc_id];stc_id<(num_of_STC_sequences[atc_id]+offset_STC_id[atc_id]);stc_id++){ | | |
|       PCR_PID[atc_id][stc_id] | 16 | unimsbf |
|       SPN_STC_start[atc_id][stc_id] | 32 | unimsbf |
|       presentation_start_time[atc_id][stc_id] | 32 | unimsbf |
|       presentation_end_time[atc_id][stc_id] | 32 | unimsbf |
|     } | | |
|   } | | |
| } | | |

Fig. 52

| SYNTAX | DATA LENGTH (BITS) | MNEMONIC |
|---|---|---|
| ProgramInfo() { | | |
|   length | 32 | unimsbf |
|   reserved_for_word_align | 8 | bslbf |
|   num_of_program_sequences | 8 | unimsbf |
|   for(i=0;i<num_of_program_sequences;i++) { | | |
|     SPN_program_sequence_start [i] | 32 | unimsbf |
|     program_map_PID [i] | 16 | bslbf |
|     num_of_streams_in_ps [i] | 8 | unimsbf |
|     num_of_groups [i] | 8 | unimsbf |
|     for(stream_index=0;stream_index<num_of_streams_in_ps[i];stream_index++) { | | |
|       stream_PID [i] [stream_index] | 16 | unimsbf |
|       StreamCodingInfo(i,stream_index) | | |
|     } | | |
|   } | | |
| } | | |

Fig. 53

| SYNTAX | DATA LENGTH (BITS) | MNEMONIC |
|---|---|---|
| StreamCodingInfo(i,stream_index) { | | |
| length | 8 | bslbf |
| stream_coding_type | 8 | unimsbf |
| if(stream_coding_type==0x02){ | | |
| video_format | 4 | unimsbf |
| frame_rate | 4 | unimsbf |
| aspect_ratio | 4 | unimsbf |
| reserved_for_word_align | 2 | bslbf |
| cc_flag | 1 | unimsbf |
| reserved_for_word_align | 1 | bslbf |
| }else if(stream_coding_type==0x80//stream_coding_type==0x81//stream_coding_type==0x82){ | | |
| audio_presentation_type | 4 | unimsbf |
| sampling_frequency | 4 | unimsbf |
| language_code | 16 | bslbf |
| reserved_for_word_align | 8 | bslbf |
| }else if(stream_coding_type==0x90){ | | |
| language_code | 16 | bslbf |
| T.B.D | | |
| }else if(stream_coding_type==0xA0 ){ | | |
| language_code | 16 | bslbf |
| T.B.D | | |
| } | | |
| } | | |

Fig. 54

| SYNTAX | DATA LENGTH (BITS) | MNEMONIC |
|---|---|---|
| CPI() { | | |
|     length | 32 | unimsbf |
|     reserved_for_word_align | 12 | bslbf |
|     CPI_type | 4 | unimsbf |
|     EP_map_for_BDMV() | | |
| } | | |

Fig. 55

| CPI_type | DESCRIPTION |
|---|---|
| 0 | RESERVED FOR FUTURE USE |
| 1 | EP_map TYPE |
| 2 | TU_map TYPE |
| 3-7 | RESERVED FOR FUTURE USE |
| 8 | EP_map TYPE FOR BDMV |
| 9-15 | RESERVED FOR FUTURE USE |

Fig. 56

| SYNTAX | DATA LENGTH (BITS) | MNEMONIC |
|---|---|---|
| EP_map_for_one_stream_PID(EP_stream_type,Nc,Nf){ | | |
|     EP_fine_table_start_address | 32 | unimsbf |
|     for(i=0;i<Nc;i++){ | | |
|         ref_to_EP_fine_id[i] | 18 | unimsbf |
|         PTS_EP_coarse[i] | 14 | unimsbf |
|         SPN_EP_coarse[i] | 32 | unimsbf |
|     } | | |
|     for(i=0;i<X;i++){ | | |
|         padding_word | 16 | bslbf |
|     } | | |
|     for(EP_fine_id=0;EP_fine_id<Nf;EP_fine_id++){ | | |
|         is_angle_change_point[EP_fine_id] | 1 | bslbf |
|         I_end_position_offset[EP_fine_id] | 3 | bslbf |
|         PTS_EP_fine[EP_fine_id] | 11 | unimsbf |
|         SPN_EP_fine[EP_fine_id] | 17 | unimsbf |
|     } | | |
| } | | |

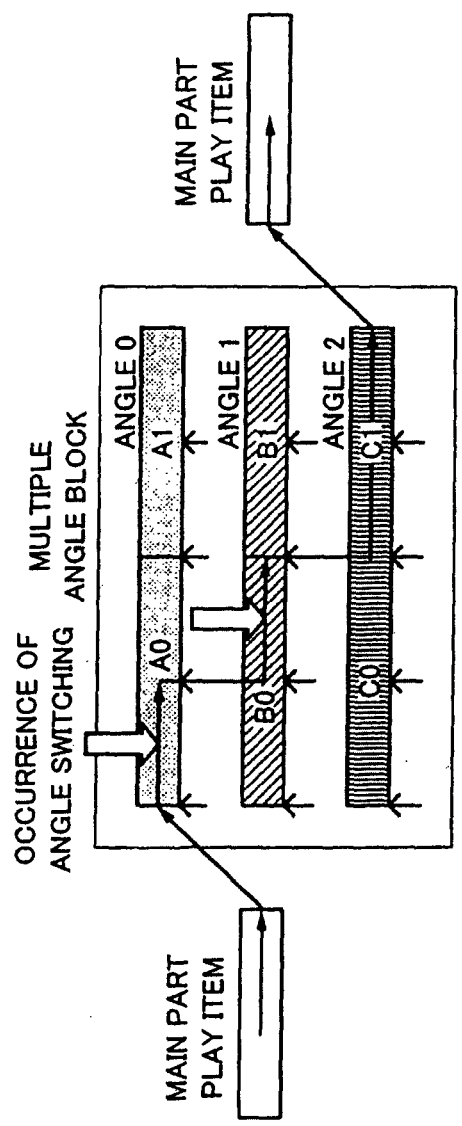
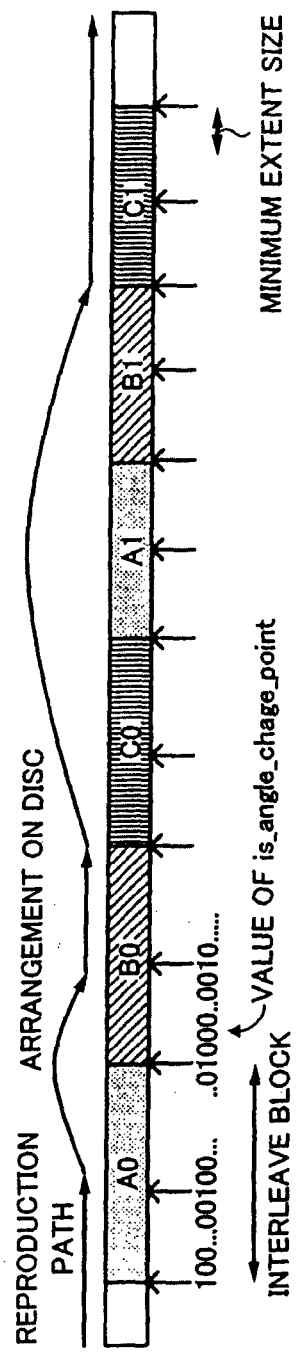
Fig. 60A
Fig. 60B

Fig. 61

| is_angle_change_point | Meaning |
|---|---|
| 0 | THIS EP ENTRY DOES NOT CORRESPOND TO ANGLE SWITCHABLE POINT. |
| 1 | THIS EP ENTRY CORRESPONDS TO ANGLE SWITCHABLE POINT. |

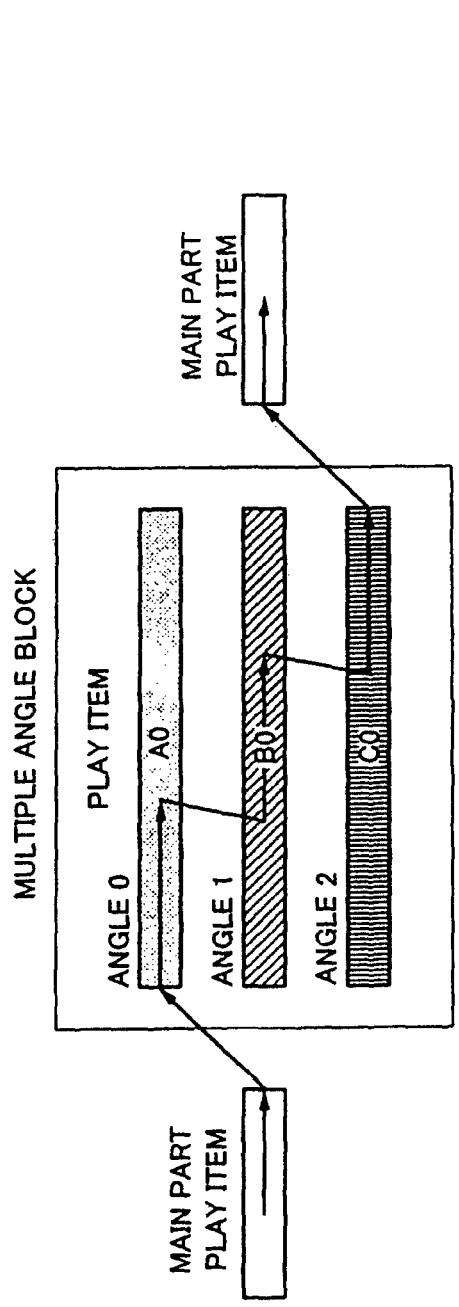
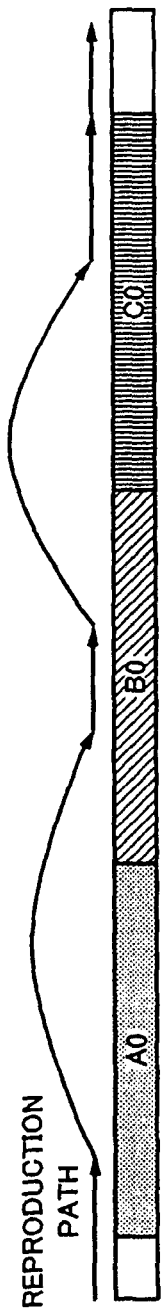
Fig. 62A
Fig. 62B

APPARATUS AND REPRODUCING METHOD, FOR REPRODUCING CONTENT DATA RECORDED ON A RECORDING MEDIUM

CROSS-REFERENCE TO RELATED APPLICATIONS

This application is a division of and claims the benefit of priority under 35 U.S.C. §120 from U.S. application Ser. No. 10/519,422, filed Dec. 23, 2004, which is the national stage application of PCT/JP04/05805, filed Apr. 22, 2004, and claims the benefit of priority under 35 U.S.C. §119 from Japanese Patent Application No. 2003-121595, filed Apr. 25, 2003. The entire contents of each of the above applications are incorporated herein by reference.

BACKGROUND OF THE INVENTION

1. Technical Field

The present invention relates to a reproducing apparatus, a reproducing method, a reproducing program, and a recording medium that allow a user to interactively operate a program recorded on a large capacity recording medium such as a blu-ray disc.

2. Background Art

In recent years, as a standard for a recordable disc type recording medium that is detachable from a recording and reproducing apparatus, a blu-ray disc standard has been proposed. The blu-ray disc standard prescribes a disc that has a recording medium having a diameter of 12 cm and a cover layer having a thickness of 0.1 mm. The blu-ray disc standard uses a bluish-purple laser having a wavelength of 405 nm and an objective lens having a numerical aperture of 0.85. The blu-ray disc standard accomplishes a recording capacity of 27 GB (Giga bytes) maximum. As a result, a program of a BS digital high-vision broadcast available in Japan can be recorded for two hours or longer without deterioration of picture quality.

As sources (supply sources) of AV (Audio/Video) signals recorded on the recordable optical disc, an analog signal of for example a conventional analog television broadcast and a digital signal of for example a digital television broadcast such as a BS digital broadcast will be used. The blu-ray disc standard has established a method for recording AV signals of such broadcasts.

As a derivative standard of the current blu-ray disc standard, a reproduction-only recording medium on which a movie, music, or the like is prerecorded is being developed. As a disc-shaped recording medium on which a movie or music is prerecorded, DVD (Digital Versatile Disc) has been widely used. The reproduction-only optical disc in accordance with the blu-ray disc standard is largely different from and superior to the conventional DVD in a large recording capacity and a high speed transfer speed that allow a high-vision picture to be recoded for two hours or longer in high quality.

The current blu-ray disc standard prescribes neither a method for displaying a list of video contents of a disc on a screen nor a user interface function for allowing a user to move a cursor on the list and select a video content that he or she wants to reproduce from the list. These functions are accomplished by a recording and reproducing apparatus main unit that records and reproduces video contents to and from the blu-ray disc. Thus, even if a video content is reproduced from the same recording medium, the layout of the contents list screen depends on the recording and reproducing apparatus for use, and so does the user interface. Thus, the user cannot easily use the blu-ray disc. Thus, it is necessary to allow the reproduction-only disc to display a menu screen and so forth that the disc (contents) producer has designed, not depend on the reproducing apparatus.

A multiple story function of which a selection screen is displayed while a video content is being reproduced is generally called an interactive function. To accomplish the interactive function, it is necessary for the disc producer to create a scenario that he or she has designated a reproduction order and branches of the video content, describe the scenario using a program language, a script language, or the like, and record the described scenario on a disc. The reproducing apparatus side reads and executes the scenario. As a result, the reproducing apparatus reproduces a video content and displays selection screens that allow the user to select branches of the video content that the producer has designated.

The current blu-ray disc standard (blu-ray disc rewritable format ver 1.0) prescribes neither a method for composing a menu screen and a branch selection screen that a contents producer has designated, nor a method for describing a process for a user input. Currently, it is difficult to reproduce a video content from a blu-ray disc in accordance with a scenario that the producer has designated with compatibility irrespective of manufactures and models of reproducing apparatuses.

For a reproduction-only disc, the producer side desires a multiple angle function for allowing a user to select one of angles of an object photographed by a plurality of cameras so that the user can watch the object at his or her favorite angle. Thus, it is necessary to provide such a function.

The foregoing interactive function has been already accomplished in for example the DVD (Digital Versatile Disc) standard. In the DVD video, while a moving picture is being reproduced, a menu screen is called using for example a remote control commander. By selecting a button displayed on a menu screen, the user can perform a process for changing the current scene that is being reproduced. In addition, the DVD video also has a multiple angle function.

The user interface and interactive function that have been accomplished by conventional recording mediums such as DVDs have been also desired for large capacity recording mediums such as blu-ray discs as reproduction-only discs.

SUMMARY OF THE INVENTION

Therefore, an object of the present invention is to provide a reproducing apparatus, a reproducing method, a reproducing program, and a recording medium that allow a user interface with high flexibility for a large capacity recorded medium to be accomplished.

In addition, another object of the present invention is to provide a reproducing apparatus, a reproducing method, a reproducing program, and a recording medium that allow an enriched user interface for a large capacity recorded medium to be accomplished.

To solve the foregoing problem, the present invention is a reproducing apparatus for reproducing content data recorded on a disc shaped recording medium, the reproducing apparatus comprising: reading means for reading from the recording medium a video stream, a first flag described for each reproduction unit of the video stream, the number of angles that the reproduction unit contains, and position information that represents the positions of the angles on the video stream, the first flag representing whether or not the reproduction unit can be reproduced with a plurality of angles; and reproducing means for controlling the reading means so that the video stream that composes the angles is read in accordance with the position information.

In addition, the present invention is a reproducing method for reproducing content data recorded on a disc shaped recording medium, the reproducing method comprising the steps of: reading from the recording medium a video stream, a first flag described for each reproduction unit of the video stream, the number of angles that the reproduction unit contains, and position information that represents the positions of the angles on the video stream, the first flag representing whether or not the reproduction unit can be reproduced with a plurality of angles; and controlling the reading step so that the video stream that composes the angles is read in accordance with the position information.

In addition, the present invention is a reproducing program that causes a computer device to execute a reproducing method for reproducing content data recorded on a disc shaped recording medium, the reproducing method comprising the steps of: reading from the recording medium a video stream, a first flag described for each reproduction unit of the video stream, the number of angles that the reproduction unit contains, and position information that represents the positions of the angles on the video stream, the first flag representing whether or not the reproduction unit can be reproduced with a plurality of angles; and controlling the reading step so that the video stream that composes the angles is read in accordance with the position information.

In addition, the present invention is a disc shaped recording medium on which a reproducing program that can be read by a computer device has been recorded, the reproducing program causing the computer device to execute a reproducing method for reproducing content data recorded on the recording medium, the reproducing method comprising the steps of: reading from the recording medium a video stream, a first flag described for each reproduction unit of the video stream, the number of angles that the reproduction unit contains, and position information that represents the positions of the angles on the video stream, the first flag representing whether or not the reproduction unit can be reproduced with a plurality of angles; and controlling the reading step so that the video stream that composes the angles is read in accordance with the position information.

In addition, the present invention is a disc shaped recording medium on which content data has been recorded, wherein a video stream, a first flag described for each reproduction unit of the video stream, the number of angles that the reproduction unit contains, and position information that represents the positions of the angles on the video stream have been recorded on the recording medium, the first flag representing whether or not the reproduction unit can be reproduced with a plurality of angles, and wherein the video stream that composes the angles is read in accordance with the position information.

In addition, the present invention is a reproducing apparatus for reproducing content data recorded on a disc shaped recording medium, the reproducing apparatus comprising: reading means for reading from the recording medium a main stream mainly reproduced, a sub stream reproduced as a sub of the main stream along therewith, and a flag that represents whether or not the sub stream should be repeatedly reproduced not in synchronization with the main stream; and reproducing means for controlling the reproduction of the sub stream in accordance with the flag.

In addition, the present invention is a reproducing method for reproducing content data recorded on a disc shaped recording medium, the reproducing method comprising the steps of: reading from the recording medium a main stream mainly reproduced, a sub stream reproduced as a sub of the main stream along therewith, and a flag that represents whether or not the sub stream should be repeatedly reproduced not in synchronization with the main stream; and controlling the reproduction of the sub stream in accordance with the flag.

In addition, the present invention is a reproducing program that causes a computer device to execute a reproducing method for reproducing content data recorded on a disc shaped recording medium, the reproducing method comprising the steps of: reading from the recording medium a main stream mainly reproduced, a sub stream reproduced as a sub of the main stream along therewith, and a flag that represents whether or not the sub stream should be repeatedly reproduced not in synchronization with the main stream; and controlling the reproduction of the sub stream in accordance with the flag.

In addition, the present invention is a recording medium on which a reproducing program that can be read by a computer device has been recorded, the reproducing program that causes the computer device to execute a reproducing method for reproducing content data recorded on a disc shaped recording medium, the reproducing method comprising the steps of: reading from the recording medium a main stream mainly reproduced, a sub stream reproduced as a sub of the main stream along therewith, and a flag that represents whether or not the sub stream should be repeatedly reproduced not in synchronization with the main stream; and controlling the reproduction of the sub stream in accordance with the flag.

In addition, the present invention is a disc shaped recording medium on which content data has been recorded, wherein a main stream mainly reproduced, a sub stream reproduced as a sub of the main stream along therewith, and a flag have been recorded on the recording medium, the flag representing whether or not the sub stream should be repeatedly reproduced not in synchronization with the main stream, and wherein the reproduction of the sub stream is controlled in accordance with the flag.

In addition, the present invention is a reproducing apparatus for reproducing content data recoded on a disc shaped recording medium, the reproducing apparatus comprising: reading means for reading from the recording medium video data, audio data reproduced in accordance with the video data, and a flag that represents whether the video data and the audio data have been recorded as a multiplexed file or independent files; and reproducing means for reproducing the video data and the audio data that are read by the reading means in accordance with the flag that is read by the reading means.

In addition, the present invention is a reproducing method for reproducing content data recoded on a disc shaped recording medium, the reproducing method comprising the steps of: reading from the recording medium video data, audio data reproduced in accordance with the video data, and a flag that represents whether the video data and the audio data have been recorded as a multiplexed file or independent files; and reproducing the video data and the audio data that are read at the reading step in accordance with the flag that is read at the reading step.

In addition, the present invention is a reproducing program that causes a computer device to execute a reproducing method for reproducing content data recoded on a disc shaped recording medium, the reproducing method comprising the steps of: reading from the recording medium video data, audio data reproduced in accordance with the video data, and a flag that represents whether the video data and the audio data have been recorded as a multiplexed file or independent files; and reproducing the video data and the audio data that are read at the reading step in accordance with the flag that is read at the reading step.

In addition, the present invention is a recording medium on which a reproducing program that can be read by a computer device has been recorded, the reproducing program causing the computer device to execute a reproducing method for reproducing content data recoded on a disc shaped recording medium, the reproducing method comprising the steps of: reading from the recording medium video data, audio data reproduced in accordance with the video data, and a flag that represents whether the video data and the audio data have been recorded as a multiplexed file or independent files; and reproducing the video data and the audio data that are read at the reading step in accordance with the flag that is read at the reading step.

In addition, the present invention is a disc shaped recording medium on which content data has been recorded, wherein video data, audio data reproduced in accordance with the video data, and a flag have been recorded on the recording medium, the flag representing whether the video data and the audio data have been recorded as a multiplexed file or independent files, and wherein the video data and the audio data that are read at the reading step are reproduced in accordance with the flag that is read at the reading step.

As described above, according to the present invention, since a video stream, a first flag that is described in each reproduction unit and that represents whether or not each reproduction unit can be reproduced with a plurality of angles, the number of angles of each reproduction unit, and position information that represents the position of each angle on the video stream have been recorded on the recording medium, a video stream that composes an angle can be read in accordance with position information. Thus, while a video stream of each reproduction unit being reproduced, the current angle can be switched to another angle.

In addition, according to the present invention, since a main stream that is mainly reproduced, a sub stream that is reproduced along with the main stream, and a flag that represents whether or not the sub stream should be asynchronously and repeatedly reproduced not along with the main stream are recorded and the reproduction of the sub stream is controlled in accordance with the flag, while the main stream is being reproduced, the sub stream can be asynchronously and repeatedly reproduced not along with the main stream.

In addition, according to the present invention, since video data, audio data reproduced in accordance therewith, and a flag that represents at least whether the video data and audio data have been multiplexedly or independently recorded are recorded and the video data and audio data are reproduced in accordance with the flag, the reading method for video data and audio data can be controlled in accordance with the flag.

BRIEF DESCRIPTION OF DRAWINGS

FIG. 5 is a schematic diagram showing a syntax that describes an example of a structure of a file "info.bdav";

FIG. 6 is a schematic diagram showing a syntax that describes an example of a structure of a block UIAppInfoBDAV( );

FIG. 7 is a schematic diagram describing a syntax that describes an example of a structure of a block TableOfPlayLists( );

FIG. 8 is a schematic diagram showing a syntax that describes an example of a structure of files "#####.rpls" and "#####.vpls";

FIG. 9 is a schematic diagram showing a syntax that describes an example of a structure of a block UIAppInfoPlayList( );

FIG. 10 is a schematic diagram showing a syntax that describes an example of a structure of a block PlayList( );

FIG. 11 is a schematic diagram showing a syntax that describes an example of a structure of a block PlayItem( );

FIG. 13 is a schematic diagram showing a syntax that describes an example of a structure of a block PlayListMark( );

FIG. 14 is a schematic diagram showing a syntax that describes an example of a structure of a file "%%%%%.clpi";

FIG. 18 is a schematic diagram showing an example of input and output data of a palette;

FIG. 19 is a schematic diagram showing an example of a palette table held in a palette;

FIG. 26A and FIG. 26B are flow charts schematically describing an operation of a BD virtual player 30 in accordance with commands described in a scenario;

FIG. 27A and FIG. 27B are flow charts describing reproducing operations in accordance with play lists;

FIG. 28A, FIG. 28B, FIG. 28C, FIG. 28D, FIG. 28E, FIG. 28F, FIG. 28G, and FIG. 28H are schematic diagrams showing examples of commands used in a scenario;

FIG. 30 is a schematic diagram showing a syntax that describes an example of a structure of a file "scenario.hdmv";

FIG. 31 is a schematic diagram showing a syntax that describes an example of a data structure of a block Autoplay( );

FIG. 32 is a schematic diagram showing a syntax that describes an example of a structure of a block Scenario( );

FIG. 33 is a schematic diagram showing a syntax that describes an example of a data structure of a file "entry-list.data";

FIG. 34 is a schematic diagram showing a syntax that describes an example of a structure of a block AppInfo( );

FIG. 35 is a schematic diagram showing a syntax that describes an example of a structure of a block Scenario-Entry( );

FIG. 36 is a schematic diagram showing a syntax that describes an example of a structure of a file "xxxx.mpls";

FIG. 37 is a schematic diagram showing a syntax that describes an example of a structure of a block PLCpntrolInfo( );

FIG. 38 is a schematic diagram that describes a field PL_Playback_type;

FIG. 39 is a schematic diagram that describes a field PL_random_access_mode;

FIG. 40 is a schematic diagram showing a syntax that describes an example of a structure of a block PlayList( );

FIG. 41 is a schematic diagram showing a syntax that describes an example of a structure of a block PlayItem( );

FIG. 42 is a schematic diagram describing a field PI_random_access_mode;

FIG. 43 is a schematic diagram describing a field still_mode;

FIG. 44 is a schematic diagram describing a field is_seamless_angle_change;

FIG. 45 is a schematic diagram showing a syntax that describes an example of a structure of a block SubPlayItem( );

FIG. 46 is a schematic diagram describing a field is_repeat_flag;

FIG. 48 is a schematic diagram showing a syntax that describes an example of a structure of a file "zzzzz.clpi";

FIG. 49 is a schematic diagram showing a syntax that describes an example of a structure of a block ClipInfo( );

FIG. 50 is a schematic diagram describing a field application_type;

FIG. 51 is a schematic diagram showing a syntax that describes an example of a structure of a block SequenceInfo( );

FIG. 52 is a schematic diagram showing a syntax that describes an example of a structure of a block ProgramInfo( );

FIG. 53 is a schematic diagram showing a syntax that describes an example of a structure of a block StreamCodingInfo( );

FIG. 54 is a schematic diagram showing a syntax that describes an example of a structure of a block CPI( );

FIG. 55 is a schematic diagram describing a field CPI_type;

FIG. 56 is a schematic diagram showing a syntax that describes an example of a structure of a block EP_map_for_HDMV( );

FIG. 60A and FIG. 60B are schematic diagrams showing a plurality of angle switchable points described in one interleave unit;

FIG. 61 is a schematic diagram describing a flag is_angle_change_point;

FIG. 62A and FIG. 62B are schematic diagrams showing an example of a nonseamless multiple angle block;

DESCRIPTION OF THE PREFERRED EMBODIMENTS

Next, an embodiment of the present invention will be described. According to an embodiment of the present invention, based on the blu-ray disc standard (blu-ray disc rewritable format ver 1.0), which is a standard for recording and reproducing data, functions necessary for a reproduction-only disc such as an interactive function and a multiple angle function are accomplished.

First of all, for easy understanding of the present invention, a management structure as prescribed in "Blu-ray Disc Rewritable Format Ver 1.0 part 3 Audio Visual Specification) for contents namely AV (Audio/Video) data prerecorded on a blu-ray disc will be described. In the following description, the management structure is referred to as BDAV format.

A bit stream that has been encoded in accordance with an encoding system such as MPEG (Moving Pictures Experts Group) video or MPEG audio and multiplexed in accordance with MPEG-2 system is referred to as clip AV stream (or simply AV stream). The clip AV stream is recorded as a file on a disc by a file system defined in "Blu-ray Disc Rewritable Format Ver 1.0 part 2" for a blu-ray disc. This file is referred to as clip AV stream file (or simply AV stream).

A clip AV stream file is a management unit on the file system. Thus, it cannot be said that a clip AV stream file is a management unit that the user can easily understand. From a view point of user's convenience, it is necessary to record information necessary for combining a video content that has been divided into a plurality of clip AV stream files and reproducing the combined video content, information necessary for reproducing only a part of a clip AV stream file, information necessary for smoothly performing a special reproduction and a search reproduction, and so forth as a database. "Blu-ray Disc Rewritable Format Ver. 1.0 part 3" as a standard for a blu-ray disc prescribes such a database.

Figure 1:
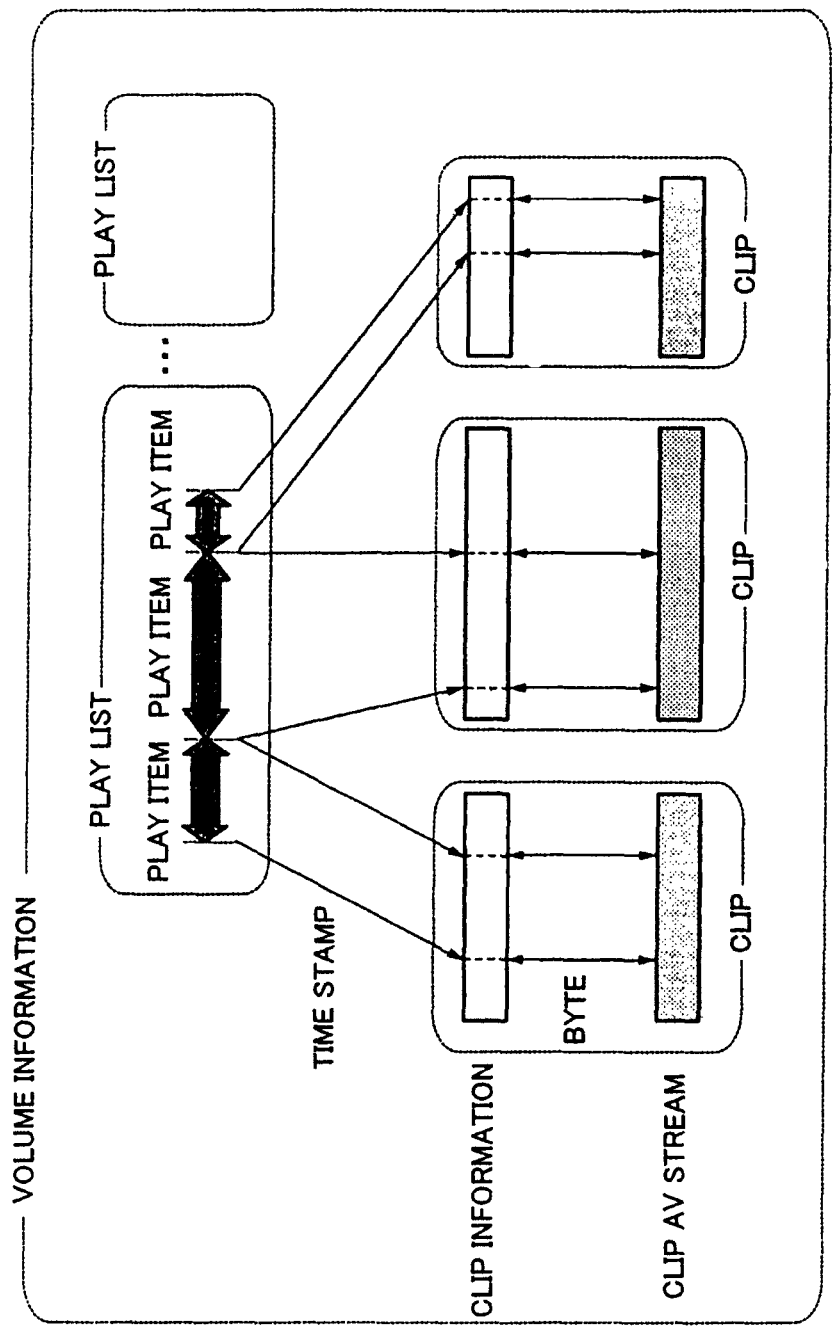
FIG. 1 is a schematic diagram showing a mechanism for designating a reproduction order of an AV stream file.

FIG. 1 schematically shows a mechanism for designating a part of all an AV stream file, arranging only desired portions thereof, and reproducing the arranged portions. In FIG. 1, a play list (PlayList) causes a part or all an AV stream file to be designated and only desired portions thereof to be reproduced. When the user reproduces a content, he or she select it in the unit of a play list. A play list is one video/audio unit in which the user implicitly expects that a content will be successively reproduced.

The simplest structure of a play list is composed of one AV stream file after recording of a content is started until the recording is stopped. Unless the AV stream file is edited, it becomes one play list A play list is composed of information that represents an AV stream file to be reproduced and sets of reproduction start points and reproduction stop points that designate reproduction start positions and reproduction stop positions of the AV stream file. A pair of information of a reproduction start point and information of a reproduction stop point is referred to as play item (PlayItem). A play list is composed of a set of play items. When a play item is reproduced, a part of the AV stream file referred from the play item is reproduced.

As described above, a clip AV stream is a bit stream of which video data and audio data have been multiplexed in the format of an MPEG2 TS (Transport Stream). Information about the clip AV stream is recorded as clip information to a file.

A set of a clip AV stream file and a clip information file that has corresponding clip information is treated as one object and referred to as clip. A clip is one object that is composed of a clip AV stream and clip information.

A file is generally treated as a sequence of bytes. A content of a clip AV stream file is expanded on the time base. An entry point in a clip is regularly designated on the time base. When a time stamp of an access point to a predetermined clip is given, a clip information file can be used to find information of an address from which data is read in a clip AV stream file.

All play lists and clips recorded on one disc are managed with volume information.

Figure 2:
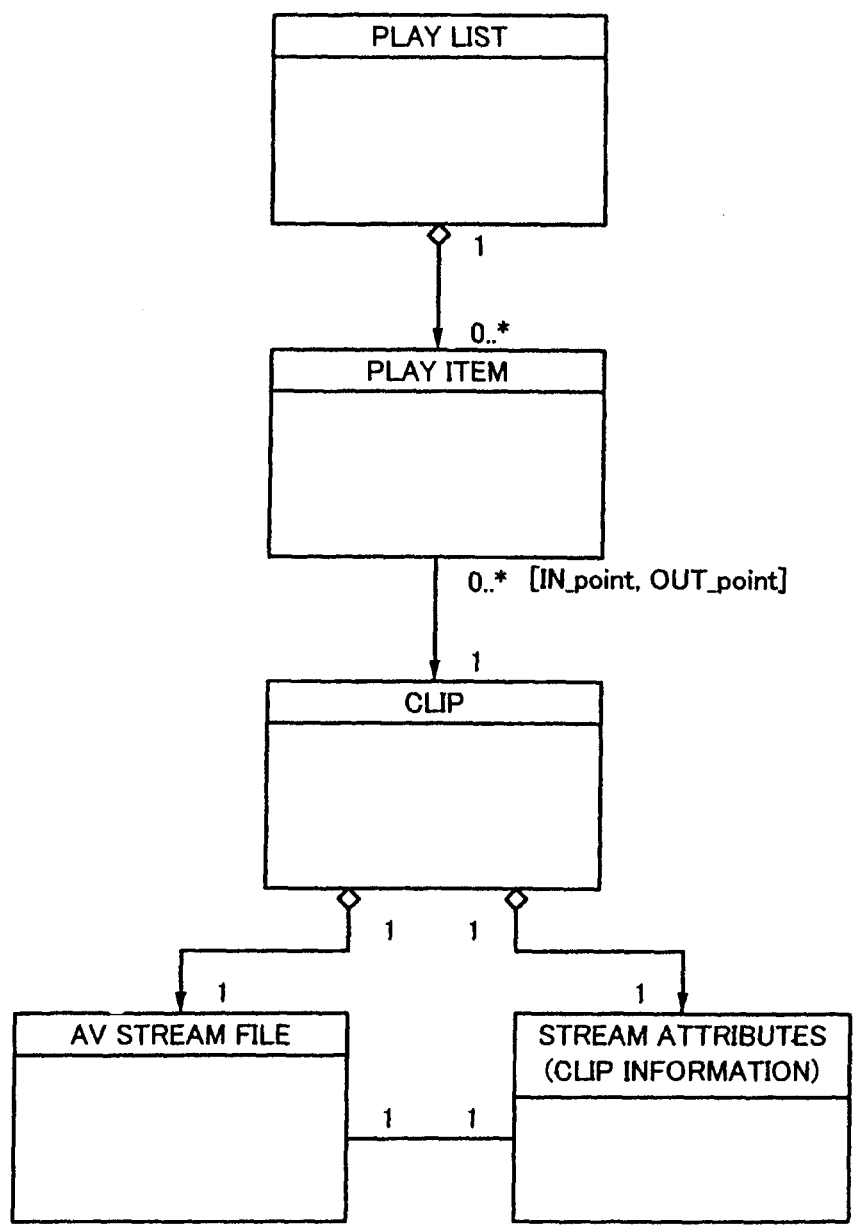
FIG. 2 is a UML diagram showing the relation of a clip AV stream, clip information, a clip, a play item, and a play list.

FIG. 2 shows a UML (Unified Modeling Language) diagram that represents the relation of the foregoing clip AV stream, clip information (stream attributes), clips, play items, and play list. One play list is correlated with one or a plurality of play items. One play item is correlated with one clip. One clip may be correlated with a plurality of play items whose start points and/or end points are different. One clip AV stream file is referenced from one clip. One clip information file is referenced from one clip. One clip AV stream file and one clip information file are correlated with the relation of one to one. With such a structure defined, a reproduction order can be non-destructively designated by reproducing only any part, not changing a clip AV stream file.

Figure 3:
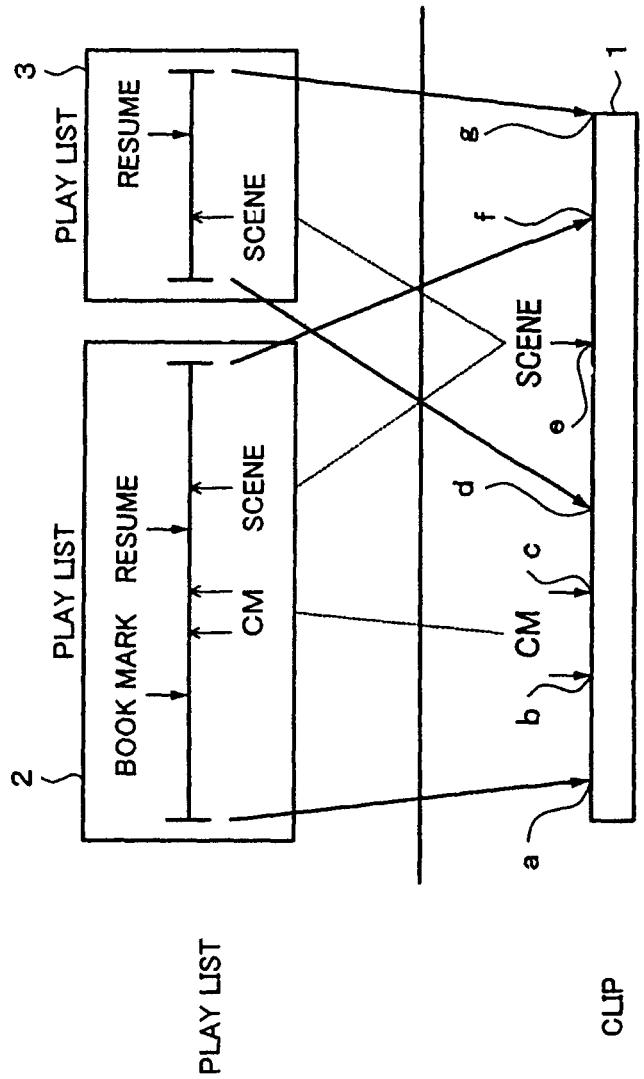
FIG. 3 is a schematic diagram describing a method for referencing the same clip from a plurality of play lists.

As shown in FIG. 3, the same clip can be referenced from a plurality of play lists. In the example shown in FIG. 3, a clip 1 is referenced from two play lists 2 and 3. In FIG. 3, the horizontal direction of the clip 1 represents the time base. The play list 2 references regions a to f of the clip 1 that include commercial message regions b and c and a scene e. The play list 3 references regions d to g of the clip 1 that include a scene e. When the play list 2 is designated, the regions a to f of the clip 1 can be reproduced. When the play list 3 is designated, the regions d to g of the clip 1 can be reproduced.

Figure 4:
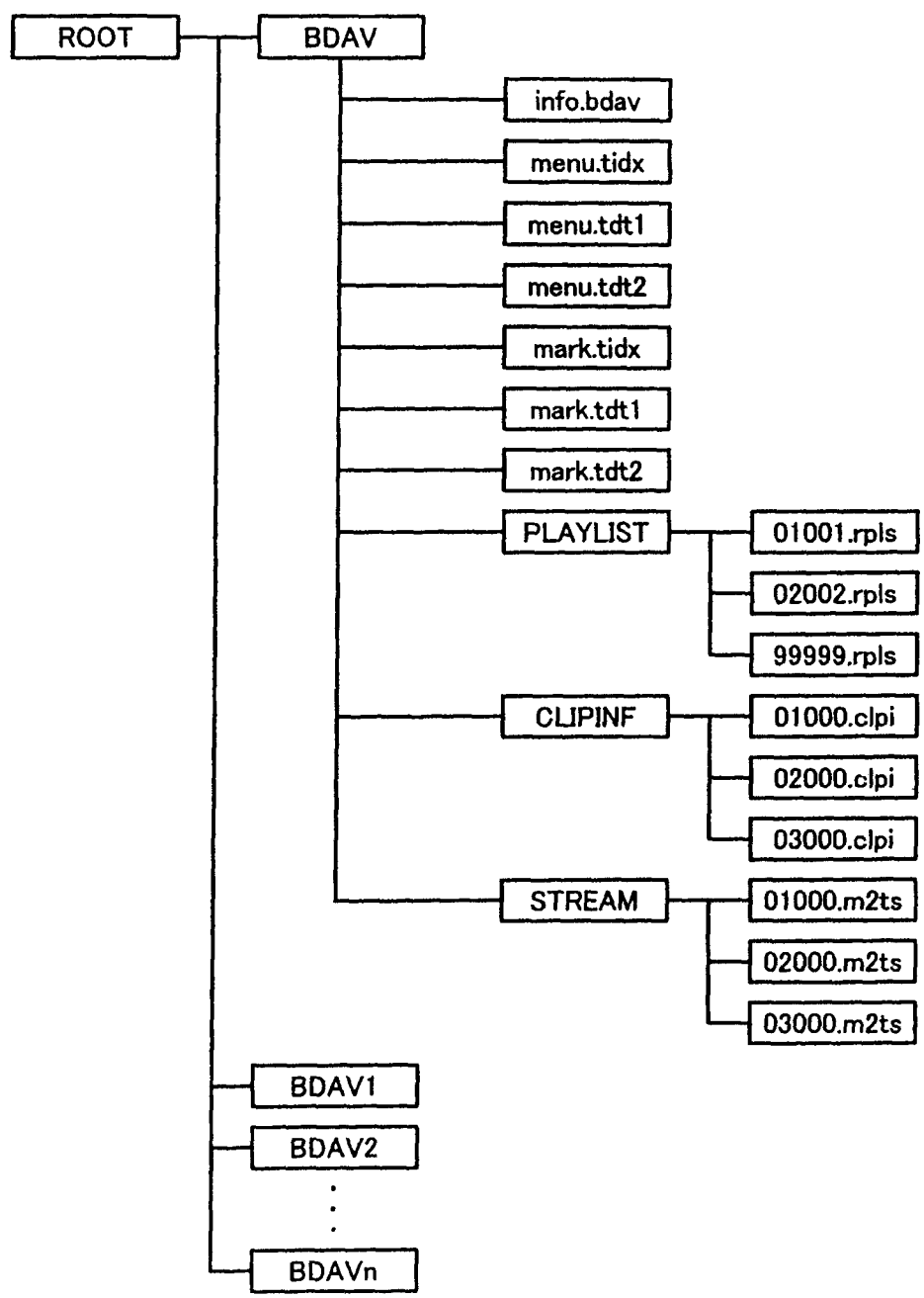
FIG. 4 is a schematic diagram describing a management structure of files recorded on a recording medium.

Next, with reference to FIG. 4, a management structure for files recorded on a recording medium prescribed in "Blu-ray Disc Rewritable Format Ver 1.0 part 3" will be described. Files are hierarchically managed in a directory structure. One directory (a root directory in the example shown in FIG. 4) is created on the recording medium. Under the directory, files are managed by one recording and reproducing system.

Under the root directory, a directory BDAV is placed. As shown in FIG. 4, a plurality of directories such as directories BDAV, BDAV1, BDAV2, . . . , BDAVn can be placed. In the following description, the plurality of directories BDAV, BDAV1, BDAV2 . . . , and BDAVn are represented by the directory BDAV. Only the representative directory BDAV will be described.

Under the directory BDAV, the following six types of files are placed.
(1) info.bdav
(2) menu.tidx, mark.tidx
(3) menu.tdt1, menu.tdt2, mark.tdt1, mark.tdt2
(4) #####.rpls, #####.vpls
(5) %%%%%.clpi
(6) ***.m2ts In the files "#####.rpls" and "#####.vpls" categorized as (4), "#####" represents any number. In the file "%%%%%.clpi" categorized as (5), "%%%%%" represents any number. In the file "*.m2ts" categorized as (6), "*" represents a number of which a file "*.m2ts" corresponds to a file "%%%%%.clpi" with the relation of one to one. A number "***" can be the same as a number "%%%%%".

The file "info.bdav" categorized as (1) is a file that has information of all the directory BDAV. The files "menu.tidx" and "mark.tidx" categorized as (2) are files that have information of thumbnail pictures. The files "menu.tdt1", "menu.tdt2", "mark.tdt1", and "mark.tdt2" categorized as (3) are files that have thumbnail pictures. The extensions "tdt1" and "tdt2" of those files represent whether or not data of thumbnail pictures in those files have been encrypted.

The files "#####.rpls" and "#####.vpls" categorized as (4) are files that have information of play lists. The files "#####.rpls" and "#####.vpls" are placed under the directory PLAYLIST, which is placed under the directory BDAV.

The file "%%%%%.clpi" categorized as (5) is a file that has clip information. The file "%%%%%.CLP" is placed under the directory CLIPINF, which is placed under the directory BDAV. The file "***.m2ts" categorized as (6) is a clip AV stream file that has a clip AV stream. A clip AV stream file is correlated with one clip information file "%%%%%.clpi" with a file name number "*". The file "***.m2ts" is placed under the directory STREAM, which is placed under the directory BDAV.

Next, each file will be described in detail. The file "info.bda" categorized as (1) is only one file placed under the directory BDAV. FIG. 5 shows a syntax that describes an example of a structure of the file "info.bdav". The syntax is represented by a descriptive method of C language, which is used as a program descriptive language for computer devices. This applies to drawings that show other syntaxes.

In FIG. 5, the file "info.bdav" is divided into blocks corresponding to functions. A field type_indicator describes a character string "BDAV" that describes that the file is "info.bdav". A field version_number represents a version of the file "info.bdav". A block UIAppInfoBDAV( ) describes information about information placed under the directory DBAV. A block TableOfPlayList( ) describes information about the arrangement of the play list. A block MakersPrivateData( ) describes unique information of the maker of the recording and reproducing apparatus.

Addresses that represent the beginnings of individual blocks are described at the beginning of the file "info.bdav". For example, a field TableOfPlayLists_Start_address represents the start position of the block "TableOfPlayLists( )" with the number of relative bytes in the file.

FIG. 6 shows a syntax that describes an example of a structure of a block UIAppInfoBDAV( ). A field length represents the length immediately after the field length until the end of the block UIAppInfoBDAV( ) in bytes. A field BDAV_character_set represents a character set of a character sequence described in a field BDAV_name of the block UIAppInfoBDAV( ). As a character set, ASCII, Unicode, or the like can be selected.

A flag BDAV_protect_flag describes whether or not the user is unconditionally permitted to watch a content placed under the directory BDAV. When the flag has been set to "1" and the user has input a correct PIN (Personal Identification Number), he or she is permitted to watch a content placed under the directory BDAV. In contrast, when the flag BDAV_protect_flag has been set to "0", even if the user does not input his or her PIN, he or she is permitted to watch a content placed under the directory BDAV.

The personal identification number PIN is described in a field PIN. The personal identification number PIN is composed of for example a four-digit number, each digit ranging from 0 to 9. The personal identification number PIN represents a personal identification number that is required when the reproduction control is validated. Digits of the personal identification number PIN are encoded in accordance with for example ISO (International Organization for Standardization)/IEC (International Electrotechnical Commission) 646 standard.

With the foregoing information described in the block UIAppInfoBDAV( ), the reproduction restriction for the directory BDAV is prescribed. As will be described later, the reproduction restriction for each play list is prescribed with a flag playback_control_flag defined in the block UIAppInfoPlayList( ) described in the files "#####.rpls" and "#####.vpls".

In the example, to resume reproducing a content placed under the directory BDAV, a resume function can be used. The resume function allows a play list of a content to be reproduced in priority to be designated. It is assumed that the resume function is used when the user wants to resumes reproducing a content from the last stop position.

In FIG. 6, a flag resume_valid_flag describes whether the resume function is valid/invalid. When the value of the flag has been set to "0", the resume function is invalid. When the value of the flag has been set to "1", the resume function is valid. At that point, a play list designated by a field resume_PlayList_file_name is treated as a play list to be reproduced in priority.

A field ref_to_menu_thumbnail_index is a region that describes a thumbnail number that identifies a thumbnail picture that typifies the directory BDAV. In the blu-ray disc standard, a still picture that typifies the directory BDAV is referred to as menu thumbnail. A thumbnail picture that has an index thumbnail_index described in the field ref_to_menu_thumbnail_index is the menu thumbnail of the directory BDAV.

A field BDAV_name_length represents the byte length of the name of the directory BDAV described in a field BDAV_name. The number of bytes represented in the field BDAV_name_length is valid for the character string of the field BDAV_name that represents the name of the directory BDAV. The rest of the byte sequence after the valid character string represented by the field BDAV_name_length may have any value.

FIG. 7 shows a syntax that describes an example of a structure of a block TableOfPlayLists( ). A field number_of_PlayLists represents the number of play lists placed under the directory BDAV. The number of play lists is referred to as loop variable. The field number_of_PlayLists is followed by a loop of a "for" statement. The "for" statement describes play lists represented by a field PlayList_file_name. The play lists are displayed on a play list table display screen or the like. A play list is designated with a file name such as "#####.rpls" or "#####.vpls" in the field PlayList_file_name.

As described above, the files "#####.rpls" and "#####.vpls" are placed under the directory PLAYLIST. These files correspond to individual play lists in the relation of one to one.

FIG. 8 shows a syntax that describes an example of a structure of the files "#####.rpls" and "#####.VPLS". In FIG. 8, the files "#####.rpls" and "#####.vpls" each have blocks corresponding to functional information. A field type_indicator describes a character string that represents the file. A field version_number represents a version of the file.

A block UIAppInfoPlayList( ) describes attribute information of the play list. A block PlayList( ) describes information about play items that compose the play list. A block PlayListMark( ) describes information about a mark added to the play list. A block MakersPrivateData( ) describes maker's unique information of the apparatus that has recorded the play list file. Fields PlayList_start_address, PlayListMark_start_address and MakersPrivateData_start_address are placed at the beginning of each of the files "#####.rpls" and "#####.vpls". These fields describe the start addresses of the corresponding blocks as address information of 32 bits.

Since the start address of each block is described at the beginning of each of the files "#####.rpls" and "#####.vpls", data padding_word of any length can be placed before each block and/or after each block. However, the start position of the block UIAppInfoPlayList( ), which is the first block of each of the files "#####.rpls" and "#####.vpls", is fixed at the 320-th byte from the beginning of each of these files.

FIG. 9 shows a syntax that describes an example of a structure of a block UIAppInfoPlayList( ). The block UIAppInfoPlayList( ) describes various types of attribute information about the play list. The attribute information is not directly used for reproducing the play list. A field PlayList_character_set describes a character set of character string information about the play list.

A flag playback_control_flag describes whether or not display of information and reproduction of a play list are restricted in accordance with a personal identification number PIN. When the value of the flag playback_control_flag is for example "1", unless the user inputs a correct personal identification number PIN, information such as a thumbnail picture of a play list cannot be displayed and the play list cannot be reproduced. A flag write_protect_flag is an erase prohibition flag. It is necessary to structure the user interface so that when the value of the flag write_protect_flag is "1", the user cannot easily erase the play list. A flag is_played_flag describes that the play list has been reproduced. A flag is_edited_flag describes that the play list has been edited.

A field time_zone represents a time zone of which the play list was recorded. A field record_time_and_date represents the date and time on and at which the play list was recorded. A field PlayList_duration represents the reproduction duration of the play list.

Fields maker_ID and maker_model_code describe information that identifies a maker and a model of the recording apparatus that last updated the play list. The fields maker_ID and maker_model_code are for example numbers. A field channel_number represents a channel number of a recorded clip AV stream. A field channel_name represents a channel name. A field channel_name_length represents the length of the channel name described in the field channel_name. In the field channel_name, a character string having the length described in the field channel_name_length is valid. A field PlayList_name represents a play list name having an effective length of a value described in the field PlayList_name_length. A field PlayList_detail describes detailed information of the play list having an effective length of a value described in the field PlayList_detail_length.

FIG. 10 shows a syntax that describes an example of a structure of a block PlayList( ). A field length describes the length of bytes immediately after the field length until the end of the block PlayList( ). A field PL_CPI_type describes the type of CPI (Characteristic Point Information) of the play list. A field number_of_PlayItems describes the number of play items that compose the play list. A field number_of_SubPlay- Items describes the number of play items for after-recording audio (sub play items) added to the play list. In short, a play list can have a sub play item when the play list satisfies a predetermined condition.

A block PlayItem( ) describes information of a play item. A block SubPlayItem( ) describes information of a sub play item.

FIG. 11 shows a syntax that describes an example of a structure of a block PlayItem( ). A field Clip_Information_file_name describes a character string of a file name of a clip information file (that is a file having an extension clpi) has the relation of one to one with a clip that the play item references. The clip information file is a file having an extension "clpi".

A field Clip_codec_identifier describes an encoding system of a clip that the play item references. In the example, the field Clip_codec_Identifier is fixed to a value "M2TS". A field connection_condition describes information of how this play item is connected to the next play item. The field connection_condition describes whether or not play items can be seamlessly reproduced.

A field ref_to_STC_id designates a sequence STC_sequence of a clip that the play item references. The sequence STC_sequence is a unique structure of the blu-ray disc standard. The structure represents a range of which a PCR (Program Clock Reference) that is a reference of an MPEG2 TS (Transport Stream) is continuous on the time base. A number STC_id that is unique in the clip is assigned to the sequence STC_sequence. In the sequence STC_sequence, since a continuous time base can be defined, the start time and end time of a play item can be uniquely designated. The start point and end point of each play item should exist in the same sequence STC_sequence. A field ref_to_STC_id describes a sequence STC_sequence with a number STC_id.

Fields IN_time and OUT_time describe time stamps pts (presentation_time_stamp) of the start point and end point of the play item in the sequence STC_sequence, respectively.

Figure 12:
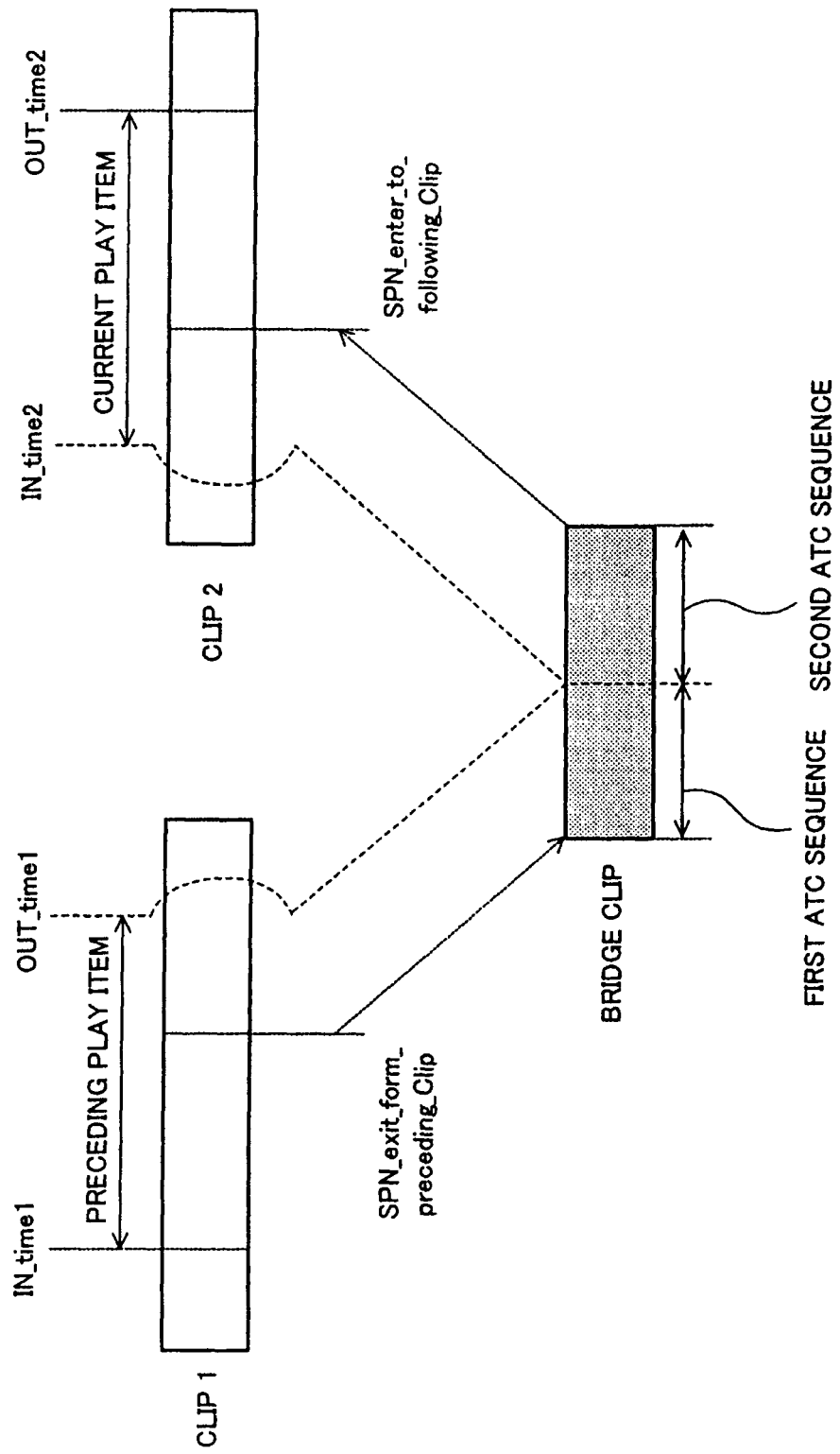
FIG. 12 is a schematic diagram describing a bridge clip.

A block BridgeSequenceInfo( ) describes information about a bridge clip (Bridge_Clip). As shown in FIG. 12, a bridge clip is a bit stream that is created when a function for seamlessly reproducing play items is accomplished. By reproducing a bridge clip instead of an original bit stream at a boundary of the preceding play item and the current play item, the two play items can be seamlessly reproduced. Since the function of the bridge clip does not relate to the present invention, the description will be omitted.

FIG. 13 shows a syntax that describes an example of a structure of a block PlayListMark( ). The block PlayListMark( ) has a data structure that describes information of a mark. A mark is a structure that describes time of a play list. With a mark, a function for setting a search point to a play list, a function for dividing a play list into chapters, and so forth are accomplished. Timing of display start and display stop of a picture on a graphics plane (that will be described later) can be designated with a mark.

A field length describes the length of bytes immediately after the field length until the end of the block PlayListmark( ). A field number_of_PlayList_marks describes the number of marks in a play list. One loop of a "for" statement represents information of one mark. A flag mark_invalid_flag describes whether or not the mark is valid. When the value of the flag mark_invalid_flag is "0", it describes that the mark is valid. When the value of the flag mark_invalid_flag is "1", it describes that although information of the mark exists in the database, the mark is an invalid mark that is transparent to the user.

A field mark_type describes the type of the mark. There are a mark that represents the position of a picture as a thumbnail picture (representative picture) of the play list, a resume mark that represents a position from which reproduction is resumed, a chapter mark that represents a search point, a skip mark that represents a region to be skipped and reproduced, a mark that represents read start timing of a graphics image, a mark that represents display start timing of a graphics image, a mark that represents display stop timing of a graphics image, and so forth.

A field mark_name_length represents a data length of a field mark_name (that will be described later). A field maker_ID describes a maker of a recording apparatus that created the mark. The field maker_ID is used to identify a mark unique to a maker. A field ref_to_PlayItem_id describes what play item has time designated by the mark. A field mark_time_stamp represents time designated by the mark.

A field entry_ES_PID describes what elementary stream the mark was added (namely, whether the mark was added to a stream of which picture data and/or sound data was encoded). A field ref_to_menu_thumbnail_index and a field ref_to_mark_thumbnail_index describe thumbnail pictures that visually represent marks. A thumbnail picture is for example a still picture that was extracted at time designated by the mark.

A field duration is used when a mark has a length on the time base. When a skip mark is used, the field duration describes for what duration the skip is performed.

A field makers_information is a region that describes information unique to the maker. A field mark_name is a region that describes a name that is assigned to a mark. The size of a mark is described in the foregoing field mark_name_length.

FIG. 14 shows a syntax that describes an example of a structure of a file "%%%%%.clpi". As described above, the file "%%%%%.clpi" is placed under the directory CLIPINF. The file "%%%%%.clpi" is created for each AV stream file (file "*****.m2ts"). The file "%%%%%.clpi" has blocks corresponding to fimctional information. A field type_indicator describes a character string that represents the file. A field version_number describes a version of the file.

A block ClipInfo( ) describes information about a clip. A block SequenceInfo( ) describes information about an incontinuous point of PCR that represents a time reference of a transport stream of the MPEG2 system. A block ProgramInfo( ) describes information about a program of the MPEG2 system. A block CPI( ) describes information about characteristic point information CPI that represents a characteristic portion in an AV stream. A block ClipMark( ) describes mark information that represents a search index point added to a clip and commercial start and/or end points. A block MakersPrivateData( ) describes information unique to a maker of a recording apparatus.

Address information that represents the beginning of each block in the file "%%%%%.clpi" is described as fields SequenceInfo_start_address, ProgramInfo_start_address, CPI_start_address, ClipMark_start_address, and MakersPrivateData_start_address. Since the clip file "%%%%%.clpi" does not relate to the present invention, the description will be omitted.

Since the BDAV format has the foregoing data structure, with a play list composed of play items that describe sets of start points and end points of portions to be reproduced in a clip AV stream, contents recorded on the disc can be managed in a reproduction unit that the user can recognize.

Next, an embodiment of the present invention will be described. According to the present invention, the foregoing BDAV format is extended for a format of a reproduction-only disc. First, a structure of a plane that accomplishes a menu screen for the contents of a disc will be described. Next, a scenario structure that allows the contents producer side to designate the reproduction order of a play list is added. For the scenario structure, data necessary for accomplishing functions such as a still (pause), a random shuffle reproduction, a multiple angle, and so forth that are characteristics of the reproduction-only disc and a method for storing such data will be described.

Figures 15, 16:
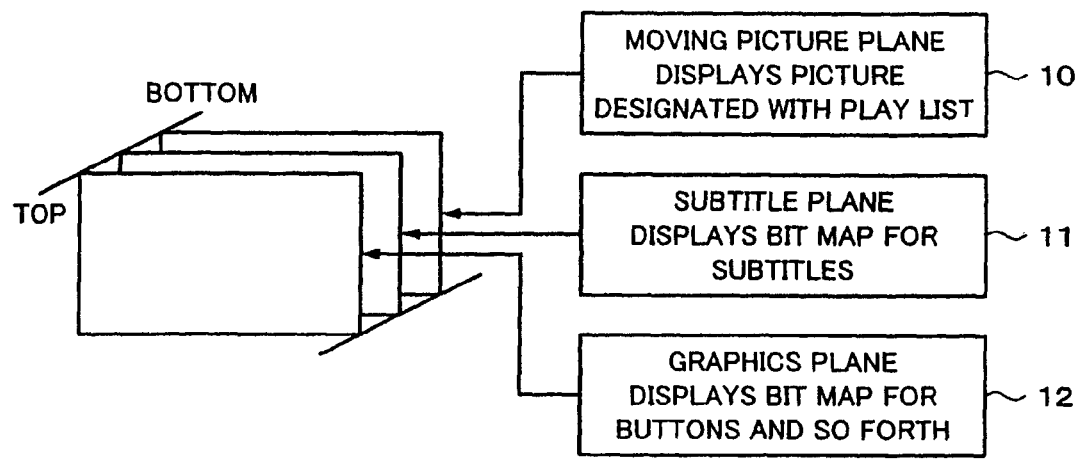
FIG. 15 is a schematic diagram showing an example of a structure of a plane used as a display system of an image according to an embodiment of the present invention.
FIG. 16 is a schematic diagram showing examples of resolutions and displayable colors of a moving picture plane, a subtitle plane, and a graphics plane.

According to the embodiment of the present invention, a plane structure as shown in FIG. 15 is used. A moving picture plane 10 is displayed on the rearmost side (bottom). The moving picture plane 10 deals with a picture (mainly, moving picture data) designated by a play list. A subtitle plane 11 is displayed above the moving picture plane 10. The subtitle plane 11 deals with subtitle data displayed while a moving picture is being reproduced. A graphics plane 12 is displayed on the most front. The graphics plane 12 deals with character data for a menu screen and graphics data such as bit map data for buttons. One display screen is composed of these three planes.

The difference between the embodiment of the present invention and the conventional DVD video is in that sub pictures for subtitles, a menu screen, buttons, and so forth are separated into the subtitle plane 11 and the graphics plane 12 so that the subtitles and buttons are independently controlled. In the conventional DVD video, graphics such as a menu screen and buttons and subtitles are controlled by the same mechanism. They are displayed on the same plane. The number of bit map pictures that can be displayed at the same time is limited to one. Thus, in the DVD video, a plurality of bit map pictures cannot be displayed at the same time. In contrast, according to the present invention, since the subtitle plane 11 and the graphics plane 12 are independently disposed for subtitles and graphics, respectively, the foregoing problem of the conventional DVD can be solved.

It can be thought that the subtitle plane 11 and the graphics plane 12 are an extension portion of conventional "Blu-ray Disc Rewritable Format Ver 1.0 part 3".

The moving picture plane 10, the subtitle plane 11, and the graphics plane 12 can be independently displayed. The moving picture plane 10, the subtitle plane 11, and the graphics plane 12 have resolutions and display colors as shown in FIG. 16. The moving picture plane 10 has a resolution of 1920 pixels×1080 lines, a data length of 16 bits per pixel, a color system of YCbCr (4:2:2), where Y represents a luminance signal and Cb and Cr represent color difference signals. YCbCr (4:2:2) is a color system having a luminance signal Y of eight bits per pixel and color difference signals Cb and Cr of eight bits each. With two horizontal pixels of the color difference signals Cb and Cr, data of one color data is composed.

The graphics plane 12 has a resolution of 1920 pixels×1080 lines, a sampling depth of eight bits per pixel, and a color system of eight-bit color map addresses using a palette of 256 colors. The subtitle plane 11 has a resolution of 1920 pixels×1080 lines, a sampling depth of eight bits per pixel, and a color system having eight-bit color map addresses using a palette of 256 colors.

The graphics plane 12 and the subtitle plane 11 can be alpha-blended in 256 levels. When the graphics plane 12 and the subtitle plane 11 are combined with another plane, the transparency can be set in 256 levels. The transparency can be set for each pixel. In the following description, the transparency $\alpha$ is represented in the range of ($0 \leq \alpha \leq 1$) where transparency $\alpha=0$ represents perfect transparent; transparency $\alpha=1$ represents perfect intransparent.

The subtitle plane 11 deals with picture data of PNG (Portable Network Graphics) format. Likewise, the graphics plane 12 can deal with picture data of the PNG format. In the PNG format, the sampling depth of one pixel is in the range from one bit to 16 bits. When the sampling depth is eight bits or 16 bits, an alpha channel, namely transparency information (referred to as alpha data) of each pixel component can be added. When the sampling depth is eight bits, transparency can be designated in 256 levels. With the transparency information of the alpha channel, alpha-blending is performed. A palette image of up to 256 colors can be used. An element (index) of the prepared palette can be represented with an index number.

Picture data dealt with the subtitle plane 11 and the graphics plane 12 is not limited to the PNG format. Alternatively, picture data that has been compression-encoded in accordance with for example JPEG system, picture data that has been run-length-compressed, or bit map data that has not been compression-encoded may be used.

Figure 17:
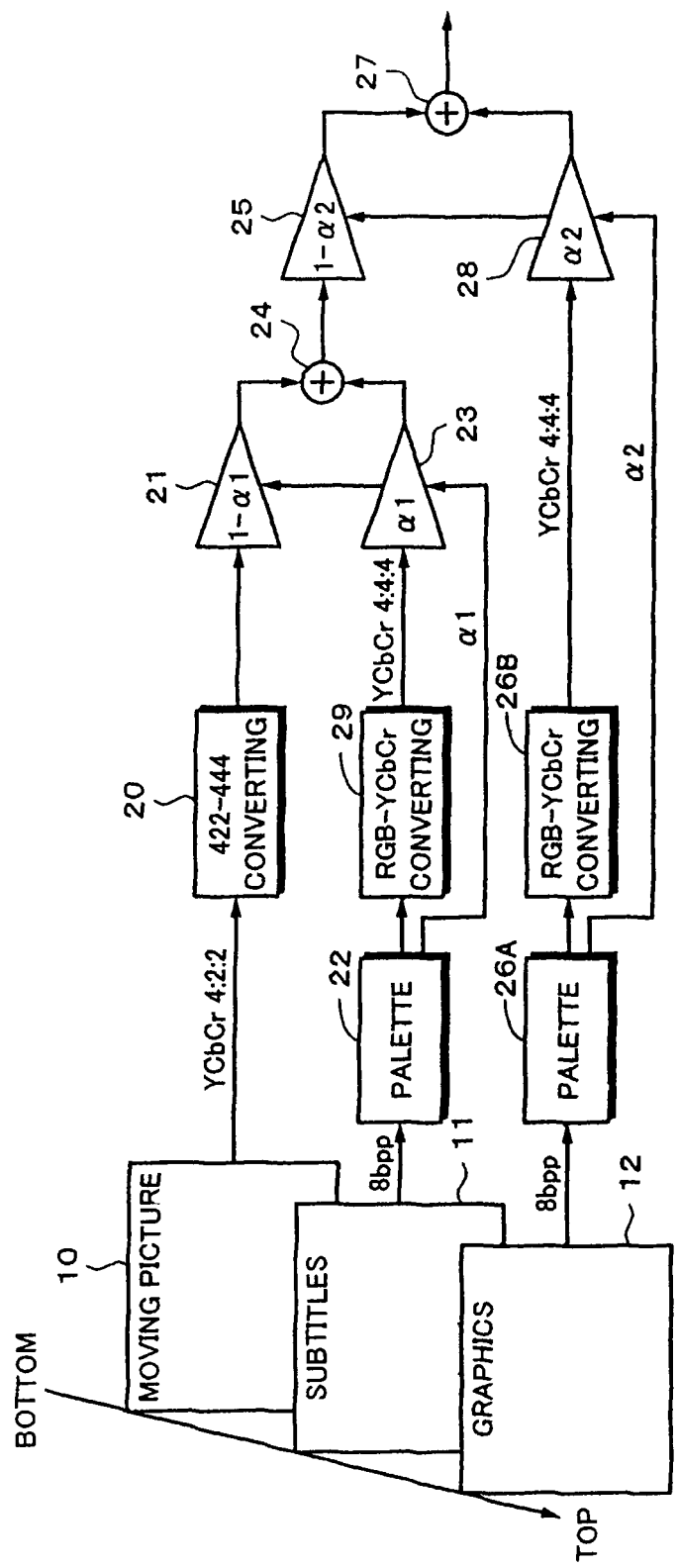
FIG. 17 is a block diagram showing an example of a structure that combines the moving picture plane, the subtitle plane, and the graphics plane.

FIG. 17 shows an example of a structure of which three planes are combined with reference to FIG. 15 and FIG. 16. Moving picture data of the moving picture plane 10 is supplied to a 422/444 converting circuit 20. The 422/444 converting circuit 20 converts the color system of the moving picture data from YCbCr (4:2:2) into YCbCr (4:4:4) and inputs the converted data to a multiplying device 21.

Picture data of the subtitle plane 11 is input to a palette 22. The palette 22 outputs picture data of RGB (4:4:4). When transparency of alpha-blending is designated, designated transparency $\alpha 1$ ($0 \leq \alpha 1 \leq 1$) is output from the palette 22.

FIG. 18 shows an example of input/output data of the palette 22. The palette 22 holds palette information as a table corresponding to for example a PNG format file. An index number is referenced as an address of picture data of input data of eight bits from the palette 22. In accordance with the index number, data of RGB (4:4:4) composed of data of eight bits each is output. In addition, data of the alpha-channel that represents transparency is obtained from the palette 22.

FIG. 19 shows an example of a palette table that the palette 22 has 256 color index values [0x00] to [0xFF] (where [0x] represents hexadecimal notation) are assigned three primary color values R, G, and B and transparency $\alpha$ each of which is represented with eight bits. The palette 22 references the palette table in accordance with the input PNG format picture data and outputs data of colors R, G, and B (RGB data) and transparency $\alpha$ of eight bits each for each pixel in accordance with an index value designated by the picture data.

The RGB data that is output from the palette 22 is supplied to an RGB/YCbCr converting circuit 29. The RGB/YCbCr converting circuit 29 converts the RGB data into a luminance signal Y and color difference signals Cb and Cr of eight bits each (hereinafter, they together are referred to as YCbCr data). This is because data of planes should be combined in the common data format. Data is unified to YCbCr data that is the data format of moving picture data.

The YCbCr data and the transparency data $\alpha 1$ that are output from the RGB/YCbCr converting circuit 29 are input to a multiplying device 23. The multiplying device 23 multiplies the input YCbCr data by the transparency data $\alpha 1$. The multiplied result is input to one input terminal of an adding device 24.

The multiplying device 23 multiplies each of the luminance signal Y and the color difference signals Cb and Cr of the YCbCr data by the transparency data $\alpha 1$. A complement ($1-\alpha 1$) of the transparency data $\alpha 1$ is supplied to the multiplying device 21.

The multiplying device 21 multiplies the moving picture data that is input from the 422/444 converting circuit 20 by the complement ($1-\alpha 1$) of the transparency data $\alpha 1$. The multiplied result is input to the other input terminal of the adding device 24. The adding device 24 adds the multiplied results of the multiplying device 21 and the multiplying device 23. As the result, the moving picture plane 10 and the subtitle plane 11 are combined. The added result of the adding device 24 is input to a multiplying device 25.

Like the subtitle plane 11, data of RGB (4:4:4) is output as picture data of the graphics plane 12 from the palette table 26A and input to an RGB/YCbCr converting circuit 26B. When the color system of picture data of the graphics plane 12 is RGB (4:4:4), it is converted into YCbCr (4:4:4) and output from an RGB/YCbCr converting circuit 27. The YCbCr data that is output from the RGB/YCbCr converting circuit 27 is input to a multiplying device 28.

When picture data of the graphics plane 12 is the PNG format, transparency data $\alpha 2$ ($0 \leq \alpha 2 \leq 1$) can be designated by each pixel in the picture data. The transparency data $\alpha 2$ is supplied to the multiplying device 28. The multiplying device 28 multiplies each of the luminance signal Y and the color difference signals Cb and Cr of the YCbCr data that is input from the RGB/YCbCr converting circuit 27 by the transparency data $\alpha 2$. The multiplied result of the multiplying device 28 is input to one input terminal of an adding device 29. A complement ($1-\alpha 2$) of the transparency data $\alpha 2$ is supplied to the multiplying device 25.

The multiplying device 25 multiplies the added result of the adding device 24 by the complement ($1-\alpha 2$) of the transparency data $\alpha 2$. The multiplied result of the multiplying device 25 is input to the other input terminal of the adding device 27. The adding device 27 adds the multiplied results of the multiplying device 25 and the multiplying device 28. As a result, the graphics plane 12 and the combined result of the moving picture plane 10 and the subtitle plane 11 are combined.

When the transparency $\alpha$ of a non-picture region of the subtitle plane 11 and the graphics plane 12 is designated to 0 ($\alpha=0$), a plane below those planes 11 and 12 becomes transparent. As a result, moving picture data on the moving picture plane 10 can be displayed as a background of the subtitle plane 11 and the graphics plane 12.

The structure shown in FIG. 17 can be accomplished by hardware or software.

With the foregoing planes designated, a menu screen and buttons necessary for the reproduction-only disc standard can be displayed. When a button is selected on the menu screen, a play list corresponding to the button is reproduced. At that point, information about a link of play lists should have been recorded on a disc. A scenario that defines a link of play lists will be described.

Figure 20:
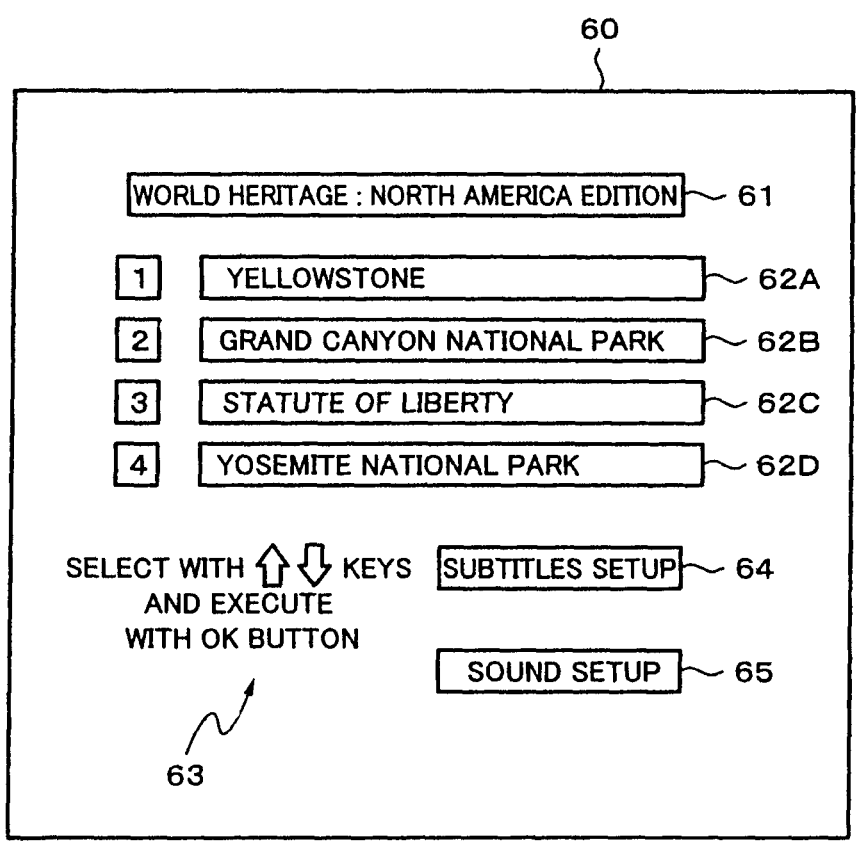
FIG. 20 is a schematic diagram showing an example of a menu screen displayed on the graphics plane.

A screen that prompts the user to perform an operation, for example, a menu screen, can be displayed on the graphics plane 12. FIG. 20 shows an example of a menu screen 60 displayed on the graphics plane 12. On the menu screen 60, characters and images are displayed at particular positions. With the characters and images, "links" and "buttons" that allow the user to select to new operations can be placed.

A "link" describes an access method to a predetermined file with a character string or image data. When the user designates the character string or image data on a screen with for example a pointing device, he or she can access the predetermined file in accordance with the access method designated with the character string or image data. A "button" has three types of image data that represent a normal state, a selection state, and a pressed state for a "link". When the user designates one button image, the image data is changed in accordance with the state that he or she has operated so that he or she can easily recognize the current state of the button.

When the user designates a "link" or a "button", he or she moves a cursor on the screen with the mouse and clicks a mouse button (presses the mouse button several times) on a character string or an image on the "link" or an image on a "button". The same operation can be performed with another pointing device other than the mouse. Alternatively, with a remote control commander or a key operation of a keyboard, the user can designate a "link" or a "button". At that point, the user selects his or her desired "link" or "button" with a predetermined key such as a direction key and designates the selected "link" or "button" with an OK key or the like.

In the example shown in FIG. 20, a title 61 as image data is displayed at an upper portion of the menu screen 60 that is displayed on the graphics plane 12. The title 61 is followed by selection items 62A, 62B, 62C, and 62D as links. When the user selects and designates one of the selection items 62A, 62B, 62C, and 62D with a key operation of for example the remote control commander, a file linked to the designated selection item is accessed.

AT lower positions of the menu screen 60, buttons 64 and 65 are displayed. With the buttons 64 and 65, subtitles can be displayed and a language of output sound can be selected from for example English and Japanese. When the buttons 64 and 65 are operated in the foregoing manner, files used to display their setup screens are accessed and the predetermined screens are displayed.

At a lower left portion of the menu screen 60, a character string 63 that describes a method for selecting an item is displayed. The character string 63 is displayed on the graphics plane 12.

To display the menu screen as shown in FIG. 20, any descriptive language for describing a screen display method, link information, and so forth is required. According to the embodiment of the present invention, as the descriptive language, used are original display control commands for subtitles and buttons added to a command system of which DVD video navigation commands are changed so that a menu screen for a blu-ray disc can be displayed.

On the menu screen 60 for the foregoing blu-ray disc, a table of for example play lists is displayed with image data, a character string, buttons, and so forth. It is expected that when a particular play list is designated, the designated play list is read and reproduced from the disc.

In the example shown in FIG. 20, a table of play lists is displayed on the menu screen 60. In reality, images and sound of the menu screen 60 and those that are generated in accordance with an item selected on the menu screen 60 are composed of a plurality of play lists. When a plurality of play lists that compose one menu item are correlated, a mechanism of which a story is branched can be accomplished. When a story is branched, a multiple story function that causes the contents of the story to vary in accordance with the user's selection, an automatic language reproducing function that causes a proper language to be automatically reproduced in accordance with a designated language of the player, and a parental function that causes scenes to be changed in accordance with the age of the user can be accomplished.

Although those functions are especially effective for recoded discs, but they are not prescribed in the current blu-ray disc standard, which mainly aims to record/reproduce television broadcasts.

Figure 21:
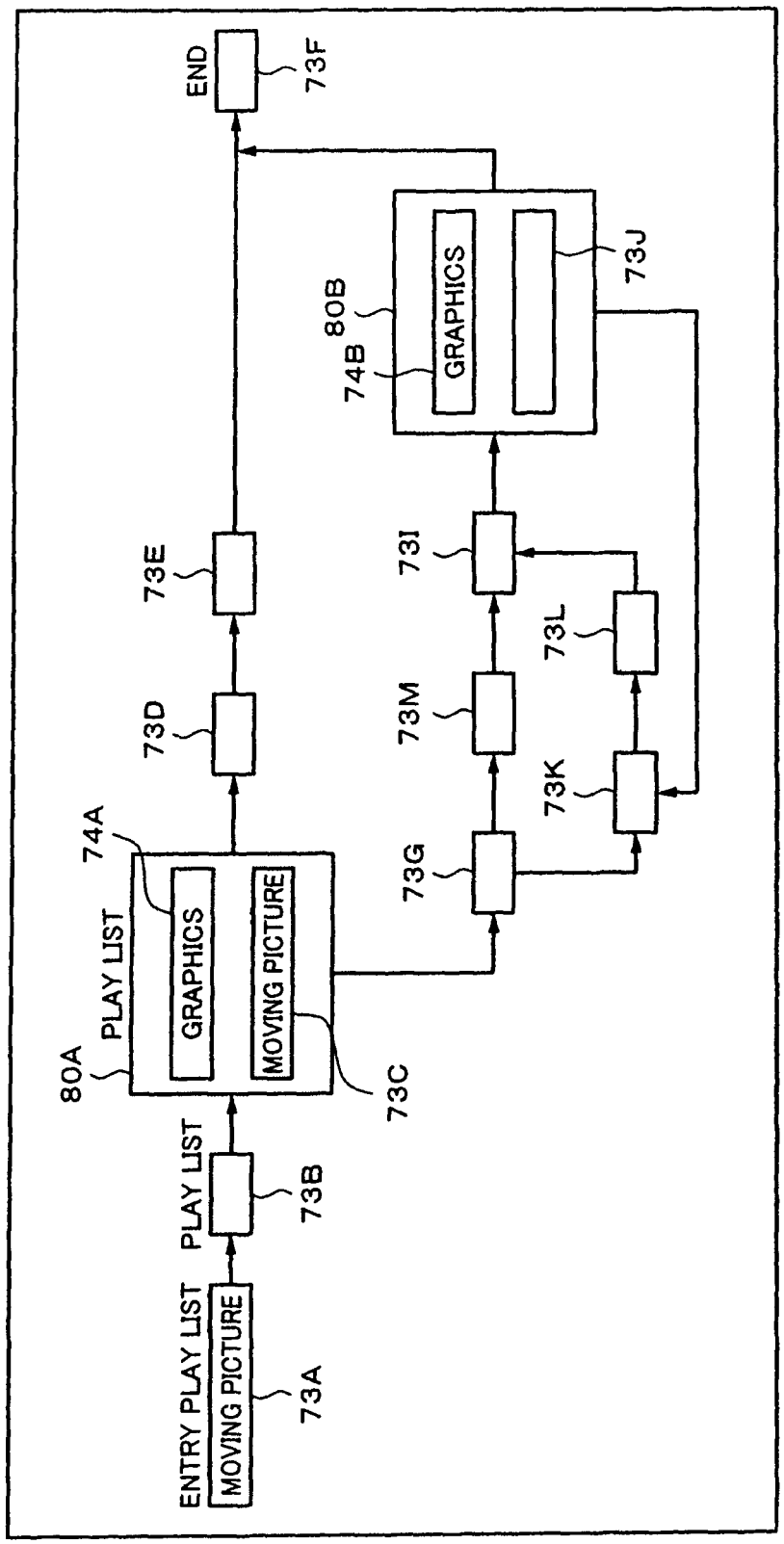
FIG. 21 is a schematic diagram showing an example of an internal structure of a scenario in accordance with an originally defined scenario descriptive language.

In the following description, the structure of which a plurality of play lists are arranged is referred to as scenario. FIG. 21 shows an example of an internal structure of a scenario 70. The scenario 70 has a plurality of play lists 73A to 73M. In addition, the scenario 70 has two portions (screens 80A and 80B) on which branch selection screens are displayed with the graphics plane 12. The screen 80A has graphics data 74A and a play list 73C with which a branch selection screen is displayed. Likewise, the screen 80B has a graphics data 74B and a play list 73J with which a branch selection screen is displayed.

A scenario designates both an arrangement of play lists and display timing at which they are displayed on the graphics plane 12. The display timing of the play lists on the graphics plane 12 can be designated with display control commands added to an image displayed on the graphics plane.

In the example shown in FIG. 21, the menu screen 60 corresponds to the screen 80A of the scenario 70. A selection item (for example, the selection item 62A) on the menu screen 60 is composed of graphics 74A. When the selection item 62A is designated on the menu screen 60, the play list 73D that corresponds to the selection item is reproduced.

In the scenario 70 shown in FIG. 21, when a disc is loaded into the player, the play list 73A is reproduced. After the play list 73A has been reproduced, the play list 73B is reproduced. After the play list 73B has been reproduced, the play list 73C is reproduced. As a result, the graphics data 74A is read and the screen 80A that prompts the user to select a branch of the story is displayed.

After the screen 80A is displayed, the story is branched in accordance with a user's selection. In the example shown in FIG. 20, when a first selection is performed, the screen 80A is displayed. Thereafter, the play lists 73D, 73E, and 73F are reproduced in succession. As a result, the reproduction of the scenario 70 is completed. After the play list 73F has been reproduced, the main menu screen (for example, the foregoing menu screen 60) may be displayed again.

When a second selection is performed on the screen 80A, after the screen 80A is displayed, the play list 73G is reproduced. A mark is set in the play list 73G at predetermined timing. When the play list 73G is reproduced, the play list 73G may be branched at the position of the mark or fully reproduced in accordance with the setting of the reproducing apparatus, user's another scenario, or a selection on the branch selection screen. When all the play list 73G is reproduced, after the play list 73G is reproduced, the play lists 73M and 73I are reproduced in succession. Thereafter, the play list 73J is reproduced.

When the play list 73G is branched at the position of the mark, the play lists 73K and 73L are reproduced in succession. After the play list 73L has been reproduced, the reproduction is resumed from the position of the mark that has been set in the play list 73I.

In the play list 73J, the graphics data 72B is read. The screen 80B that prompts the user to select a branch of the story is displayed. In the first selection on the screen 80B, the play list 73F is reproduced. In the second selection of the screen 80B, the play list 73K is reproduced from the position of the mark that has been set in the play list 73K.

When a scenario is reproduced, operations corresponding to a detected mark, a user's input, and player's operation change are performed in accordance with command sequences (programs) executed by the player for play lists.

Even if any of the play lists 73A to 73M is being reproduced, when a menu button of the remote control commander is pressed, the menu screen 60 for a table of scenarios is displayed. An operation for a reproducing process for a play list for the menu screen 60 will be described. In this case, an event handler that corresponds to an event that takes place when the menu button of the remote control commander is pressed (menu button press event) and that is a command that causes a play list for the menu screen 60 to be processed is described as global event handler 71.

One scenario is defined in a directory. One scenario is composed of one or a plurality of play lists. The directory is for example the foregoing BDAV directory of the standard for recording and reproducing data and the HDMV directory (the details will be described later) supposed as the data region only for reproduction according to the embodiment of the present invention.

Figure 22:
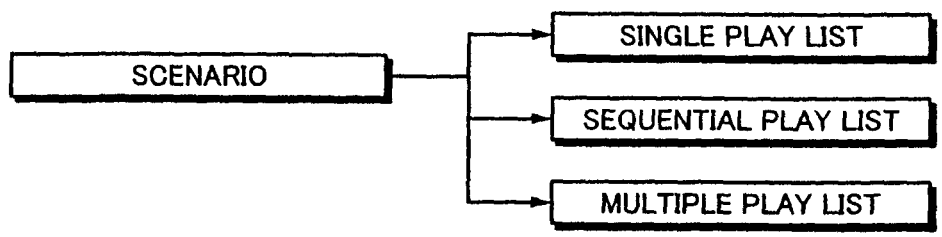
FIG. 22 is a schematic diagram describing categories of a structure of a scenario.

Categories of scenarios will be described with reference to FIG. 22, FIG. 23A, FIG. 23B, and FIG. 23C. Based on connections of play lists, structures of scenarios can be largely categorized as three types that are (1) single play list, (2) sequential play list, and (3) multiple play list as shown in FIG. 22.

Figure 23A:
FIG. 23A, FIG. 23B, and FIG. 23C are schematic diagrams describing categories of structures of scenarios.

The single play list, categorized as (1), is a scenario composed of one play list as shown in FIG. 23A. For the single play list, a time line can be defined. There is no interrupt during reproduction of the scenario. When the content of the single play list is a movie, after the disc is loaded, only a movie main part is reproduced.

Figure 23B:

The sequential play list, categorized as (2), is a scenario composed of a plurality of play lists that are linearly arranged without a branch as shown in FIG. 23B. The play lists are arranged in such a manner that the end of one play list is connected to the beginning of the next play list. In the sequential play list, a time line can be defined for each play list. When the content of the sequential play list is a movie, the scenario is composed of a menu screen and a movie main part. After the disc is loaded, a play list that causes a menu screen to be displayed is executed. When the reproduction of the movie main part is designated on the menu screen, the next play list is executed and the movie main part is reproduced.

Figure 23C:
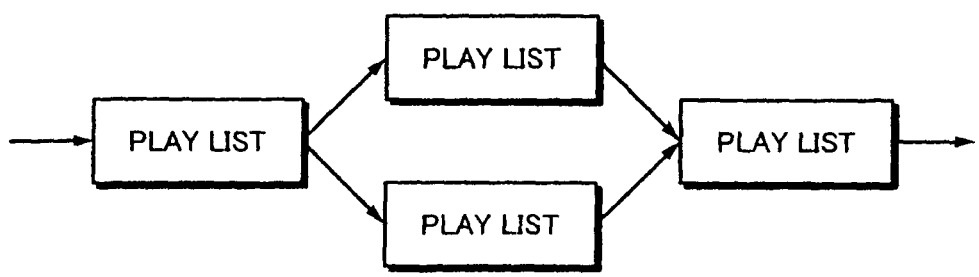

The multiple play list, categorized as (3), is a scenario that has a branch of a play list and a connection of play lists as shown in FIG. 23C. In the multiple play list, a time line cannot be defined through all play lists. Instead, a time line is defined in each play list. With the multiple play list, an interactive function and a game function for varying reproduction contents in accordance with a user's input can be accomplished. When the content of the multiple play list is a movie, a multiple angle function that allows the user to select a desired angle from various angles photographed for the same scene can be accomplished.

In the reproduction-only medium, one scenario is defined for the HDMV directory. However, it is necessary to allow the user to recognize the scenario in smaller units. Nevertheless, the unit of a play list does not always accord with a unit that the user can recognize. When one play list describes three movies, it is necessary to allow the user to see a search point of each movie. A search point (entry point) that is independent from the structure of a play list is referred to as title and/or chapter.

Figure 24:
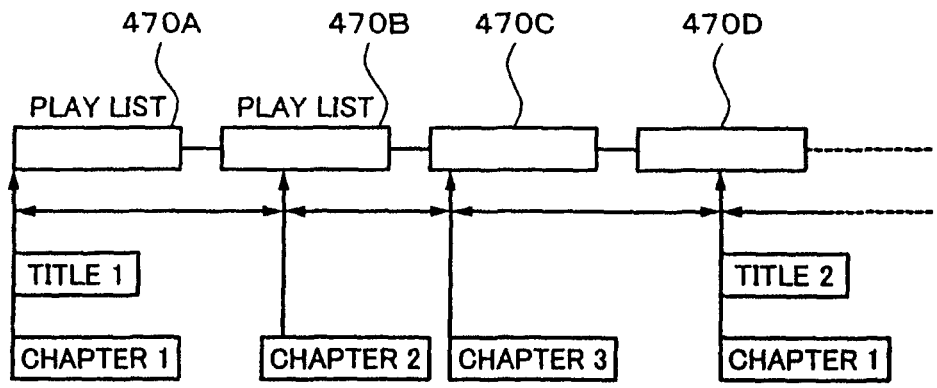
FIG. 24 is a schematic diagram describing titles and chapters.

Next, with reference to FIG. 24, titles and chapters will be described. A title represents any reproduction start point in a scenario. In the example shown in FIG. 24, a title 1 is placed at the beginning of a play list 470A. A title 2 is placed in the middle of a play list 470D. A region after the beginning of the play list 470A until the title 2 is the title 1. A chapter is a unit of which a title is sub-divided. The can also recognize a chapter as a reproduction start point. The title 1 is sub-divided into chapters. In the example shown in FIG. 24, the title 1 has chapters 1, 2, and 3. Thus, the title 1 is sub-divided into three portions. As shown in FIG. 24, each of a title and a chapter can be placed in the middle of a play list.

Next, a model of a reproducing apparatus that operates in accordance with description of a scenario will be considered. The modeled reproducing apparatus is referred to as BD (Blu-ray disc) virtual player. The definition of the structure of the BD virtual player is referred to as BD virtual player model.

Figure 25:
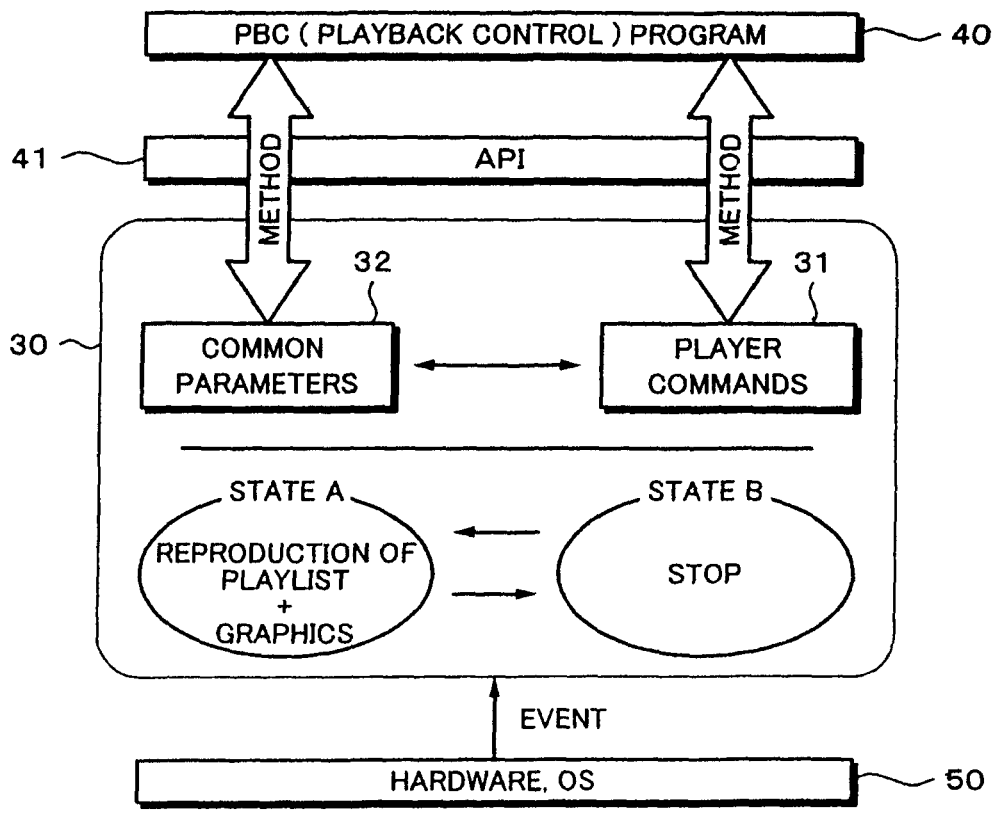
FIG. 25 is a schematic diagram describing a BD virtual player model.

Next, with reference to FIG. 25, the BD virtual player model will be described. After a disc is loaded into a BD virtual player 30, it reads as a PBC program 40 a scenario described in the scenario descriptive language defined in the present invention from the disc and operates in accordance with the description of the scenario.

The BD virtual player 30 reproduces data from a disc shaped recording medium defined according to the embodiment of the present invention. The BD virtual player 30 is an object in a computer environment such as a personal computer. The computer environment is not limited to a general-purpose personal computer. Instead, the computer environment includes a software environment incorporated with a dedicated reproducing apparatus and/or recording and reproducing apparatus that reproduces data from a disc shaped recording medium defined according to the embodiment of the present invention. Hereinafter, a disc shaped recording medium defined according to the embodiment of the present invention is referred to as disc.

The BD virtual player 30 roughly has two states A and B. In the state A, the BD virtual player 30 reproduces a play list and graphics. In the state B, the BD virtual player 30 stops reproducing a play list and graphics. A state change from one state to another state and a designation of the next operation in one state are performed by commands to an object of the BD virtual player 30.

The state A has a plurality of operations. As operations in the state A, there would be a high speed reproduction, a variable speed reproduction such as a reverse reproduction, and a special reproduction such as a jumping reproduction that starts from any time of a disc. When data of the graphics plane 12 is displayed, the variable speed reproduction and the special reproduction of the BD virtual player 30 would be restricted.

A PBC (Play Back Control) program 40 corresponds to a scenario recorded on the disc. As will be described later, a scenario describes a reproducing method for a play list recorded on the disc and a displaying method for a menu screen. The PBC program 40 and the BD virtual player 30 exchange commands through an API (Application Programming Interface) 41 so as to reproduce a play list recorded on the disc.

A scenario has two regions for commands including a program having commands that cause the player to be operated. The two regions are referred to as global command region and local global command region.

The global command region has programs that are effective for the entire scenario. For example, the global program region describes a program that causes the player to initialize parameters when a disc is loaded into the player and to jump to a play list that composes a menu screen. The local command region describes programs for play lists. Local commands are categorized as four types of commands that are pre-commands, play item commands, post commands, and button commands.

FIG. 26A and FIG. 26B show an outlined operation of the BD virtual player 30 with a scenario that describes original commands as a descriptive language according to the embodiment of the present invention. FIG. 26A shows an example of a disc loading operation of the BD virtual player 30. As described above, one scenario is created for the BDMV directory that will be described later. When the disc is loaded into the player and then an initial access is performed for the disc (at step S30), registers, namely, the common parameters 32 are initialized (at step S31). At the next step S32, a program is read from the disc and executed. The initial access represents an operation of which reproduction for a disc is performed first time for example when a disc is loaded into the player.

A command group (a program) that is initially read and executed when the disc is loaded into the player is referred to as global commands. The global commands describe for example an advertisement picture (trailer) and a jump command that jumps to a play list that composes a menu screen. The player reproduces the play list in accordance with the commands.

FIG. 26B shows an example of an operation of the player 30 when the user presses for example the play key while the player is in the stop state. This operation corresponds to the state change from the state B to the state A of the BD virtual player 30 as described in FIG. 25. In the stop state (at step S40), the user causes the BD virtual player 30 to operate in the reproduction mode with for example the remote controller (UOP: User Operation). At a result, the registers (namely, the common parameters 32) are initialized (at step S41). At the next step S42, the BD virtual player 30 enters a play list reproduction phase.

Next, with reference to FIG. 27A and FIG. 27B, reproduction of a play list in the play list reproduction phase will be described. FIG. 27A shows an example of which a play list is composed of a single play item. A play list has a pre-command region, a play item command region, and a post-command region that describes respective programs. In the play list reproduction phase, a pre-command of the pre-command region is executed (at step S10). After the pre-command has been executed, the player enters a play item reproduction phase for play items that compose the play list (at step S11). In the play item reproduction phase, a stream whose start point and end point are designated by a play item is reproduced (at step S110). When the stream has been reproduced up to the end point, the play item command is executed (at step S111). After the play item command has been executed, a post command of the post-command region is executed (at step S12). As a result, the play list has been reproduced.

The post command is normally a jump command that describes as a jump command a play list to be reproduced next or a play list that composes a menu screen. When there is no a jump command, the player enters the stop state (the state B shown in FIG. 25B).

FIG. 27B shows an example of which a play list describes a plurality of play items. In this case, the play list has a pre-command region, a play item command region, and a post-command region that describe respective commands. When the play list describes a plurality of play items, the play item command region describes play item streams and play item commands of play items arranged in a time sequence.

When the play list describes a plurality of play items, in the play list reproduction phase, a pre-command is executed (at step S10). In the next play item reproduction phase, a stream is reproduced from the start point to the end point of each play item and a play item command is executed for each play item. In the example shown in FIG. 27B, a first play item stream is reproduced (at step S110-1). Thereafter, the corresponding play item command is executed (at step S111-1). Thereafter, a second play item stream (not shown) is reproduced (at step S110-2). The corresponding play item command is executed (at step S111-2). These operations are repeated for the number of the play items. After the last play item stream has been reproduced (at step S110-$n$) and the corresponding play item command has been executed (at step S111-$n$), the play item reproduction phase is completed. After the play item reproduction phase has been completed, a post command is executed (at step S12). As a result, the play list reproduction phase is completed.

FIG. 28A, FIG. 28B, FIG. 28C, FIG. 28D, FIG. 28E, FIG. 28F, FIG. 28G, and FIG. 28H show part of commands. When commands exemplified in FIG. 28A, FIG. 28B, FIG. 28C, FIG. 28D, FIG. 28E, FIG. 28F, FIG. 28G, and FIG. 28H are described in the post command region and a button command region that will be described later, a jump to a predetermined play list can be accomplished. Besides these commands shown in FIG. 28A, FIG. 28B, FIG. 28C, FIG. 28D, FIG. 28E, FIG. 28F, FIG. 28G, and FIG. 28H, other commands can be defined.

Next, commands for designating a reproduction start position will be described. A command LinkPlayList (playList-Number) causes the reproduction of a play list designated by "playListNumber" to be started. A command LinkPlayItem (playListNumber, playItemNumber) causes the reproduction of a designated play item of a designated play list to be started. "playItemNumber" is "PlayItem id" whose value starts from "0". When "playItemNumber" is designated a value "0", a play list to which the play item belong is reproduced from the beginning.

A command Link (position) (object) causes the current position to be moved in a scenario. This command causes the current position to be moved to the adjacent play list, play item, or chapter. A parameter "position" is one of "prev", "next", "top", "Parent", or "tail". A parameter "object" describes a moving method for an object (a play list, a play item, or a chapter) represented by the parameter "object".

A command Exit causes the reproduction of a scenario to be stopped. In this case, the value of the standard register is not held. A command RSM causes resume information stored in the memory of the player to be called, set to a register, and the reproduction of the scenario to be started.

Next, commands for obtaining the state of the player will be described. A command getMenuDescriptionLanguage( ) causes a language used to display a menu to be obtained. A command getScenarioNumber( ), a command getPlayList-Number( ), and a command getChapterNumber( ) cause a scenario number, a play list number, and a chapter number that are being reproduced, respectively, to be obtained. A command getPlayerSupport( ) causes version information of the player to be obtained.

Next, commands for video streams will be described. A command getVideoStreamAvailability( ) causes information that describes whether or not a designated video stream to be contained. A command setVideoStreamNumber( ) describes a video stream to be decoded. A command getVideoStream-Number( ) causes the number of a video stream that is being selected to be obtained. Attributes of a video stream are for example an encoding system, a resolution, an aspect ratio, a display mode in the case that the aspect ratio is 4:3, and presence/absence of closed caption. A command setAngle-Number( ) describes an angle number. A command getAngle-Number( ) causes an angle number that is being selected to be obtained. A command getMaxVideoStreams( ) causes a maximum number of bit streams to be obtained.

Figure 29:
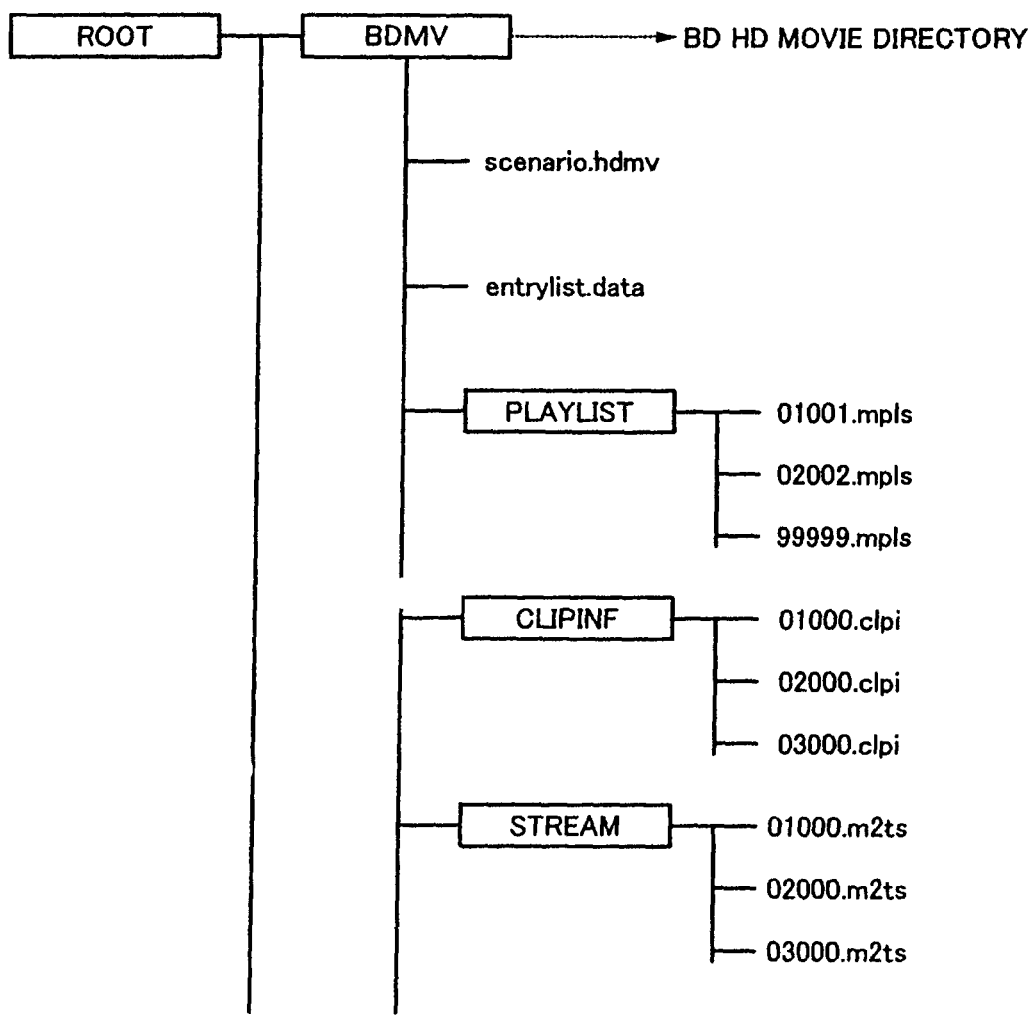
FIG. 29 is a schematic diagram showing an example of a file management structure.

Next, according to the embodiment of the present invention, a method for recording commands and databases that describe a scenario to a disc will be described. FIG. 29 shows an example of a file management structure according to the embodiment of the present invention. On the disc, one root directory is created. A portion under the root directory is managed by one reproducing system.

Under the root directory, a directory BDMV is placed. Although it is not shown, similar to FIG. 4 described above, a plurality of directories BDMV can be placed under the root directory. Hereinafter, a system defined by the embodiment of the present invention is referred to as BDMV.

Under the directory BDMV, two files "scenario.hdmv" and "entrylist.data" are placed. In addition, a plurality of directories "PLAYLIST", "CLIPINF", and "STREAM" are placed.

FIG. 30 shows a syntax that describes an example of a structure of the file "scenario.hdmv". The file "scenario.hdmv" is a file that is initially read and executed when an initial access is performed (namely, when the disc is loaded). The file "scenario.hdmv" has a file identification code (a field type_indicator) and a version number (a field version_number). The version number is followed by functional data blocks.

The field type_indicator has a data length of 32 bits. The field type_indicator has a predetermined character string that describes that the file is "scenario.hdmv". The field version_number has a data length of 32 bits for a version number. A field Scenario_start_address has a data length of 32 bits for an unsigned integer of a value that represents the position of the block Scenario( ) with the relative number of bytes from the beginning of the file "scenario.hdmv".

A block Autoplay( ) starts from the 41-st byte (fixed position) of the file. The block Autoplay( ) describes a program that is executed when the initial access is performed (reproduction for the disc is initially performed for example the disc is loaded). The block Autoplay( ) has the foregoing global commands described above. The block Autoplay( ) is followed by any number of padding words (padding_word) that allow a space to be formed after the block.

FIG. 31 shows a syntax that describes an example of a structure of the block Autoplay( ) shown in FIG. 30. A field length has a data length of 32 bits for an unsigned integer. The field length describes the data length immediately after the end of the field length until the end of the block Autoplay( ) in bytes. A field number_of_commands describes the number of fields command(i) preceded thereby. The field command(i) has a data length of 32 bits as shown in FIG. 28A, FIG. 28B, FIG. 28C, FIG. 28D, FIG. 28E, FIG. 28F, FIG. 28G, and FIG. 28H. The field command(i) describes a set of parameters of the player and commands such as a reproduction start command for a designated play list and a calculation command.

A block Scenario( ) describes a "scenario" as explained above. The block Scenario( ) describes information about the reproduction order of play lists and a local command region for each play list.

FIG. 32 shows a syntax that describes an example of a structure of the block Scenario( ). The block Scenario( ) is a block that defines information of a scenario, namely links among play lists. The block Scenario( ) describes information about the foregoing pre-commands, post-commands, and play item commands and these commands themselves. The block Scenario( ) has a region for fields of information about commands described therein and a region for those pre-commands, post-commands, and play item commands.

A field length describes a value that represents the length immediately after the end of the field length to the end of the block Scenario( ) in bytes. A field number_of_PlayLists describes the number of play lists that composes the scenario. The field number_of_PlayLists is followed by data of each play list. Data for each play list is repeated the number of times designated by a loop counter i in a for loop, the maximum value of i being represented by the field number_of_PlayLists.

A field Pre_Command_start_id describes a start number of a pre-command in a command table (a pre-command is executed before a play list is reproduced). A number described in the field Pre_Command_start_id describes a loop counter j in a for loop that describes a field Pl_Command (i) that will be described later. Likewise, a field Post_Command_start_id describes a start number of a post command in the command table (a post command is executed after a play list is reproduced). A number described in the field Post_Command_start_id describes the loop counter j in the for loop that describes the field PL_Command (j) that will be described later.

A field Number_of_Pre_Commands describes the number of pre-commands that compose a program. Pre-commands are executed before a play list is reproduced. Likewise, a field number_of_Post_Commands describes the number of post-commands that composes a program. Post commands are executed after a play list has been reproduced. These programs are described in a command table that will be described later.

A field number_of_PlayItems describes the number of play items that composes the play item. A field PI_Command_start_id represents a start number of a play item command in a command table. A play item command is executed after the play item has been reproduced. A number described in the field PI_Command_start_id describes a loop counter j in a command table that will be described later. A field number_of_PI_Commands describes the number of play item commands, which are executed after the play item has been reproduced. Commands after the position described in the field PI_Command_start_id until the number of commands described in the field_number_of_PI_Commands are executed after the play item has been reproduced.

A field number_of_PL_Commands describes the number of commands in a command table preceded by the field number_of_PL_Commands.

The command table has a for loop that describes a field PL_Command (j). Commands in the command table are assigned number j. The number j corresponds to the loop counter j in the for loop that describes the command table.

A field PL_Command (j) describes one command. The number j is referenced from the foregoing field Pre_Command_start_id, the field Post_Command_start_id, and the field PI_Command_start_id.

FIG. 33 shows a syntax that describes an example of a data structure of the file "entrylist.data". The file "entrylist.data" describes a file identification code (a field type_indicator), a version number (a field version_number), and a block start address (a field ScenarioEntry_start_address). The block start address is followed by functional data blocks.

The field type_indicator has a data length of 32 bits for a predetermined character string that describes entry points of a title and a menu. A field version_number has a data length of 32 bits for a version number. The field ScenarioEntry_start_address has a data length of 32 bits for an unsigned integer value that describes the start position of the block ScenarioEntry( ) with the relative number of bytes from the beginning of the field "entrylist.data".

FIG. 34 shows a syntax that describes an example of a structure of a block AppInfo( ). A field length has a data length of 32 bits for an unsigned integer that describes the length immediately after the end of the field length until the end of the block AppInfo( ) in bytes. A field HDMV_name_character_set describes a character set for a field HDMV_name that will be described later. A field PIN_valid_flag describes whether or not a personal identification number should be set when reproduction is performed. When the setting is valid, a field PIN that is followed by the field PIN_valid_flag describes a personal identification number. A field HDMV_name_length describes the length of a valid portion of a field HDMV_name that is preceded by the field HDMV_name_length. The field HDMV_name is a region that describes a name of the directory HDMV in which the file "entrylist.data" is placed. The name of the directory HDMV is described in the text format. The field HDMV_name has a fixed data length of 255 bytes. The name of the directory HDMV is described for a length described in the field HDMV_name_length after the beginning of the field HDMV_name.

FIG. 35 shows a syntax that describes an example of a structure of the block ScenarioEntry( ). The block ScenarioEntry( ) describes search points of a scenario. As described above, one scenario is created for the directory HDMV. A scenario links a plurality of play lists placed under the directory HDMV so as to define the reproduction order of the play lists. When the user sees a scenario, it does not always look like one picture unit or one sound unit, but as if it were composed of a plurality of "titles".

When three movies are recorded on one disc, only one scenario that defines the reproduction order of the movies exists on the disc. However, the user would see them as if three titles were recorded on the disc. Alternatively, a list of three titles would be displayed. Including a title menu that allows the user to select one of the titles, he or she would see them as if four titles were recoded. Since the user considers a menu screen as one picture unit or one sound unit, according to the embodiment of the present invention, a menu screen is treated as one type of a title.

Since the unit of a scenario that defines a link of play lists is different from the unit that the user recognizes data as picture and audio, as described above, it is necessary to define search points in a scenario. A search point in a scenario is referred to as title entry. The block ScenarioEntry( ) describes information of a title entry.

Returning to FIG. 35, a field length has a data length of 32 bits for an unsigned integer that describes the length immediately after the field length until the end of the block ScenarioEntry( ) in bytes. A field name_character_set describes a character set of a field TopMenu_name and a field Title_name that are preceded by the field name_character_set.

The next block Top menu PL( ) describes an entry point to a play list or a play list group that composes a menu displayed when the user presses the title menu key of the remote controller. One scenario has one top menu. The top menu is used to present for example titles to the user. A sub menu on which the user can set audio and subtitles can be placed as a lower menus of the top menu. A sub menu is also referred to as stream setup menu.

In short, a field flags is a region that describes attribute information of a top menu. A field TopMenu_ref_to_PlayList_file_name describes a play list that composes a top menu or a play list that is an entry to a play list group. A field TopMenu_ref_to_PlayItem_id describes the number of a play item from which the top menu starts in a play list described in the field TopMenu_ref to_PlayList_file_name. When the play list is reproduced from the beginning, the value of the field TopMenu_ref_to_PlayItem_id is "0". A field TopMenu_name_length represents the length of the name assigned to a top menu. A field TopMenu_name describes a character string of the name assigned to a top menu.

The block Top Menu PL( ) describes information about a title. A field number_of_Titles describes the number of title search points (title entries) in a for loop immediately preceded by the field number_of_Titles. In short, a field flags is a region that describes attribute information about a title. A field Title_ref_to_PlayList_file_name describes the file name of a play list that includes a title entry. A field Title_ref_to_PlayItem_id is used when a title starts from a particular play item of a play list described in the field Title_ref_to_PlayList_file_name. A field Title_name_length describes the length of the name assigned to a title. A field Title_name describes a character string of the name assigned to a title.

Next, information about a sub menu is described. "Stream Setup Menu" is followed by an entry point to a play list or a play list group that composes a stream setup menu (namely, a sub menu) for each play item. A stream setup menu can be used for each play list to select such as sound, subtitles, or angle. For example, when the buttons 64 and 65 shown in FIG. 20 are pressed, a sub menu is displayed as a screen.

A field number_of_PlayLists describes the number of play lists used for a stream setup menu. The value of the field number_of_PlayLists is used as the number of loop times of a for loop immediately preceded by the field number_of_PlayLists. In short, a field SSMenu_flags is a region that describes attribute information about a stream setup menu. A field SSMenu_ref_to_PlayList_file_name describes a play list that composes a stream setup menu or a play list that is an entry of a play list group. A field SSMenu_ref to_PlayItem_id describes the number of a play item from which a stream setup menu starts in a play list described in the field SSMenu_ref to_PlayList_file_name. When a play list is reproduced from the beginning, the value of the field SSMenu_ref_to_PlayItem_id is "0".

FIG. 36 shows a syntax that describes an example of a structure of a file "xxxxx.mpls". In FIG. 36, the file "xxxxx.mpls" has functional blocks of information. A field type_indicator describes a character string of the file. A field version_number describes the version of the file. Fields PlayList_start_address and PlayListMark_start_address describe the start addresses of corresponding blocks as address information having a data length of 32 bits.

A block PLControlInfo( ) describes attribute information about the play list. A block PlayList( ) describes information about a play item that composes the play list. A block PlayListMark( ) describes information of a mark added to the play list.

In the file "xxxxx.mpls", since start addresses of the block PLControlInfo( ), PlayList( ), and PlayListMark( ) are followed by these blocks, padding data padding_word can be placed before and/or after each block in a desired length. The start position of the first block PLControlInfo( ) is fixed at the 41-st byte from the beginning of the file.

FIG. 37 shows a syntax that describes an example of a structure of the block PLControlInfo( ). The block PLControlInfo( ) describes various types of attribute information about a play list, not directly required to reproduce the play list. A field PlayList_character_set describes a character set of character string information about a play list.

A field PL_playback_type describes a value as shown in FIG. 38. The field PL_playback_type describes whether the play list is a regular play list that is sequentially reproduced, a play list of which play items are reproduced at random, or a play list of which play items are shuffled and reproduced. The random shuffle is designated in the unit of a play list. One play list should not describe a regularly reproduced play item and a randomly shuffled play item block. When the disc is a reproduction-only recording medium, the producer may designate a random reproduction or a shuffle reproduction. At that point, such information is required.

A field playback_count describes the number of times of reproduction of a play item when the play list is a random reproduction play list or a shuffle reproduction play list. A field playback_count describes the number of play items that are randomly reproduced or shuffle-reproduced.

A field PL_UOP_mask_table( ) describes information about restriction of user's operations. When the user is prohibited from performing operations such as playback, fast forward, fast rewind, and so forth while a play list is being reproduced, this region is properly described. When a proper value is described in the field PL_UOP_mask_table( ), an alarm notice, a copyright notice, and so forth can be prevented from being skipped even if a fast forward operation or the like is performed.

A field PL_random_access_mode describes a value as shown in FIG. 39. The field PL_random_access_mode describes whether a random access of which any position of the play list is jump-reproduced can be performed. When there is a play list that the disc producer wants the user to see, the value of the field PL_random_access_mode is set to [0x1]. When this play list is jump-reproduced, fast forward operation, fast rewind operation, reproduction from any time, and so forth are prohibited. When the disc is a reproduction-only recording medium, scenes such as a logo of a contents production company and precautions to be seen to the user may be recorded thereon. The field PL_random_access_mode describes information necessary for prohibiting such scenes from being skipped against variable speed reproduction operation or the like.

A field PlayList_duration describes a reproduction duration of a play list. A field PlayList_name describes a play list name having an effective length with a value described in the field PlayList_name_length. A field PlayList_detail describes detailed information about a play list having an effective length with a value described in the field PlayList_detail_length.

FIG. 40 shows a syntax that describes an example of a structure of a block PlayList( ). A field length describes a byte length immediately after the field length until the end of the block PlayList( ). A field number_of_PlayItems describes the number of play items that compose the play list. A field number_of_SubPlayItems describes the number of auxiliary play items (sub play items) reproduced along with the main play item.

A block PlayItem( ) describes information of a play item. A block SubPlayItem( ) describes information of a sub play item.

FIG. 41 shows a syntax that describes an example of a structure of the block PlayItem( ). A field Clip_Information_file_name describes a character string of a file name of a clip information file (that has an extension of "clpi") corresponding to a clip that play item references in the relation of 1 to 1.

A field Clip_codec_identifier describes an encoding system of a clip referenced by the play item. According to the embodiment, the field Clip_codec_Identifier describes a fixed value "M2TS2". In other words, according to the embodiment, the encoding system of a clip referenced by a play item is fixed to a system represented by the value "M2TS".

A flag is_multi_angle describes whether or not the play item has a multiple angle structure (a first flag).

A field connection_condition is information that describes in what manner the play item and the next play item are connected. The field connection_condition describes whether or not play items can be seamlessly reproduced.

A field ref_to_STC_id describes a sequence STC_sequence in a clip referenced by the play item. The sequence STC_sequence has a unique structure of the blu-ray disc standard that describes that PCR (Program Clock Reference) as a reference of the time base of an MPEG2 TS (Transport Stream) represents a continuous range. The sequence STC_sequence describes a number STC_id that is unique in the clip. Since a continuous time base can be defined in the sequence STC_sequence, the start time and the end time of a play item can be uniquely designated. In other words, the start point and the end point of each play item should be present in the same sequence STC_sequence. A field ref_to_STC_id describes a sequence STC sequence with a number STC_id.

Fields IN_time and OUT_Time describe time stamps pts (presentation_time_stamp) of the start point and the end point of the play item in the sequence STC_sequence, respectively.

A field PI_UOP_mask_table( ) describes data about a restriction against user's operations. Even if the user performs such a restricted operation, the player should not respond to that. To restrict a fast forward operation while a menu screen is being displayed, data about a restriction against such an operation is described in the field PI_UOP_mask_table( ).

The field PI_UOP_mask_table( ) is described for each play item. The field PI_UOP_mask_table( ) describes information that has the same object as the field PL_UOP_mask_table( ) of the foregoing block PLControlInfo( ), which describes information about reproduction of a play list. A user's operation can be prohibited in either a play list or a play item. A user's operation during reproduction of a play item is prohibited depending on the result of an OR operation of information of a play list and information of a play item.

In short, a field PID_filter( ) is a table that describes the priority in streams reproduced by play items.

A field PI_random_access_mode describes a value as shown in FIG. 42. The field PI_random_access_mode describes whether or not a random access can be performed for jump-reproduction of any position of a play item.

When there is a play list that the disc producer side wants the user to see, a value [0x1] is described in the field PI_random_access_mode. Thus, when reproduction of a play item is started, the user can be prohibited from performing a fast forward operation, a rewind operation, a reproducing operation from any time, or the like.

A field still_mode describes whether or not after reproduction of a play item is started, the reproduction is temporarily stopped. The field still_mode describes a value as shown in FIG. 43. When the value of the field still_mode is [0x1], it describes that reproduction of the play item is temporarily stopped for a period described in the next field still_time. Thus, still pictures can be successively displayed at intervals of a predetermined period like a slide show. In this case, each still picture is a play item. In addition to a setting for a designated time period, a setting for a non-designated time period of which reproduction is stopped until the user inputs data (pause setting) can be described in the field still_time. When the value of the field still_mode is [0x2], the pause setting can be performed.

When the value of the foregoing flag is_multi_angle is for example "1", the play item is a multiple angle play item. After "Angle", information about multiple angles is added.

A field number_of_angles describes the number of angles. A field is_seamless_angle_change describes a value as shown in FIG. 44. The field is_seamless_angle_change describes whether or not each angel has been recorded on the disc so that each angel can be seamlessly changed.

The next for loop describes information about clips that compose angles. A field Clip_Information_file_name in the for loop describes a character string of a field name of a clip information file (that has an extension "clpi") that corresponds to each clip that the play item references in the relation of 1 to 1. A field ref_to_STC_id describes a sequence SC_sequence of each clip that the play item references.

An angle corresponding to a value angle_id=0 has been defined in the first half part of the block PlayItem( ) like a regular play item that is not an angle play item. Angles after the value angle_id=1 are defined in the for loop. The for loop does not contain an angle corresponding to the value angle=0.

FIG. 45 shows a syntax that describes an example of a structure of a block SubPlayItem( ). A field length describes the length immediately after the field length until the end of the block SubPlayItem( ) in bytes. A field Clip_Information_file_name describes a character string of a file name of a clip information file (that has an extension "clpi") that corresponds to a clip that the sub play item references in the relation of 1 to 1.

A field Clip_codec_identifier describes an encoding system of a clip that the sub play item references. According to the embodiment, the field Clip_codec_Identifier is fixed to a value "M2TS".

A field is_repeat_flag describes a value as shown in FIG. 46. The field is_repeat_flag is a flag that describes whether or not the sub play item is repeatedly reproduced not in synchronization with a main play item (main path). When the value of the field is_repeat_flag is "1", the sub play item is repeatedly reproduced until the main play item has been reproduced not in synchronization therewith. When the value of the field is_repeat_flag is "0", the sub play item is reproduced once in synchronization with the main play item.

If the sub play item is a sub play item for only audio, when "1" is described in the field is_repeat_flag, BGM (Back Ground Music) can be reproduced.

A field SubPlayItem_type describes what characteristic the sub play item has. For example, when the value of the field SubPlayItem_type is "1", it describes that the sub play item is a sub play item for only audio. A field ref_to_STC_id describes a sequence STC_sequence of a clip that the play item references. Fields SubPlayItem_IN_time and SubPlayItem_OUT_Time describe time stamps pts (presentation_time_stamp) of the start point and end point of the sub play item in the sequence STC_sequence.

When the value of the foregoing field is_repeat_flag is "0" and it represents that the sub play item is reproduced in synchronization with the main play item, the field sync_PlayItem_id and the field sync_start_PTS_of_PlayItem describe from what time of the main play item the sub play item is reproduced in synchronization therewith.

Figure 47:
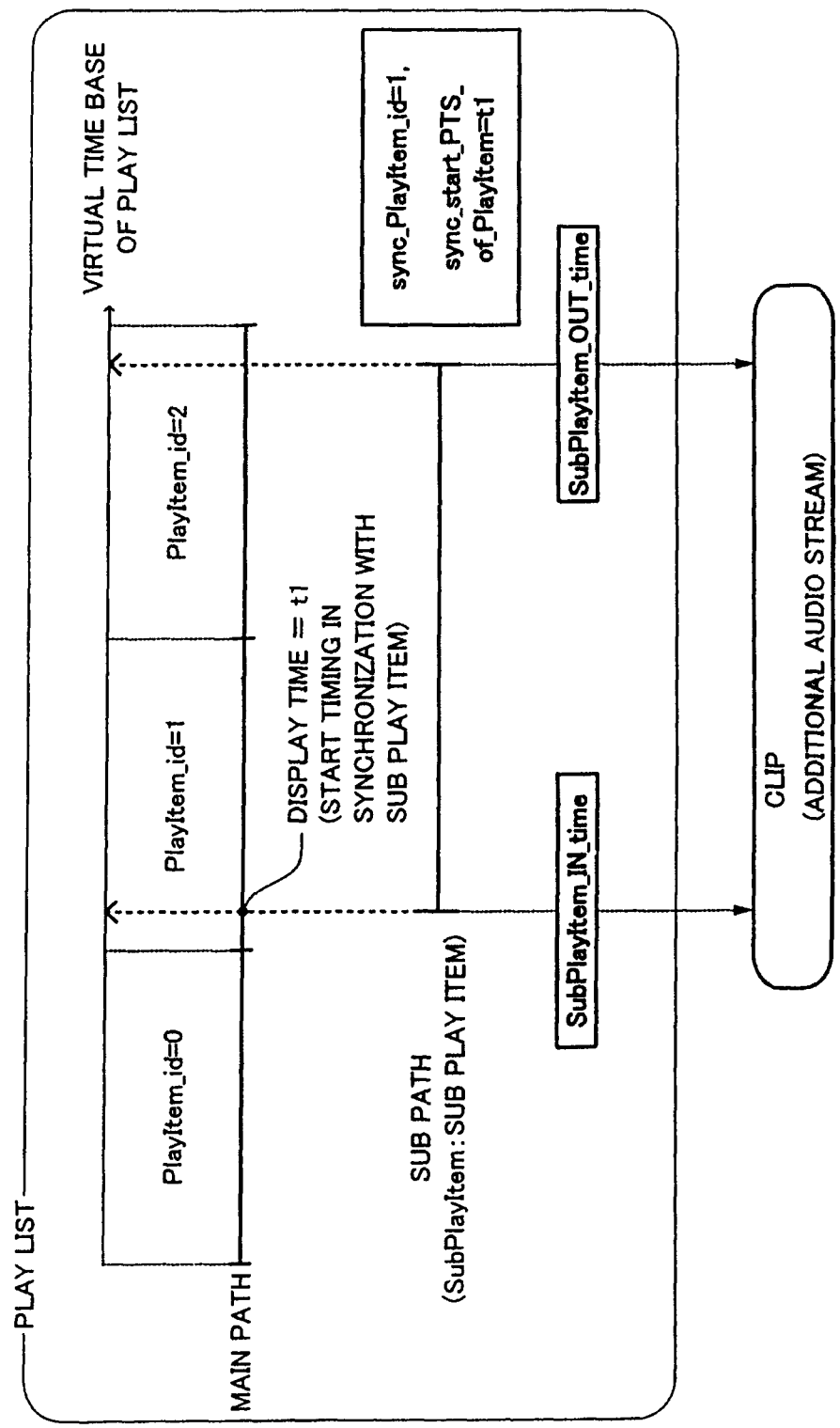
FIG. 47 is a schematic diagram describing a synchronous reproduction for a sub play item in accordance with a main play item.

As shown in FIG. 47, the field sync_PlayItem_id describes a play item of a main path (PlayItem=1). The field sync_start_PTS_of_PlayItem describes time of the main play item at which reproduction of a sub play item is started (t1). A field SubPlayItem_IN_time and a field SubPlayItem_OUT_time describe a period for which a click as a sub play item is reproduced.

FIG. 48 shows a syntax that describes an example of a structure of the file "zzzzz.clpi". In FIG. 48, the file "zzzzz.clpi" has functional blocks of information. A field type_indicator describes a character string of the file. A field version_number describes the version of the file. A field SequenceInfo_start_address, a field ProgramInfo_start_address, a field CPI_start_address, and a field ClipMark_start_address describe start positions of respective blocks.

FIG. 49 shows a syntax that describes an example of a structure of a block ClipInfo( ). A field length describes the length immediately after the field length until the end of the block ClipInfo( ). A field Clip_stream_type describes the type of a clip AV stream. The value of the field Clip_stream_type may be fixed to for example "1" that represents a normal clip in the reproduction-only disc standard.

A field application_type describes how a clip AV stream (that has an extension "m2ts") has been multiplexed. The field application_type describes a value as shown in FIG. 50. The field application_type describes whether the clip AV stream is a normal video stream or a stream that has been multiplexed suitably for a still picture. More practically, in the example, the value of the field application_type is "1" and it describes that the file of the corresponding clip AV stream complies with the rule of the HDMV transport stream according to the embodiment. With the clip AV stream, a normal moving picture is reproduced.

When the value of the field application_type is "2", it describes that the file of the corresponding clip AV stream complies with the rule of the HDMV transport stream for a still picture that synchronizes with the reproduction of audio. The clip AV stream is a file in accordance with for example the MPEG2 format. In the clip AV stream, video data and audio data have been multiplexed. The video data has a structure of which I pictures of the MPEG2 are arranged as still pictures. As a result, the still pictures can be reproduced like a slide show on the time base of audio. This reproduction is referred to as time base slide show.

When the value of the field application_type is "3", it describes that the file of the corresponding clip AV stream complies with the rule of the HDMV transport stream for still pictures reproduced not in synchronization with audio. The audio data and the video data are structured as different files. While the audio data is being reproduced, the video data is displayed in such a manner that still pictures are changed at any intervals or as designated by the user. The video data can be structured in such a manner that for example I pictures of the MPEG2 are arranged as still pictures. Such reproduction is referred to as browsable slide show.

When the value of the field application_type is "0", the corresponding clip AV stream does not comply with the rule of the HDMV transport stream.

It is assumed that multiplexing suitable for displaying still pictures allows an application such as a slide show of still pictures to be easily accomplished. In such an application, when one still picture is capsulate-multiplexed with subtitles and graphics data to be superimposed, they can be easily read.

When a still picture is multiplexed with subtitles and graphics in the same manner as a normal moving picture, subtitles to be displayed along with a still picture are multiplexed with picture data of a preceding still picture (namely, so-called multiplexing phase difference takes place). As a result, unless stream data is read for a long time, a still picture superimposed with subtitles and graphics cannot be displayed.

According to the embodiment of the present invention, graphics data for video data and subtitles is contained in TS (Transport Stream) packets of the MPEG. One TS packet is composed of 188 bytes. The foregoing video data and graphics data are divided so that they are contained in TS packets. When a packet of subtitle data corresponding to particular still picture data (called picture P1) is preceded by a packet of the next still picture (called picture P2), to display subtitles corresponding to the picture P1, data of the picture P2 should have been read.

When a particular still picture is multiplexed with only associated subtitles and graphics (capsulated), a stream that is not affected by other data can be created. When such an operation is repeated for each still picture and streams are connected, one stream of which data of each still picture (and associated subtitles and graphics data) is connected in series can be obtained. The stream that has been multiplexed in such a manner is referred to as still picture HDMV stream.

There are two types of HDMV streams for still pictures that are time base slide show and browsable slide show. According to the embodiment, the two types are distinguished with different numbers of the field application_type. When a still picture and associated subtitles and graphics are capsulated and recorded, accessibility of which still pictures are changed and reproduced is improved.

Returning to FIG. 49, a field Clip_stream_type describes the type of a clip AV stream. A field num_of_source_packets describes the number of packets contained in a clip AV stream. A field BD_system_use and a block TS_type_info_block( ) do not relate to the present invention. These description will be omitted.

FIG. 51 shows a syntax that describes an example of a structure of a block SequenceInfo( ). A field length describes the length immediately after the field length until the end of the block SequenceInfo( ) in bytes. A field num_of_ATC_sequence describes the number of sequences ATC_sequence that have been recorded in a continuous time period. When a reproduction-only medium is used, since the number of sequences ATC_sequence is "1", the description of the field num_of_ATC_sequences will be omitted. A field SPN_ATC_start describes the beginning of the sequence ATC_sequence with a packet number. When the number of sequences ATC_sequence is "1", the beginning of the sequence ATC_sequence accords with the beginning of the clip AV stream file. Thus, the value of the field SPN_ATC_start is "0".

A field num_of_STC_sequences describes the number of sequences STC_sequence of the sequence ATC_sequence. When a reproduction-only medium is used, since the number of sequences STC_sequence is "1", the description thereof will be omitted. A field offset_STC_id describes a fixed value "0". A field PCR_PID describes a PID of a TS packet that has a PCR (Program Clock Reference) of an MPEG2 TS. A field SPN_STC_start describes the beginning of a sequence STC_sequence with a packet number. When the number of sequences STC_sequence is 1, since the field SPN_STC_start accords with the beginning of the clip AV stream file, the value of the field SPN_STC_start is "0". A field presentation_start_time and a field presentation_end_time describe a valid range of the clip AV stream. The range described in the field presentation_start_time and the field presentation_end_time can be referenced from a play item.

FIG. 52 shows a syntax that describes an example of a structure of a block ProgramInfo( ). A syntax structure of a block PorgramInfo( ) for a recordable medium can be applied to that for a reproduction-only medium. Since there is no new structure in the block ProgramInfo( ), detailed description is omitted. In the block ProgramInfo( ), as restrictions, a value "1" can be described in a field num_of_program_sequences and a value "1" can be described in a field num_of_groups.

FIG. 53 shows a syntax that describes an example of a structure of a block StreamCodingInfo( ). Like the block ProgramInfo( ), the block StreamCodingInfo( ) has a syntax structure similar to that of the recordable medium. With respect to video data, the block StreamCodingInfo( ) describes attribute information of a format of video data, a frame rate, and an aspect ratio. With respect to audio data, the block StreamCodingInfo( ) describes attribute information of a sampling frequency and so forth. When the syntax structure of the recordable medium is applied to the reproduction-only medium, as shown in FIG. 53, it is necessary to add a field language_code that describes a language of subtitles and audio streams to the block StreamCodingInfo( ). This information is effective when the most suitable language for audio and subtitles is selected in accordance with setting of the player.

FIG. 54 shows a syntax that describes an example of a structure of a block CPI( ). Generally, in an encoded stream such as an MPEG stream that has been compressed between frames, the stream can be decoded at limited positions for example the beginning of a GOP (Group Of Picture). The CPI (Characteristic Point Information) is a database that is a collection of information about start positions at which data can be decoded. The database correlates reproduction times and addresses of a file. The CPI tabulates information that describes start positions at which data can be decoded.

When data is reproduced from any time, by referencing the CPI as such a database with the reproduction time, the address of the reproduction position in the file can be obtained. Since this address is the beginning at which data can be decoded, the player can read data therefrom and quickly display a picture.

A start position at which data can be decoded (in this example, the start position of a GOP) is described in the CPI and is referred to as EP (Entry Point) entry.

A field CPI_type describes the type of CPI. The field CPI_type describes a value as shown in FIG. 55. According to the present invention, the type of the field CPI_type describes CPI for a reproduction-only medium. In reality, the value of the field CPI_type is "8" that describes an EP entry map for HDMV (EP_map_type_for_HDMV).

FIG. 56 shows a syntax that describes an example of a data structure of a block EP_map of an EP entry for a reproduction-only medium, in other words, a block EP_map_for_HDMV( ) of the foregoing field CPI_type. The map EP_map is a table that correlates reproduction times and addresses of a file for start positions of GOPs. In the example shown in FIG. 56, as a table that correlates PTS (Presentation Time Stamp) of MPEG and SPN (Source Packet Number) for start positions of GOPs, a database is created. SPN represents a source packet number that corresponds to a byte address from the beginning of a file.

The structure of the map EP_map for the recordable medium is almost the same as the structure of the map EP_map for the reproduction-only medium. According to the embodiment, to reduce the data amount and speed up searches, coarse searches and fine searches are performed for individual values. Thus, the internal structure of the map EP_map is divided into two for loops corresponding to coarse searches and fine searches. Consequently, the map EP_map for the reproduction-type disc is more complicated than a simple table "that correlates PTSs of the first I pictures of GOPs and addresses in a file".

A field EP_fine_table_start_address describes the position of a table used for fine searches. The next for loop describes tables for coarse searches. The for loop describes fields PTS_EP_coarse and SPN_EP_coarse. A field ref_to_EP_fine_id describes a table number for fine searches referenced from coarse searches. The fields PTS_EP_coarse and SPN_EP_coarse describe high order bits of a PTS and an SPN.

The for loop is followed by a padding word. The padding word is followed by a for loop that describes fields PTS_EP_fine and SPN_EP_fine. In addition, the for loop describes a flag is_angle_change_point and a field I_end_position_offset. The flag is_angle_change_point describes whether each EP point corresponds to an angle changeable point when the clip AV stream has a multiple angle structure (a second flag).

Next, the flag is_angle_change_point will be described. First of all, for easy understanding, how a clip AV stream is placed on a disc will be described.

Figure 57:
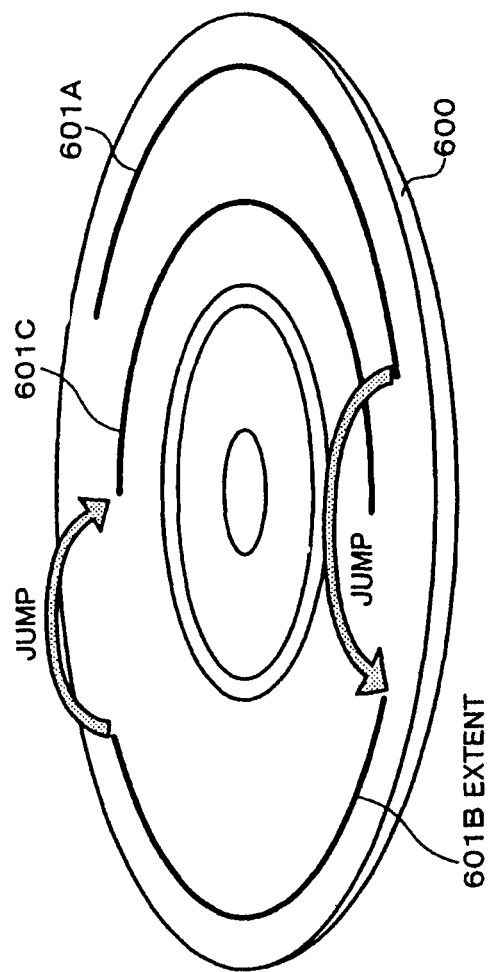
FIG. 57 is a schematic diagram describing an extent.

A clip AV stream is composed of a sequence (block) of data of which logical addresses on the disc 10 are successive. Hereinafter, a block of data as a clip AV stream of which logical addresses on the disc are successive is referred to as an extent. FIG. 57 schematically shows an arrangement of extents on a disc. In an example shown in FIG. 57, one clip AV stream is composed of a sequence of extents 601A, 601B, and 601C. The lengths of the extents and the arrangement thereof are properly controlled when the disc is produced.

Then, the extents 601A, 601B, and 601C are structured so that they satisfy the minimum size rule. When the clip AV stream has been recorded on a disc 600, it is assured that data that is reproduced is successively supplied.

When one file is composed of a plurality of extents 601A, 601B, and 601C as shown in FIG. 57, a reading operation for successively reading for example one extent 601A and then the next extent 601B is repeated. When one extent 601A is read and then the next extent 601B is read, it is necessary to change the number of rotations of the disc 600 and move an optical pickup that composes a reading portion of the player for the disc 600.

The maximum access time for which the optical pickup is moved on the disc 600 is around 0.8 seconds. While the optical pickup is being moved, data cannot be obtained from the drive, which composes the disc reading portion. On the other hand, since video and audio data are successively decoded and reproduced, a mechanism for compensating the access time is required.

When one extent 601A and the next extent 601B are successively accessed, a jump takes place therebetween. When the byte length of the former extent 601A is large, before a jump is preformed, a sufficient amount of data can be read from the extent 601A and stored in a buffer. Thus, while the jump is being performed, since the data stored in the buffer is supplied to the decoder, the data can be successively decoded.

In other words, if the size of the extent 601A from which the jump is performed is sufficiently large, while the next extent 601B is being jumped, it is assumed that the stream will be successively supplied. Thus, to store a sufficient amount of data to the buffer, the lower limit of the size of an extent needs to be restricted. The minimum extent size is defined as a proper value in accordance with the read rate of the disc 600 and the drive's access time. The condition for successively supplying data can be determined depending on whether or not data has been arranged in accordance with the minimum size rule for extents.

Figure 58:
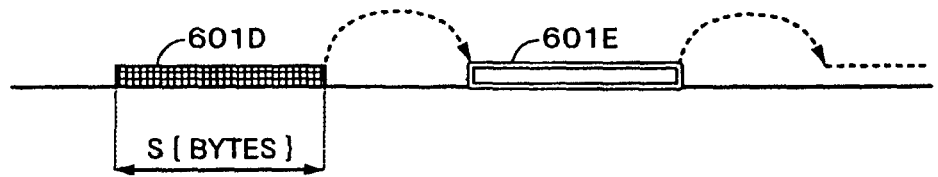
FIG. 58 is a schematic diagram showing an example of which a clip AV stream has been fragmentally recorded on a disc.

FIG. 58 shows an example of which a clip AV stream has been fragmentally recorded as for example extents 601D and 601E on a disc. To assure that the recorded clip AV stream is read at a predetermined bit rate from the recording medium in FIG. 58, the size of one extent should satisfy a condition given by the following formula (1).

$$S \times 8/(S \times 8/Rud + Ts) >= Rmax \qquad (1)$$

In the formula (1), "S" represents the size of an extent in bytes and "Ts" represents a full-stroke access time, namely the maximum access time, in seconds from one extent 601D to the next extent 601E. "Rud" represents a bit rate at which data is read from a disc. "Rmax" represents a bit rate of a clip AV stream. "Rud" and "Rmax" are expressed in bits/second. "8" by which the extent size S is multiplied is used for a byte/bit conversion.

In other words, when data of a clip AV stream is successively arranged so that the size of each of the extents 601D and 601E becomes S bytes or greater, the sequence of the extents 601D and 601E can be seamlessly reproduced.

The formula (1) can be modified as formula (2).

$$S \times 8 >= Rmax \cdot Rud \cdot Ts/(Rud - Rmax) \quad (2)$$

When a real value is calculated in accordance with the formula (2), if the bit rate Rmax of the clip AV stream is 28 (bits/second), assuming that Rud=35 Mbps (Mega Bit per second) and Ts=0.8 seconds, the relation of S>=14 MB (Mega Byte) is satisfied. In other words, in the example, the minimum extent size S becomes 14 MB.

In the foregoing manner, when one file is successively read, the condition for successively supplying data can be defined. This condition can be applied to a seamless angle switching function for seamlessly switching angles that are read in a multiple angle function.

Next, with reference to FIG. 59A and FIG. 59B, the multiple angle function will be described. As an example shown in FIG. 59A, the multiple angle function provides a region for a plurality of reproduction paths (this region is referred to as a multiple angle block). While the user is reproducing the region, he or she can freely switch one angle to another angle. When the same object is photographed by a plurality of cameras with different angles, such a multiple angle block can be formed.

Pictures that compose a multiple angle block are not limited to the same scene. Alternatively, a multiple angle block may be composed of a plurality of pictures to be selectively displayed in the same period on a reproduction time base.

A multiple angle block is composed of one play item. In other words, one play item contains pictures of a plurality of angles. In the example shown in FIG. 59A, in a multiple angle block, one of three angles (angle (0), angle (1), and angle (2)) can be selected.

Figures 59A, 59B:
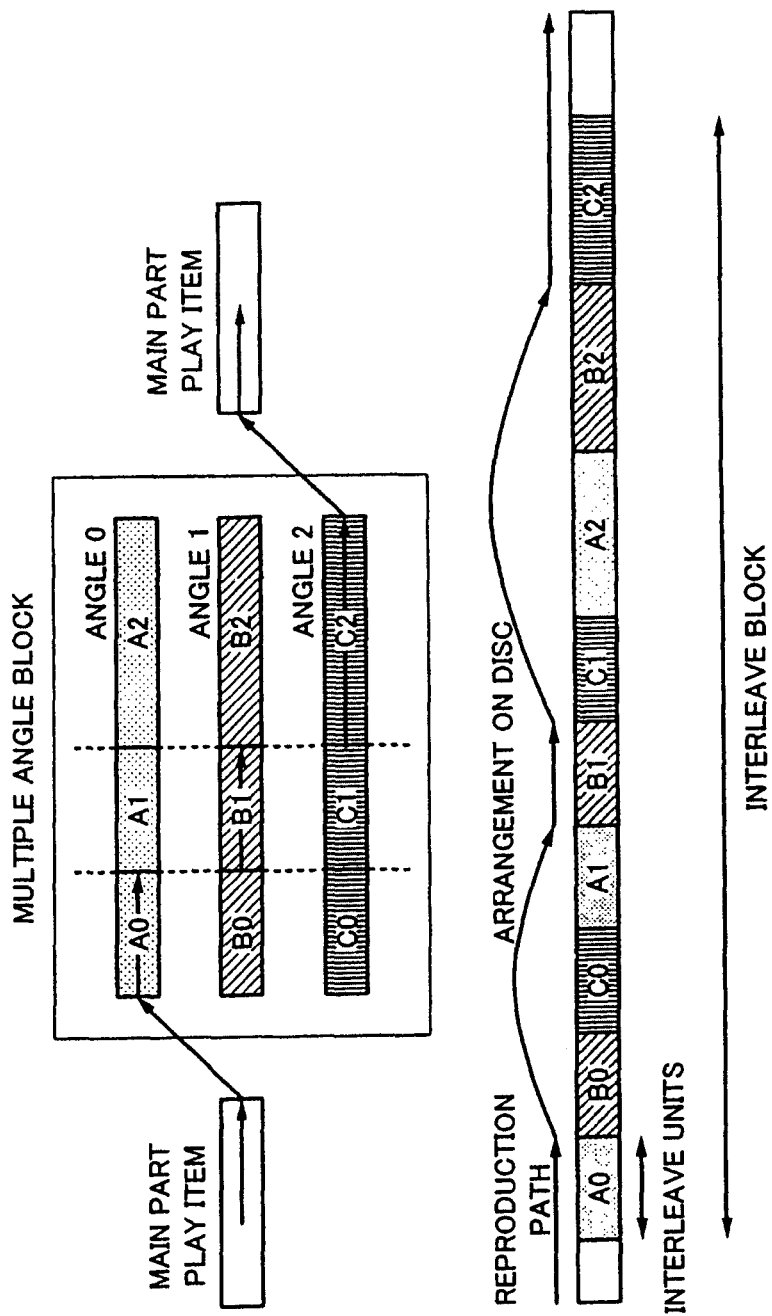
FIG. 59A and FIG. 59B are schematic diagrams describing a multiple angle function.

As an example shown in FIG. 59B, to shorten the access time for which one angle is switched to another angle, streams that compose a multiple angle block are recorded in a special arrangement on the disc. This block recorded in the special arrangement on the disc is referred to as an interleave block. One successive portion is referred to as an interleave unit. An interleave unit is recorded at successive addresses of the disc. An interleave unit satisfies the condition for the minimum extent size. In an interleave block, interleave units are arranged on the time base in accordance with angles.

When one angle is switched to another angle in each interleave unit, since a jump is performed after data of the minimum extent size is read, the foregoing condition for successively supplying data is satisfied. When the beginning of a GOP is matched with the beginning of an interleave unit, since the MPEG decoding can be performed from the beginning of an interleave unit, one angle can be seamlessly switched to another angle.

Next, a position at which one angle can be seamlessly switched to another angle will be described. It is clear that one angle cannot be freely switched to another angle at any byte position due to both the characteristic of an MPEG stream that is inter-frame compressed and the condition for successively supplying data from the disc. As the simplest method, one angle is switched to another angle in each interleave unit that satisfies the minimum extent size. In addition, when the beginning of an interleave unit is matched with the beginning of a GOP, namely an EP entry, an MPEG stream can be successively decoded.

When the number of angle switchable points is increased and the number of interleave blocks is increased by interleaving, one file is fragmented. As a result, the amount of management information of the file system increases. For example, in the Blu-ray disc file system, when a file is divided into a plurality of extents, the number of disc regions increases. As a result, the database of the file system becomes large. As a result, the upper limit of the number of files that can be recorded adversely decrease.

Thus, according to an embodiment of the present invention, as shown in FIG. 60A and FIG. 60B, the size of one interleave unit is increased so that the number of interleave units of one interleave block is decreased and a plurality of angle switchable points are described in one interleave unit. Since an angle switchable point is a decodable start point, the angle switchable point is matched with one of EP points.

The foregoing flag is_angle_change_point represents whether or not an EP entry that points at the beginning of a GOP is matched with an angle switchable point. The flag is_angle_change_point has a value as shown in FIG. 61. When the value of the flag is_angle_change_point is "1", it represents that the EP entry is an angle switchable point. When the value of the flag is_angle_change_point is "0", it represents that the EP entry is not an angle switchable point.

Whether or not an EP entry is a seamless angle switchable point basically depends on whether or not the EP entry and the preceding angle switchable point are apart by the minimum extent size or greater. In other words, the distance between EP entries for which one angle can be switched to another angel, of which the value of the flag is_angle_change_point is "1", should be apart by the minimum extent size or greater.

Next, with reference to FIG. 60A and FIG. 60B, a seamless angle switching operation using the flag is_angle_change_point will be described. In FIG. 60A and FIG. 60B, points denoted by upward arrow marks represent angle switchable points. As an example shown in FIG. 60B, points denoted by upward arrow marks are EP entries that are angle switchable points. At each of these EP entries, the value of the flag is_angle_change_point is "1".

With reference to FIG. 60A, it is assumed that while one angle (0) is being reproduced, the user switches the angle (0) to the angle (1). Then, the player continuously reads a stream of the angle (0) until the closest EP entry of which the value of the flag is_angle_change_point is "1". Next, the player searches a clip information file for an EP entry of the angle (1) in synchronization with the obtained EP entry, obtains the byte position of the obtained EP entry, and starts reading the stream from the obtained byte position. With the foregoing operation, angles can be seamlessly switched.

In the reproduction path on the disc, at the position of which the value of the flag is_angle_change_point is "1", a jump is performed between angles.

Next, the case of which one angle is nonseamlessly switched to another angle will be described. Nonseamless angle switching is angle switching of a discontinuity can take place in a picture. In the seamless angle switching, if angle switching is designated, as described above, a stream is reproduced until an angle switchable point. At the angle switchable point, the angle switching is performed. In contrast, in the nonseamless angle switching, when angle switching is designated, angles can be promptly switched without consideration of the condition for successively supplying data and the beginning of a GOP. Thus, the nonseamless angle switching has an advantage of short switching time.

FIG. 62A and FIG. 62B show an example of a nonseamless multiple angle block. In the nonseamless angle switching, since a discontinuity can take place in a picture, it is not necessary to always move to another angle in synchronization with the current angle. For example, while a GOP of one angle is being reproduced, a jump can be performed from the angle to the beginning of the closest GOP of another angle, the GOP being earlier than the GOP of the original angle. As shown in FIG. 62A, when a jump is performed from the angle (0) to the angle (1), the beginning of a GOP of the angle (1) is sought. In the example, after the angle (1) is slightly returned, it is reproduced. FIG. 62B shows a reproduction path on the disc in that case.

On the other hand, a nonseamless multiple angle block should be seamlessly connected at the exit thereof. In other words, when angle switching is not performed at all, like a regular reproduction, to improve the quality of a reproduced picture, it is very important not to cause a discontinuity to take place at an entrance and an exit of a multiple angle block.

According to the embodiment of the present invention, with the setting of the flag is_angle_change_point, a nonseamless multiple angle block is seamlessly connected to the main part.

A seamless connection between the main part and an angle block can be relatively easily performed. In other words, when the end of the main part (the end of a play item immediately preceded by an entrance of a nonseamless multiple angle block) satisfies the condition of the minimum extent size, the main part can be seamlessly connected to any angle.

Figures 63A, 63B:
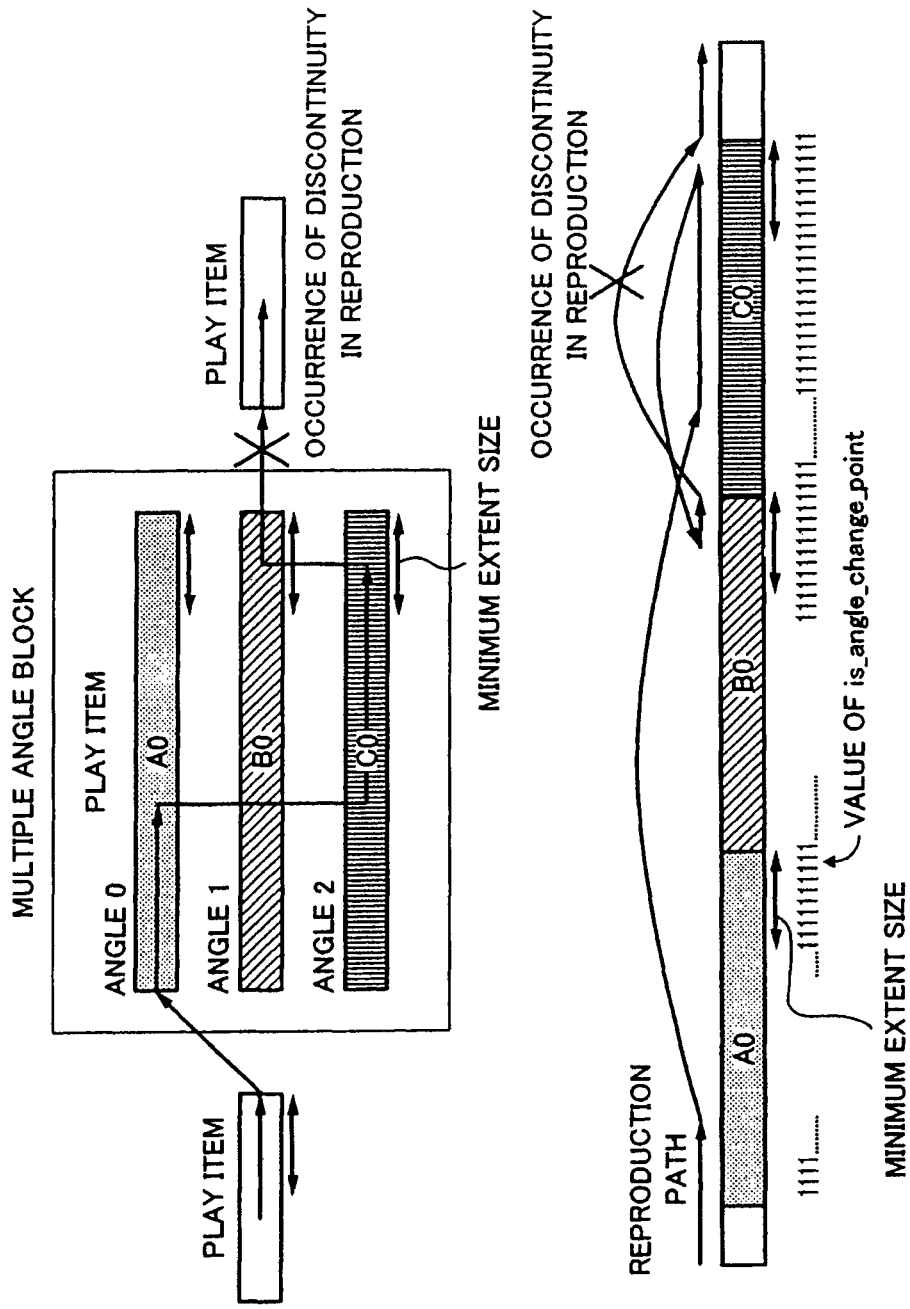
FIG. 63A and FIG. 63B are schematic diagrams describing that when an angle is switched in a nonseamless multiple angle block, a discontinuity takes place.

On the other hand, in the vicinity of an exit of an angle block to the main part, when angles are switched in a path as shown in FIG. 63A, data after the last switched point to the end of the angle does not satisfy the minimum extent size. Thus, when a jump is performed at the exit of the multiple angle block, the condition for successively supplying data is not satisfied. Thus, the picture is paused. Alternatively, a discontinuity takes place and for example the screen becomes black. FIG. 63B shows a reproduction path on the disc in that case.

In the example shown in FIG. 63A, data from the position at which the angle (2) is switched to the angle (1) to the exit of the multiple angle block does not satisfy the minimum extent size. Thus, when the angle (1) is moved to the main part, since the amount of data that is read for the angle (1) is insufficient, a discontinuity takes place in the picture that is reproduced.

According to the embodiment of the present invention, to solve the problem that takes place in the nonseamless angle switching, the flag is_angle_change_point is used for a nonseamless multiple angle block. While a nonseamless multiple angle block is being reproduced, when angles are switched, a discontinuity can take place in the picture. Thus, the value of the flag is_angle_change_point is all "1's" as shown in FIG. 63B. In other words, a jump can be performed from any position of an angle that is being reproduced. In addition, a reproduction can be performed from any jumped position.

Next, the definition of the flag is_angle_change_point for a clip in a nonseamless multiple angle block will be given. As described above, in a region of which the value of the flag is_angle_change_point is "0", while a picture is being reproduced, angle switching to another angle (jump to another angle) and returning to the reproduction position of the original angle (return to original angle) are prohibited. In contrast, in a region of which the value of the flag is_angle_change_point is "1", the "jump to another angle" and "return to original angle" can be performed. In the vicinity of the exit of each angle, at a predetermined number of positions, the value of the flag is_angle_change_point is set to "0". In the region of which the value of the flag is_angle_change_point is set to "0", the "jump to another angle" and "return to original angle" are prohibited. The size of the region of which the value of the flag is_angle_change_point is set to "0" is equal to or greater than the minimum extent size.

Since the flag is_angle_change_point is set in such a manner, immediately before an exit of a nonseamless multiple angle block, the "jump to another angle" and "return to original angle" can be prohibited.

Figure 64A:
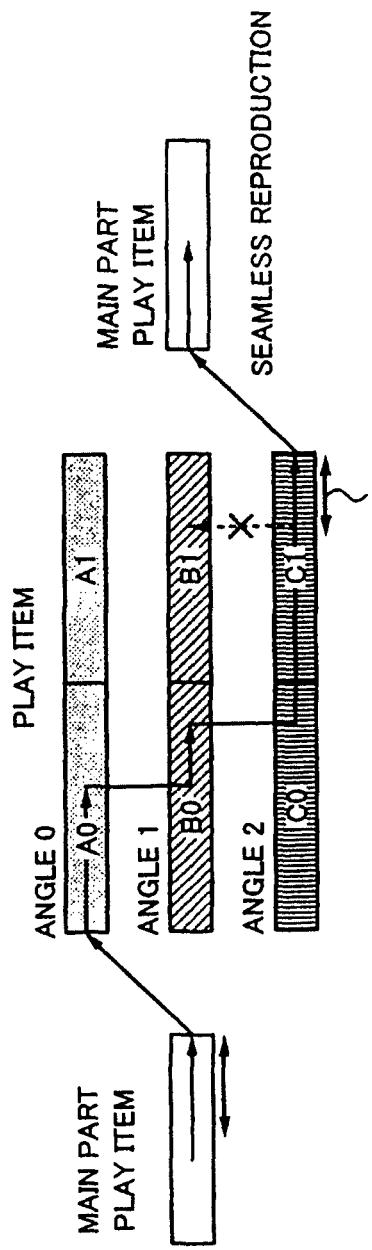
FIG. 64A and FIG. 64B are schematic diagrams describing a first reproducing method for a nonseamless multiple angle block.
Figure 64B:
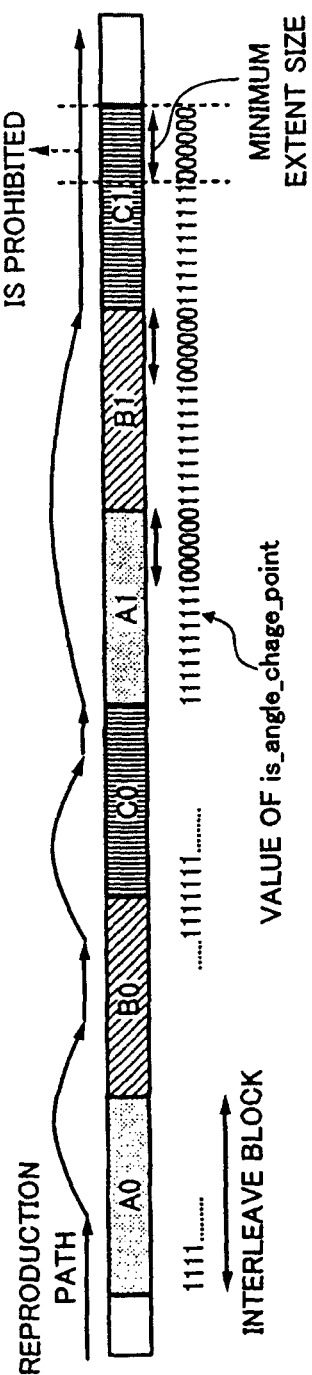
Figure 65A:
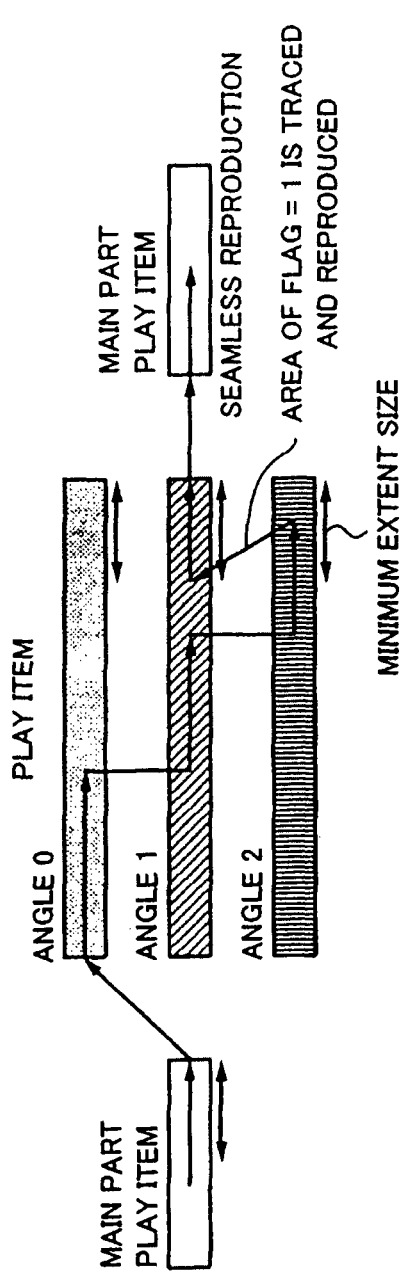
FIG. 65A and FIG. 65B are schematic diagrams describing a second reproducing method for a nonseamless multiple angle block.
Figure 65B:
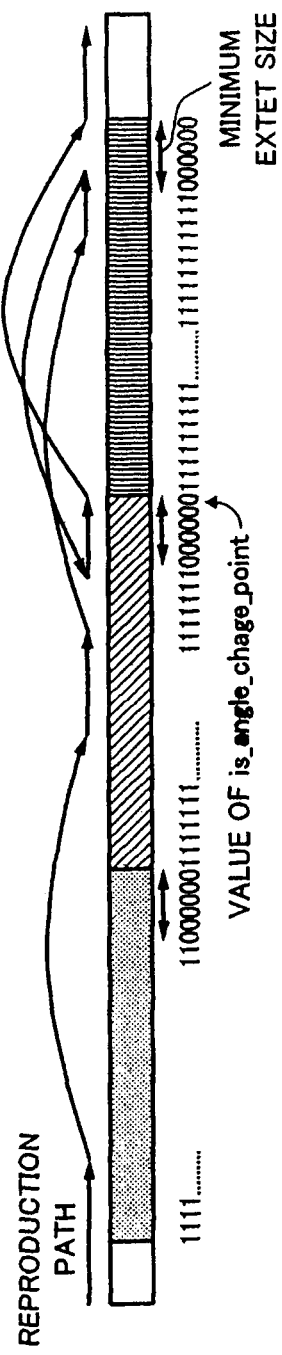

For example, as shown in FIG. 64B and FIG. 65B, the value of the flag is_angle_change_point is set to "0" in six EP entries on the rear end side of each interleave unit, whereas the value of the flag is_angle_change_point is set to "1" in the other EP entries of each interleave unit.

Next, methods for reproducing a nonseamless multiple angle block in accordance with the value of the flag is_angle_change_point that has been set in the foregoing manner will be described. In the first method, in a region of which the value of the flag is_angle_change_point has been set to "0", the angle switching is prohibited.

Next, with reference to FIG. 64A and FIG. 64B, the first method will be described. As described above, in six EP entries on the rear end side of each interleave unit, the value of the flag is_angle_change_point is set to "0" (see FIG. 64B). As shown in FIG. 64A, when the reproduction position is in the region of which the value of the flag is_angle_change_point has been set to "0", the angle switching is prohibited. Even if the user issues an angle switching command in the region, the player will ignore the command. In the example, the player does not perform the angle switching. The player exits the multiple angle block and enters the main part play item. FIG. 64B shows a reproduction path on the disc in that case.

In the second method, although the angle switching is permitted in a region of which the value of the flag is_angle_change_point has been set to "0", after the angle switching is performed, a jump is performed to a position at which the value of the flag is_angle_change_point has been set to "1".

Next, with reference to FIG. 65A and FIG. 65B, the second method will be described. As described above, in six EP entries on the rear end side of each interleave unit, the value of the flag is_angle_change_point is set to "0" (see FIG. 65B). As shown in FIG. 65A, at a position whose distance to the exit of a multiple angle block is smaller than the minimum extent size, namely in a region of which the value of the flag is_angle_change_point has been set to "0", if angle switching is designated, the reproduction position is returned to a region of which the value of the flag is_angle_change_point has been set to "1" and the reproduction is started from the region. FIG. 65B shows a reproduction path on the disc in that case.

In any of the first and second methods, when a jump is performed at the exit of a multiple angle block, after data of the minimum extent size or greater is read, the next play item is reproduced. Thus, a discontinuity (nonseamless) can be prevented from taking place at the exit of an angle block.

In FIG. 64A and FIG. 64B, an interleave block composes a nonseamless multiple angle block. However, as shown in FIG. 65A and FIG. 65B, other than an interleave block can compose a nonseamless multiple angle block.

Figure 66A:
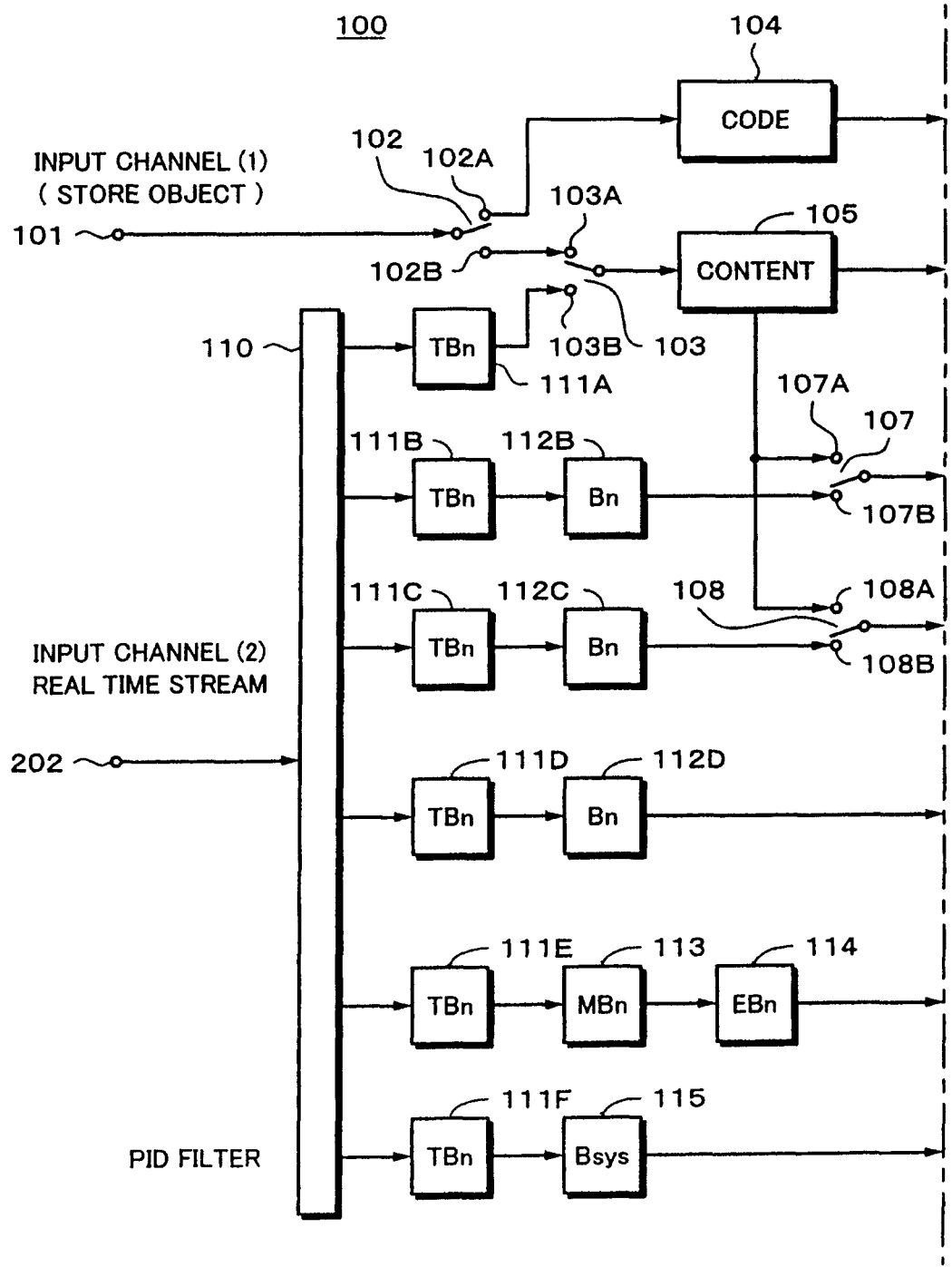
FIG. 66A, FIG. 66B, and FIG. 66C are a functional block diagram showing an example of a structure of a player decoder 100 according to an embodiment of the present invention.
Figure 66B:
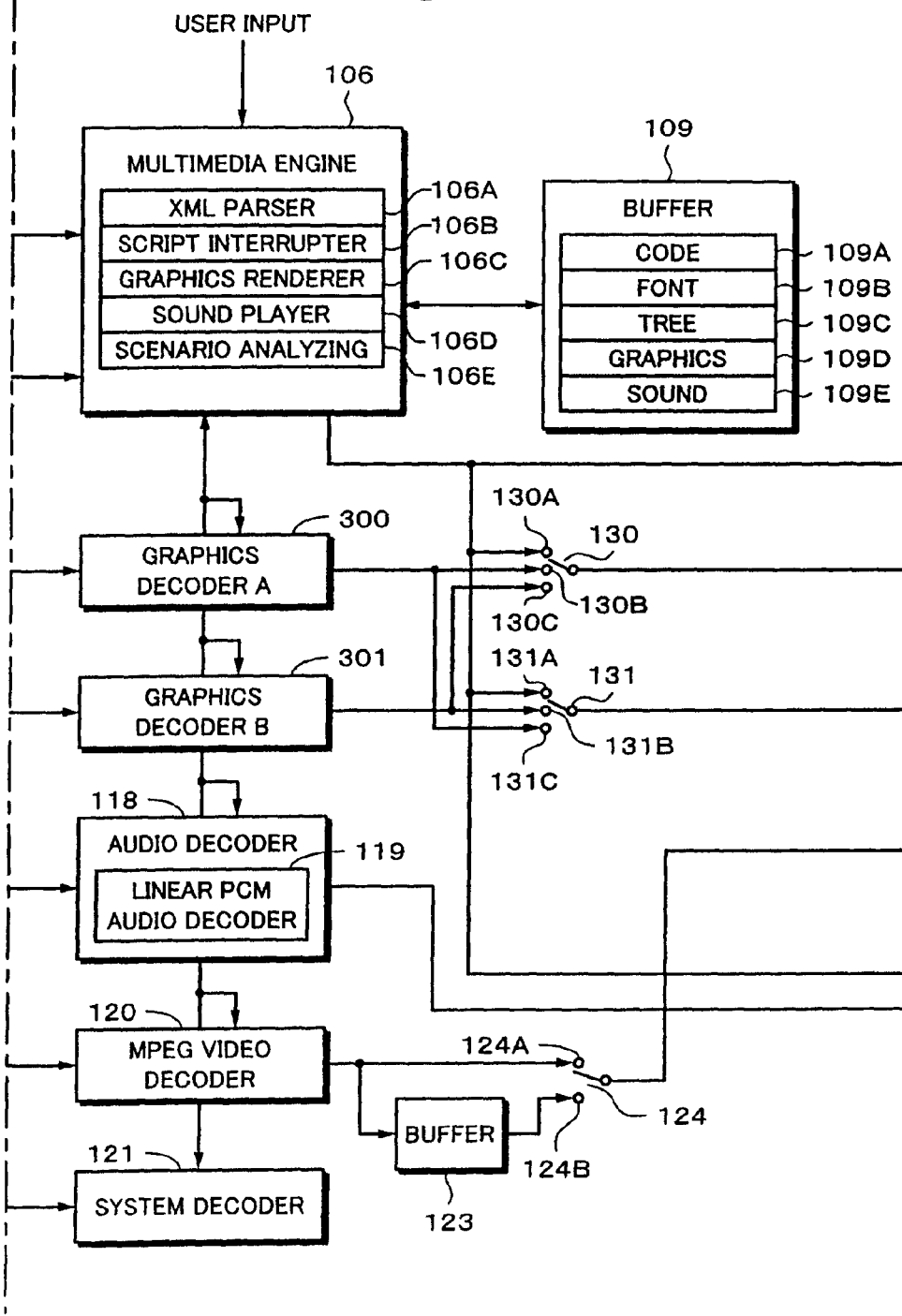
Figure 66C:
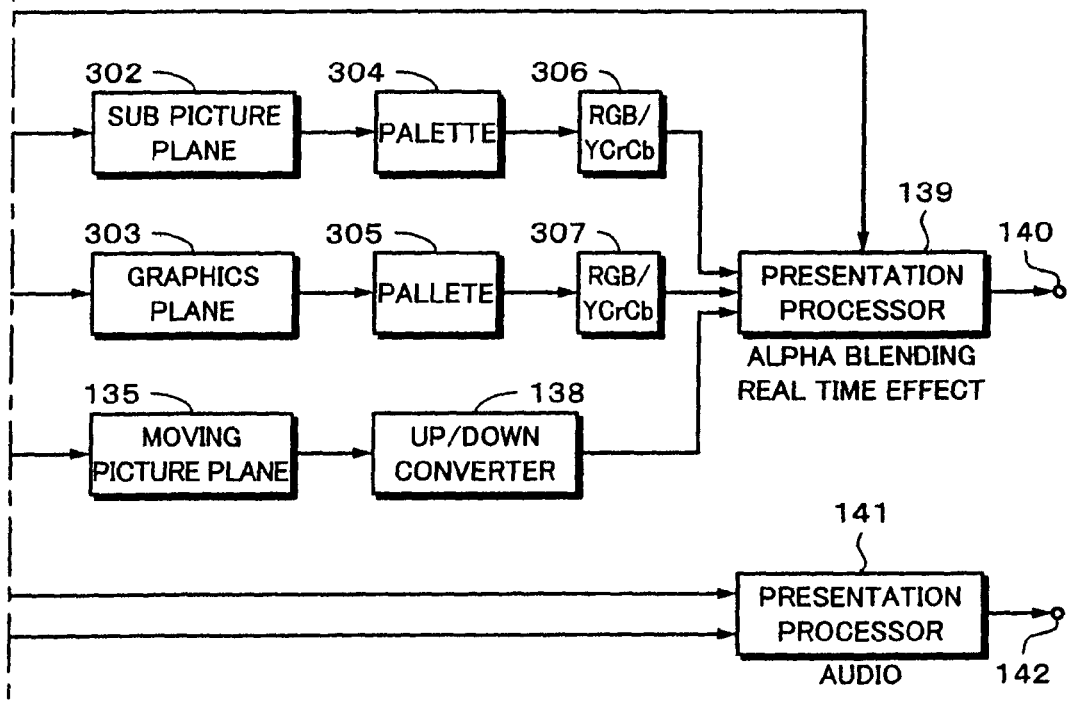

FIG. 66A, FIG. 66B, and FIG. 66C are functional block diagrams showing an example of a structure of a player decoder 100 according to an embodiment of the present invention. The player decoder 100 interprets data reproduced from a disc loaded into a drive device (not shown), outputs an AV stream, and allows the user to interactively operate the output AV stream.

All operations of the player decoder 100 are controlled by a CPU (not shown). Streams and data flows of individual portions of the player decoder 100 are monitored and controlled by the CPU.

When the disc is loaded into the drive device (not shown), as described above, the file "scenario.hdmv" and the file "entrylist.data" are reproduced. In accordance with the descriptions of the file "scenario.hdmv" and the file "entrylist.data", other necessary files are read from the disc and thereby a content recorded on the disc is reproduced. For example, in accordance with the descriptions of the file "scenario.hdmv" and the file "entrylist.data", moving picture data displayed on the moving picture plane 10, image data displayed on the subtitle plane 11 and the graphics plane 12, a play list file, and so forth are read from the disc.

In the following description, among those data that is read from the disc, streams such as moving picture data, sub pictures (subtitle data), and sound data that should be continuously processed are referred to as real time streams. In contrast, non-real time data such as scenario files and play list files that are not required to be successively processed are referred to as store objects. The store objects are stored in a memory or the like and expanded thereon. Store objects are stored in the memory or the like, expanded, and processed when necessary.

The player decoder 100 has two systems of input channels that are channel (1) and channel (2). A store object is input to an input terminal 101 of the input channel (1). A real time stream is input to an input terminal 202 of the input channel (2). Alternatively, a store object may be input to the input terminal 202. According to the embodiment, a real time stream and a part of a store object that are input to the input terminal 202 are MPEG2 TSs.

When the rotation speed of the disc in the drive device is increased for example twice and the read transfer speed of the disc is increased, the reading operations for two systems of the channels (1) and (2) from the disc are performed in time division basis.

First of all, the system of the input channel (1) will be described. A store object that is input to the input terminal 101 is input to a switch circuit 102. When a program code of the file "scenario.hdmv" as a store object is input, the switch circuit 102 selects an output terminal 102A. The input program code is stored in a code buffer 104. As another program, an HTML file, an ECMA script, or the like may be input.

When image data and audio data are input as a store object, the switch circuit 102 selects an output terminal 102B. As a result, the input image data is input to a switch circuit 103. When a real time stream that is input to the input terminal 202 does not contain image data displayed on the subtitle plane 11 or the graphics plane 12, the switch circuit 103 selects an input terminal 103A. The image data and audio data that are input from the switch circuit 102 are stored in a contents buffer 105.

Likewise, when image data displayed on the subtitle plane 11 or the graphics plane 12 and audio data as a sound effect are contained in a real time stream that is input to the input terminal 202, the switch circuit 103 selects an input terminal 103B. As a result, the image data/audio data is stored in the contents buffer 105. Store objects stored in the code buffer 104 and the contents buffer 105 are read when necessary and supplied to a multimedia engine 106.

The image data of the store object stored in the contents buffer 105 is also supplied to a graphics decoder A 300 and a graphics decoder B 301 through switch circuits 107 and 108, respectively.

In the example shown in FIG. 66A, FIG. 66B, and FIG. 66C, the graphic decoder A 300 decodes PNG format image data. The graphic decoder B 301 decodes JPEG format image data. Alternatively, the graphic decoder A 300 and the graphic decoder B 301 may decode other format image data and/or a plurality of formats of image data.

The multimedia engine 106 comprises an XML parser 106A, a script interpreter 106B, a graphic renderer 106C, a sound player 106D that reproduces a sound effect, and a scenario file analyzing engine 106E. The multimedia engine 106 may be composed of independent hardware. Alternatively, the multimedia engine 106 may be accomplished by a process of a predetermined program that the foregoing CPU (not shown) executes.

The XML parser 106A has a function for parsing an XML (Extensible Markup Language) document. In addition, the XML parser 106A can also parse an HTML document. An HTML document parsed by the XML parser 106A is converted into a format that can be executed by the player decoder 100. The script interpreter 106B analyzes an ECMA script and converts it into a format that can be executed by the player decoder 100. The graphic renderer 106C decodes image data and obtains a format that can be expanded on the subtitle plane 11 and the graphics plane 12. The sound player 106D reproduces audio data used for a button click sound and so forth.

The multimedia engine 106 performs processes for the XML parser 106A, the script interpreter 106B, and the graphic renderer 106C with a work memory of a buffer 109. For example, the XML parser 106A and the script interpreter 106B use a code buffer 109a of the buffer 109. The graphic renderer 106C uses a graphics buffer 109D of the buffer 109. The buffer 109 further comprises a font buffer 109B that stores font data used to display a character string and a tree buffer 109C that stores the parsed result of the HTML document by the XML parser 106A in a hierarchical tree structure. The sound player 106D reproduces audio data stored in the sound buffer 109E.

The multimedia engine 106 reads the scenario file "scenario.hdmv" and so forth stored in for example the code buffer 104. The scenario analyzing engine 104E analyzes a scenario in accordance with the description of the file that has been read. A drive device or the like (not shown) is controlled in accordance with the description of the analyzed scenario. Necessary files of moving picture data displayed on the moving picture plane 10, image data displayed on the subtitle plane 11 and the graphics plane 12, audio data, and so forth are read from the disc loaded into the drive device. As a result, a content is reproduced.

Data that is stored in the code buffer 104 and the contents buffer 105 can be held therein until the data becomes unnecessary. Thus, data stored in the code buffer 104 and the contents buffer 105 can be repeatedly read when necessary.

In addition, the multimedia engine 106 reads an ECMA script from the code buffer 104. When necessary, the multimedia engine 106 reads another ECMA script and an HTML document from the code buffer 104 in accordance with the description of the ECMA script that has been read. In addition, the multimedia engine 106 reads image data from the contents buffer 105.

In addition, the multimedia engine 106 performs a demultiplexing process for the plurality of types of input data, a JavaVM (Java (registered trademark) virtual machine) function, and so forth. Moreover, the multimedia engine 106 receives a user's input from operating means such as a remote control commander, a pointing device, or the like (not shown) and performs a process in accordance with the user's input. The user's input is also supplied to the graphics decoder A 300, the graphics decoder B 301, an audio decoder 118, an MPEG video decoder 120, and a system decoder 121 that will be described later.

Image data processed by the graphic renderer 106C is supplied to a sub picture plane 302 and a graphics plane 303 through switch circuits 130 and 131, respectively. In this example, it is assumed that image data supplied to the sub picture plane 302 and the graphics plane 303 are bit map data of which image data in the PNG format, JPEG format, or the like has been decoded by the graphic renderer 106C. Timing at which the image data is supplied to the planes 302 and 303 is controlled by the multimedia engine 106.

The sub picture plane 302 and the graphics plane 303 correspond to the foregoing subtitle plane 11 and graphics plane 12, respectively. A moving picture plane 135 corresponds to the foregoing moving picture plane 10. Each of the sub picture plane 302, the graphics plane 303, and the moving picture plane 135 is composed of for example a frame memory.

The multimedia engine 106 also supplies a control signal that causes one of the moving picture plane 135, the sub picture plane 302, and the graphics plane 333 to be selected or them to be combined to a presentation processor 139 that will be described later. Likewise, the multimedia engine 106 supplies a control signal that controls an output of an audio stream to a presentation processor 141 that will be described later.

Next, the system of the input channel (2) will be described. A real time stream that is input as an MPEG2 TS to the input terminal 202 is supplied to the PID filter 110. The PID filter 110 extracts a PID (Packet Identification) from the MPEG2 TS transport stream and detects an attribute of a stream contained in a transport packet. The PID filter 110 separates the input real time stream into corresponding systems for each transport packet in accordance with the attribute of the stream.

When a transport packet is a packet in which image data of a store object is contained, the transport packet is temporarily stored in a buffer TBn 111A. The transport packet is read at predetermined timing and input to the switch circuit 103 through the input terminal 103B that has been selected. Thereafter, the transport packet is stored in the contents buffer 105 through the switch circuit 103.

When the PID filter 110 has determined that the transport packet contains PNG format data in accordance with the PID, the transport packet is temporarily stored in a buffer TBn 111B and a buffer Bn 112B. The transport packet is read at predetermined timing and input to the switch circuit 107 through an input terminal 107B that has been selected. The transport packet is supplied to the graphics decoder A 300 through the switch circuit 107.

The graphics decoder A 300 removes header information from the supplied transport packet, decodes PNG data contained in the transport packet, and obtains image data for subtitles or graphics. When the image data is used as subtitles, the image data is input to an input terminal 130B of the switch circuit 130 and expanded to the sub picture plane 302 through the switch circuit 130 at predetermined timing. Likewise, when the image data is used as buttons, since they are displayed on the graphics plane, the image data is input to an input terminal 131C of the switch circuit 130 and expanded to the graphics plane 303 through the switch circuit 131.

When the PID filter 110 has determined that a transport packet contains JPEG data in accordance with the PID, the transport packet is temporarily stored in a buffer TBn 111C and a buffer Bn 112C. The transport packet is read at predetermined timing, input to a switch circuit 108 through an input terminal 108B that has been selected, and supplied to the graphics decoder B 301 through the switch circuit 108.

The graphics decoder B 301 removes header information from the supplied transport packet, decodes JPEG data contained in the transport packet, and obtains bit map image data. When the image data is used as subtitles, the image data is input to an input terminal 130C of the switch circuit 130 at predetermined timing and expanded to the sub picture plane 302 through the switch circuit 130. Likewise, when the image data is used as buttons, the image data is input to an input terminal 131B of the switch circuit 131 at predetermined timing and expanded to the graphics plane 302 through the switch circuit 131.

When the PID filter 110 has determined that a transport packet contains audio data in accordance with the PID, the transport packet is temporarily stored in a buffer TBn 111D and a buffer Bn 112D. The transport packet is read at predetermined timing and supplied to the audio decoder 118. Audio data contained in the transport packet is compression-encoded in accordance with a system based on for example Dolby Digital.

The audio decoder 118 has for example a linear PCM (Pulse Code Modulation) audio decoder 119 that removes header information from the input transport stream, decodes compression-encoded audio data contained in the transport packet, and finally obtains linear PCM audio data. When the transport packet contains linear PCM audio data that has not been compression-encoded, the data is directly input to the linear PCM audio decoder 119. The linear PCM audio decoder 119 outputs the data without performing any process.

The linear PCM audio data that is output from the audio decoder 118 is input to the presentation processor 141 for audio. In the presentation processor 141, a predetermined sound effect and so forth are added to the linear PCM audio data under the control of the multimedia engine 106 and then obtained from an output terminal 142.

When the PID filter 110 has determined that a transport packet contains moving picture data in accordance with the PID, the transport packet is temporarily stored in a buffer TBn 111E, a buffer MBn 113, and a buffer EBn 114, read at predetermined timing, and supplied to the MPEG video decoder 120. The moving picture data contained in the transport packet has been compression-encoded in accordance with the MPEG2 system.

The MPEG video decoder 120 removes header information from the supplied transport packet, decodes moving picture data that has been compression-encoded in accordance with the MPEG2 system, and obtains base band moving picture data.

The moving picture data that is output from the MPEG video decoder 120 is input to an input terminal 124A of a switch circuit 124. In addition, the moving picture data is input to an input terminal 124B of the switch circuit 124 through a buffer 123. In the switch circuit 124, the input terminals 124A and 124B are selected at predetermined timing. Output moving picture data is expanded on the moving picture plane 134.

When the PID filter 110 has determined that the transport packet contains system information in accordance with the PID, the transport packet is supplied to the system decoder 121 through buffers TBn 111F and Bsys 115. The system decoder 121 removes header information from the supplied transport packet and extracts the system information therefrom. The system information is supplied to for example the CPU (not shown).

Image data on the sub picture plane 302 is supplied to a palette 304 that corresponds to the foregoing palette table 22 shown in FIG. 17. The palette has 256 colors. The palette is referenced with an index. RGB data is output. In addition, transparency data a1 is extracted. The RGB data is converted into YCbCr data by an RGB/YCbCr converting circuit 306 that corresponds to the foregoing RGB/YCbCr converting circuit 29 shown in FIG. 17. In addition to the transparency data a1, the YCbCr data is supplied to the presentation processor 139.

Image data on the graphics plane 303 is supplied to a palette 305 that corresponds to the foregoing palette table 26A shown in FIG. 17. As a result, RGB data and transparent data a2 are output. The RGB data is supplied to an RGB/YCbCr converting circuit 307 that corresponds to the RGB/YCbCr converting circuit 26B shown in FIG. 17. As a result, the color system is converted from RGB (4:4:4) into YCbCr (4:4:4). In addition to the transparent data α2, the YCbCr data that is output from the RGB/YCbCr converting circuit 307 is supplied to the presentation processor 139.

An output of the moving picture plane 135 is supplied to the presentation processor 139 through an up/down converter 138. The up/down converter 138 is a circuit that converts the resolution of the image. The up/down converter 138 converts for example an HD (High Definition) image having a high resolution into an SD (Standard Definition) image having a standard resolution.

The presentation processor 139 performs an alpha-blending process using transparency α1 of image data of the subtitle plane 11 (subtitle plane 302) and transparency α2 of the graphics plane 12 (graphics plane 303) described in FIG. 17.

The presentation processor 139 combines image data of the moving picture plane 135 and image data of the sub picture plane 302 in accordance with the transparency α1 that has been set to the image data of the sub picture plane 502. In addition, the presentation processor 139 combines the image data of which the image data of the moving picture plane 135 and the image data of the subtitle plane 302 have been combined and image data of the graphics plane 303 in accordance with the transparency a2 that has been set to the image data of the graphics plane 303. The image data of which the image data of the graphics plane 303, the image data (subtitle data) of the sub picture plane 302, and the image data of the moving picture plane 135 have been combined is obtained from an output terminal 140.

The presentation processor 139 can perform an effect process for image data on real time basis.

In such a structure, when a content described and whose data is structured according to the embodiment of the present invention is loaded into a drive device (not shown), the file "scenario.hdmv" and so forth are read. In accordance with the description of the file "scenario.hdmv", a content recorded on the disc are reproduced. When the user issues a command with the operating means (not shown), each portion of the drive device and the player decoder 100 are controlled by the multimedia engine 106. Data is reproduced in accordance with the command.

When an angle switching command is issued by the operating means (not shown), required files "scenario.hdmv", "entrylist.data", and so forth are referenced under the control of the multimedia engine 106. In accordance with information about a clip switchable point, the drive device (not shown) is controlled. In the foregoing manner, a read position on the disc is changed so as to switch angles. In addition, the operating means can issue a pause cancellation command for a still picture.

In the foregoing description, each portion of the player decoder 100 is composed of hardware. However, the present invention is not limited to such an example. For instance, the player decoder 100 can be accomplished by a process of software. In this case, the player decoder 100 can be operated on a computer device. In addition, the player decoder 100 can be accomplished by a combination of hardware and software. For example, the audio decoder 118 and the MPEG video decoder 120 may be composed of hardware. The rest of the player decoder 100 may be composed of software.

A program that causes a computer device to execute the player decoder 100 composed of only software or a combination of hardware and software is recorded on a recording medium for example a CD-ROM (Compact Disc-Read Only Memory) and supplied therewith. The CD-ROM is loaded into a CD-ROM drive of the computer device. The program recorded on the CD-ROM is installed to the computer device. As a result, the foregoing process can be executed on the computer device. Since the structure of the computer device is well known, the description thereof will be omitted.

As described above, the present invention has an effect that an interactive function causing reproduction to be changed in accordance with the user's input can be accomplished by extending the blu-ray disc standard for recording and reproducing data for a prerecorded large capacity disc.

In addition, according to the embodiment of the present invention, since information of a play list composing a title and a top menu is described in a database, a desired title can be directly reproduced with a key operation of a remote controller or the like without need to select the desired title on a screen. Moreover, a top menu screen can be invoked.

In addition, according to the embodiment of the present invention, since a flag that represents whether or not angles can be switched is described at the beginning of each decoding unit, a seamless angle switching function free of a discontinuity at an angle switched point can be accomplished.

According to the embodiment of the present invention, since a flag that represents whether or not a sub play item can be reproduced not in synchronization with a main play item is described, a BGM that is not in synchronization with a main path can be repeatedly reproduced.

The invention claimed is:

1. A reproducing apparatus for reproducing content data recorded on a recording medium, the reproducing apparatus comprising:
    reading means for reading from the recording medium video data, audio data reproducible in accordance with the video data, and information that indicates whether the video data and the audio data have been recorded as a multiplexed file or as independent files; and
    reproducing means for reproducing the video data and the audio data that are read by the reading means in accordance with the information that is read by the reading means such that when the information indicates that the video data and the audio data have been recorded as a multiplexed file on the recording medium, still pictures derived from the video data are reproduced in synchronization with the audio data by the reproducing means, and when the information indicates that the video data and the audio data have been recorded as independent files on the recording medium, the still pictures derived from the video data are reproduced by the reproducing means without being in synchronization with the audio data.

2. The reproducing apparatus as set forth in claim 1, wherein image data displayed in association with the video data has been further recorded on the recording medium, wherein the video data and the image data have been divided into video data packets and image data packets and stored, the video data packets and image data packets each having a predetermined unit, and wherein the video data packets and the image data packets are successively arranged and recorded on the recording medium.

3. A reproducing method for reproducing content data recorded on a recording medium, the reproducing method comprising:
reading from the recording medium video data, audio data reproducible in accordance with the video data, and information that indicates whether the video data and the audio data have been recorded as a multiplexed file or as independent files; and
reproducing the video data and the audio data that are read in the reading step in accordance with the information that is read in the reading step such that when the information indicates that the video data and the audio data have been recorded as a multiplexed file on the recording medium, still pictures derived from the video data are reproduced in synchronization with the audio data, and when the information indicates that the video data and the audio data have been recorded as independent files on the recording medium, the still pictures derived from the video data are reproduced without being in synchronization with the audio data.

4. A reproducing apparatus for reproducing content data recorded on a recording medium, the reproducing apparatus comprising:
a reader configured to read from the recording medium video data, audio data reproducible in accordance with the video data, and information that indicates whether the video data and the audio data have been recorded as a multiplexed file or independent files; and
a controller configured to reproduce the video data and the audio data that are read by the reader in accordance with the information that is read by the reader such that when the information indicates that the video data and the audio data have been recorded as a multiplexed file on the recording medium, still pictures derived from the video data are reproduced in synchronization with the audio data by the controller, and when the information indicates that the video data and the audio data have been recorded as independent files on the recording medium, the still pictures derived from the video data are reproduced by the controller without being in synchronization with the audio data.

5. A non-transitory recording medium on which a reproducing program that can be read by a computer device has been recorded, the reproducing program causing the computer device to execute a reproducing method comprising:
reading from the recording medium video data, audio data reproducible in accordance with the video data, and information that represents whether the video data and the audio data have been recorded as a multiplexed file or as independent files; and
reproducing the video data and the audio data that are read in the reading step in accordance with the information that is read in the reading step such that when the information indicates that the video data and the audio data have been recorded as a multiplexed file on the recording medium, still pictures derived from the video data are reproduced in synchronization with the audio data, and when the information indicates that the video data and the audio data have been recorded as independent files on the recording medium, the still pictures derived from the video data are reproduced without being in synchronization with the audio data.

6. The reproducing apparatus as set forth in claim 1, wherein the video data has a structure in which I pictures are arranged as the still pictures.

7. The reproducing method as set forth in claim 3, wherein the video data has a structure in which I pictures are arranged as the still pictures.

8. The reproducing apparatus as set forth in claim 4, wherein the video data has a structure in which I pictures are arranged as the still pictures.

9. The non-transitory recording medium as set forth in claim 5, wherein the video data has a structure in which I pictures are arranged as the still pictures.

* * * * *

UNITED STATES PATENT AND TRADEMARK OFFICE
CERTIFICATE OF CORRECTION

PATENT NO. : 8,503,859 B2  
APPLICATION NO. : 11/696877  
DATED : August 6, 2013  
INVENTOR(S) : Toshiya Hamada and Motoki Kato Page 1 of 1

It is certified that error appears in the above-identified patent and that said Letters Patent is hereby corrected as shown below:

On the Title Page, Item (54) and in the specification, Column 1, lines 1-3, the title should read:

--APPARATUS AND METHOD, FOR REPRODUCING CONTENT DATA RECORDED ON A RECORDING MEDIUM--.

Signed and Sealed this  
Seventeenth Day of September, 2013

Teresa Stanek Rea  
*Deputy Director of the United States Patent and Trademark Office*